United States Patent [19]

Vinciarelli et al.

[11] Patent Number: 5,321,348

[45] Date of Patent: Jun. 14, 1994

[54] BOOST SWITCHING POWER CONVERSION

[75] Inventors: Patrizio Vinciarelli, Boston; Jay M. Prager, Tyngsboro, both of Mass.

[73] Assignee: VLT Corporation, San Antonio, Tex.

[21] Appl. No.: 722,537

[22] Filed: Jun. 27, 1991

Related U.S. Application Data

[63] Continuation-in-part of Ser. No. 666,878, Mar. 8, 1991, abandoned.

[51] Int. Cl.$^5$ ............... H02M 3/335; G05F 1/56; G05F 1/62
[52] U.S. Cl. ................... 323/222; 323/285; 363/21
[58] Field of Search ............. 323/222, 282, 285, 286; 363/16, 20, 21, 97; H02M 3/335; G05F 1/56, 1/62

[56] References Cited

U.S. PATENT DOCUMENTS

| | | | |
|---|---|---|---|
| 4,415,959 | 11/1983 | Vinciarelli | 363/21 |
| 4,648,020 | 3/1987 | Vinciarelli | 363/71 |
| 4,677,366 | 6/1987 | Wilkerson | 323/222 |
| 4,720,667 | 1/1988 | Lee et al. | 323/222 |
| 4,829,232 | 5/1989 | Erickson, Jr. | 323/222 |
| 4,841,220 | 6/1989 | Tabisz et al. | 323/282 |
| 4,940,929 | 7/1990 | Williams | 323/222 |
| 4,959,764 | 9/1990 | Bassett | 363/16 |

OTHER PUBLICATIONS

Todd et al., "Practical Resonant Power Converters-Theory and Application", Powertechnics Magazine, May 1986, vol. 2, No. 5, pp. 29-35.
Andreycak, "1 MHz 150W Resonant Converter Design Review".
EPO Search Report.
Barbi et al., "Sinusoidal Line Current Rectification At Unity Power Factor With Boos Quasi-Resonant Converters", APEC '90 Conference Proceedings, Mar. 1990, Los Angeles, USA; pp. 553-562.
Sebastian et al., "A Very Simple Method To Obtain One Additional Fully Regulated Output In Zero-Current-Switched Quasiresonant Converters"; PESC '90 Conference Proceedings, vol. II, Jun. 1990, San Antonio, Texas, USA; pp. 536-542.

Primary Examiner—Steven L. Stephan
Assistant Examiner—B. Davidson
Attorney, Agent, or Firm—Fish & Richardson

[57] ABSTRACT

Boost switching power conversion involves an apparatus for controlling transfer of power from an input voltage source to an output voltage sink. The apparatus includes a switch for controllably permitting or inhibiting delivery of current from the source to the output sink when the switch is off or on, respectively. Circuit elements of the apparatus define a characteristic time scale for time variation of the flow of current in the switch after the switch is turned on, and a switch controller is provided for turning the switch on and off at times when the current in the switch is zero. The rate at which the switch is turned on is controlled to regulate the ratio of the voltage across the output voltage sink to the average value of voltage across the input source such that the ratio is greater than or equal to one. A uni-directional conducting device is provided to permit current flow to the voltage sink after the switch has opened and to prevent reverse current flow from the voltage sink back toward the input source.

32 Claims, 42 Drawing Sheets

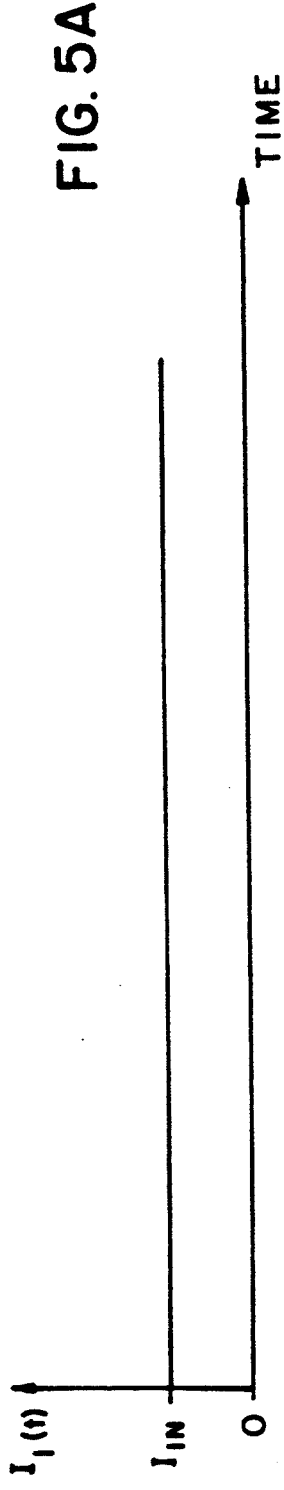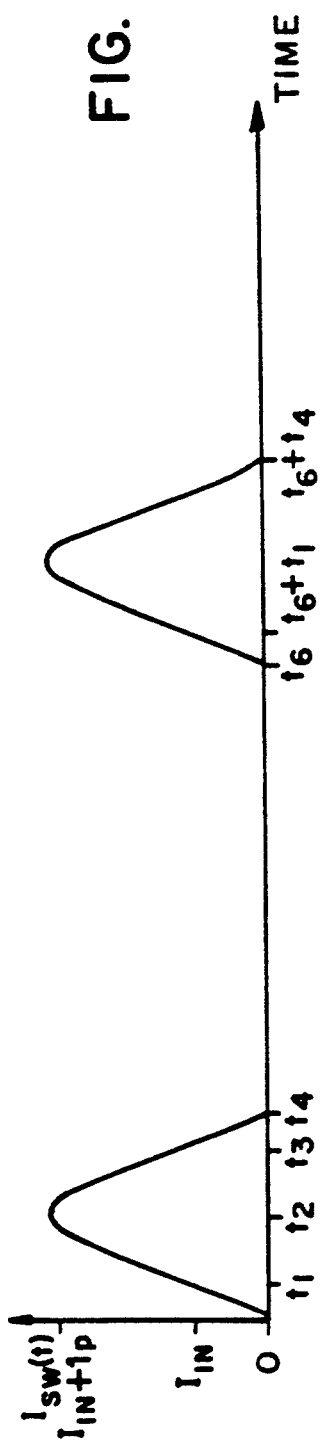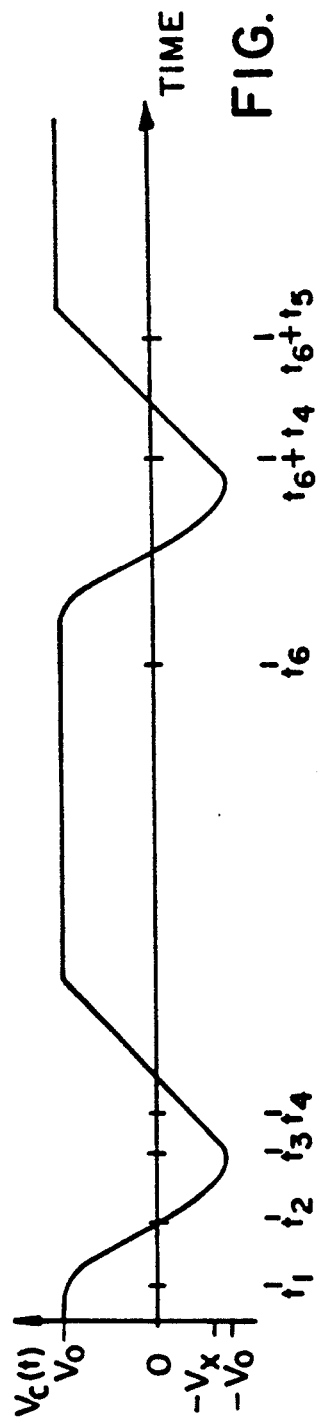

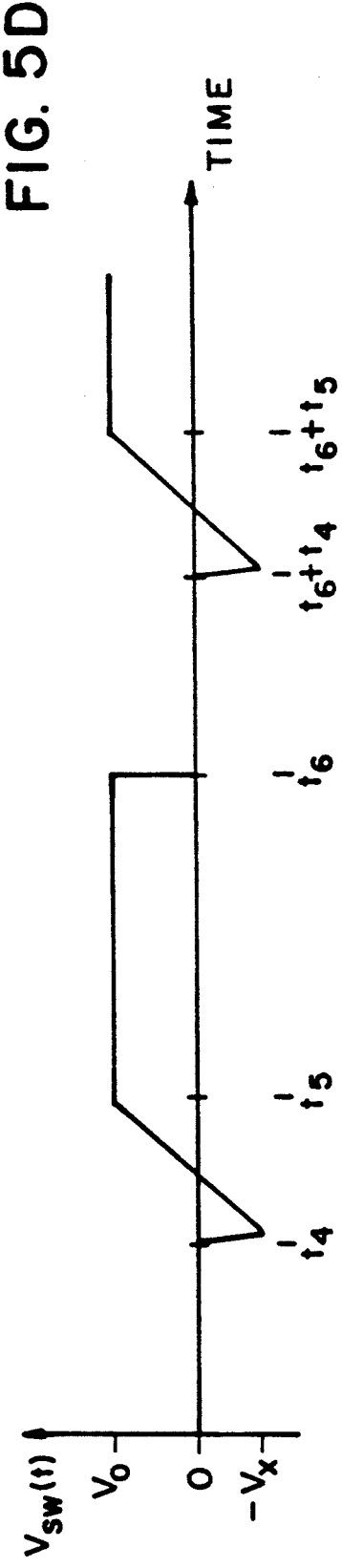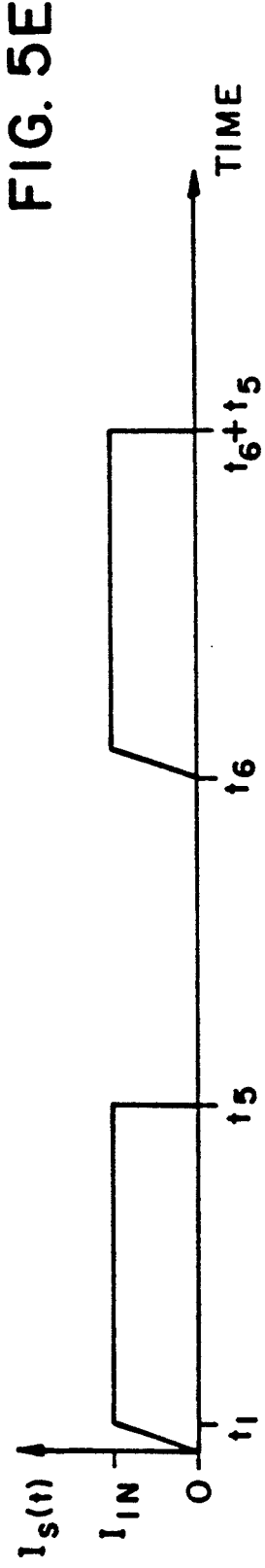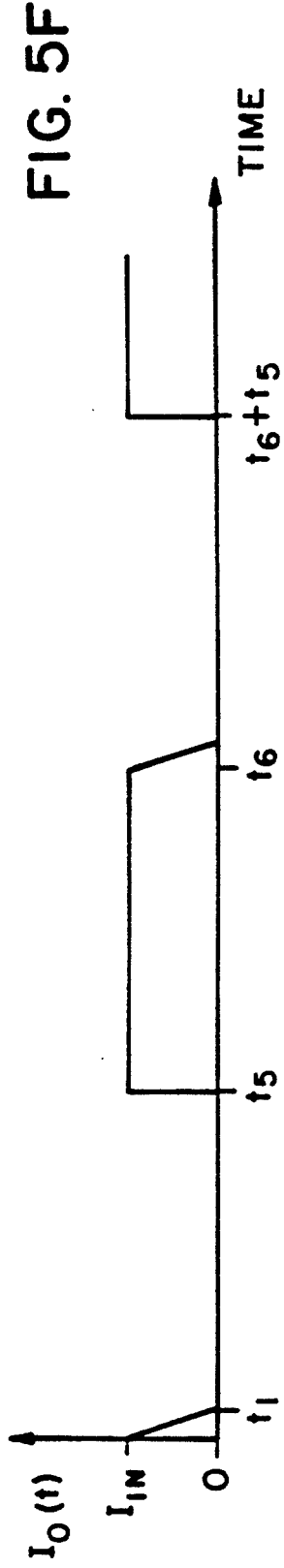

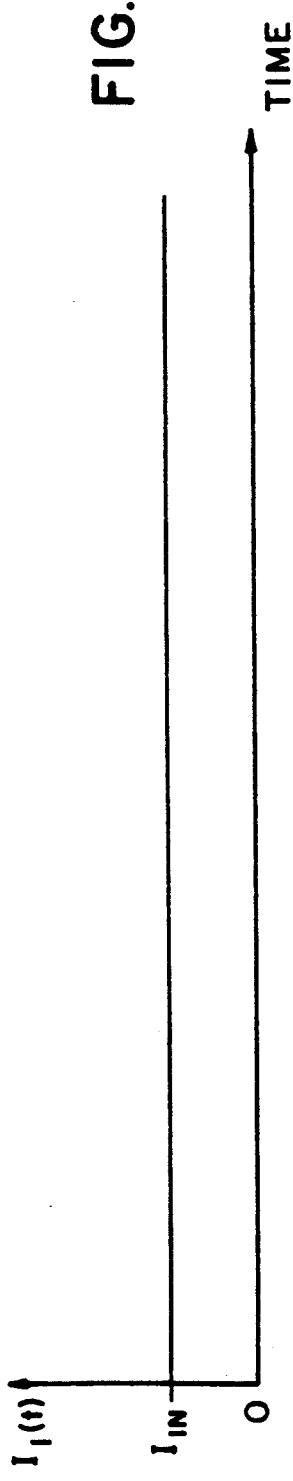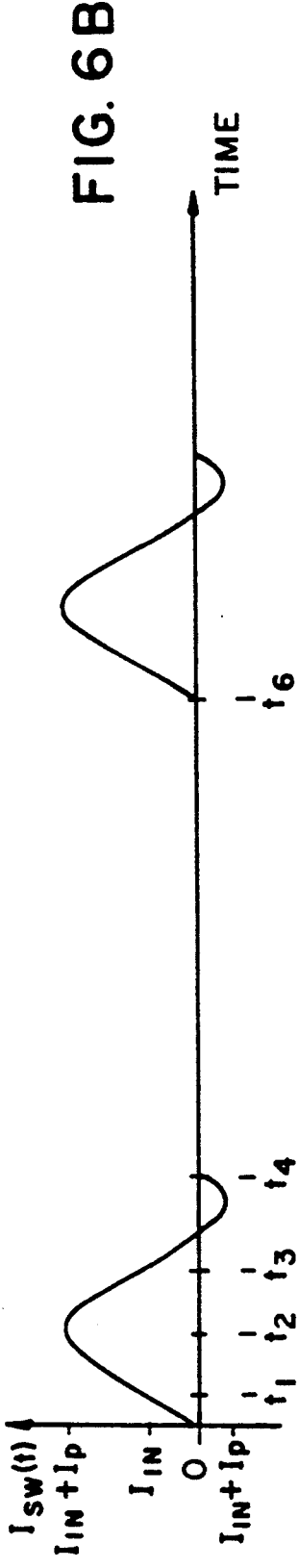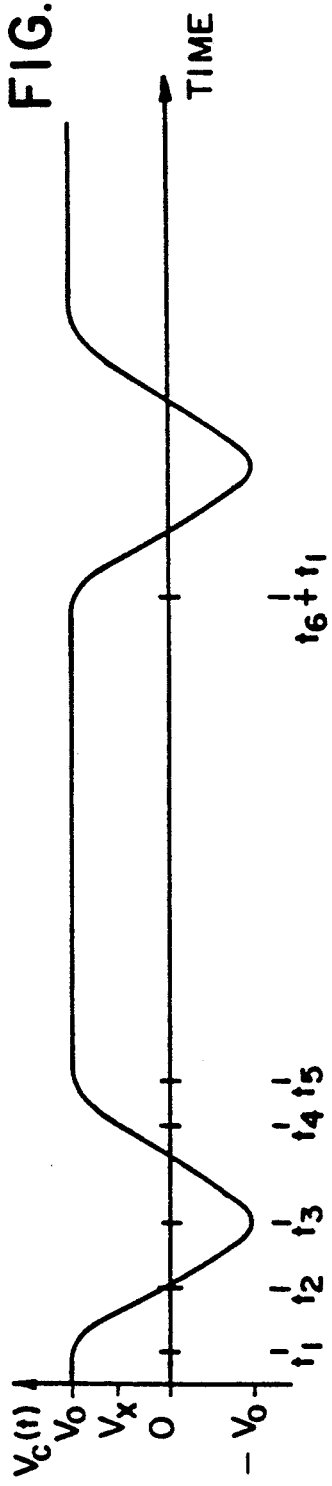

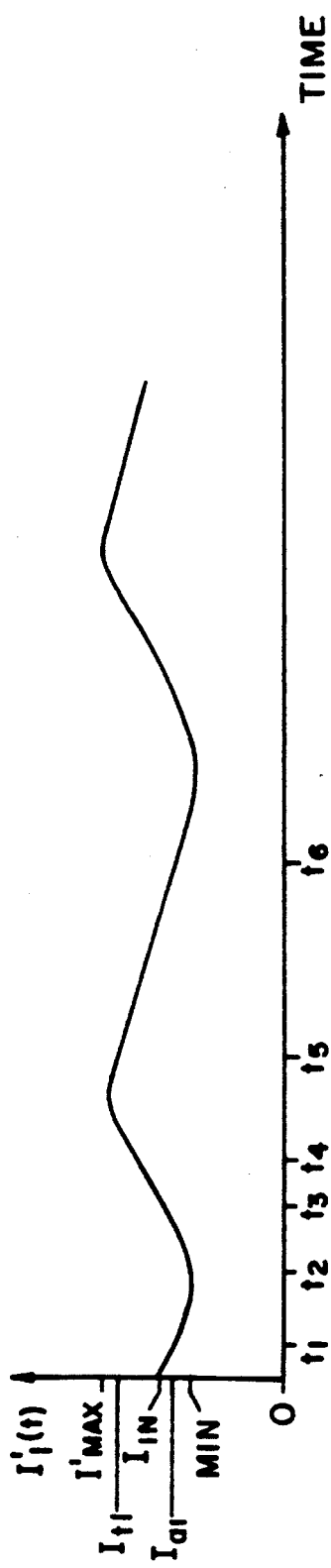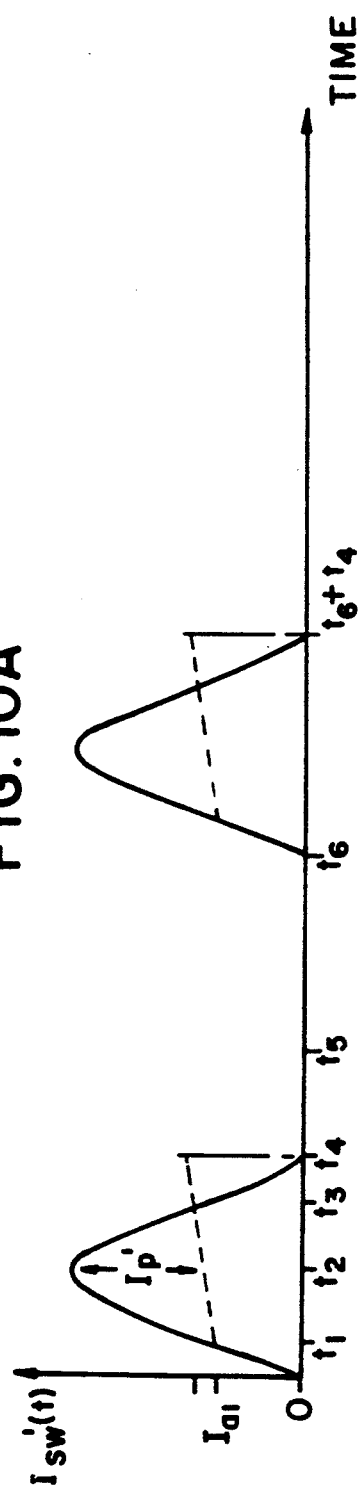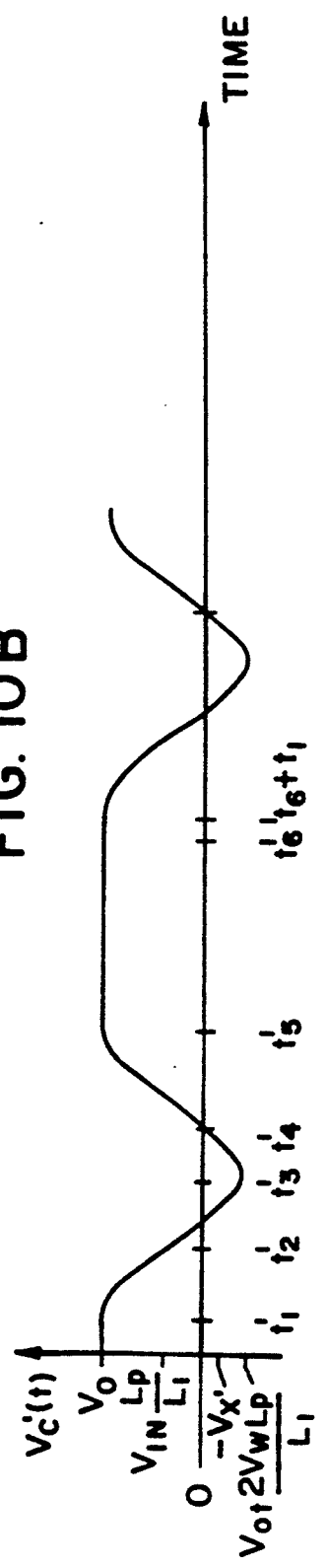

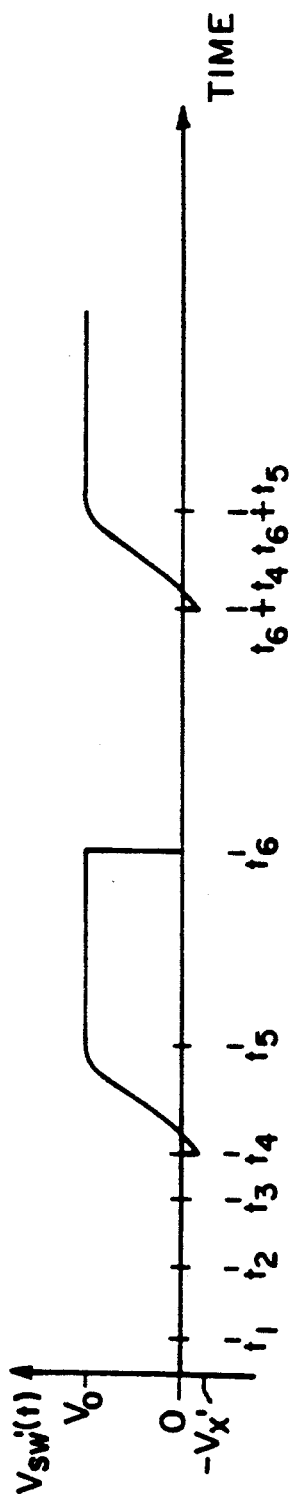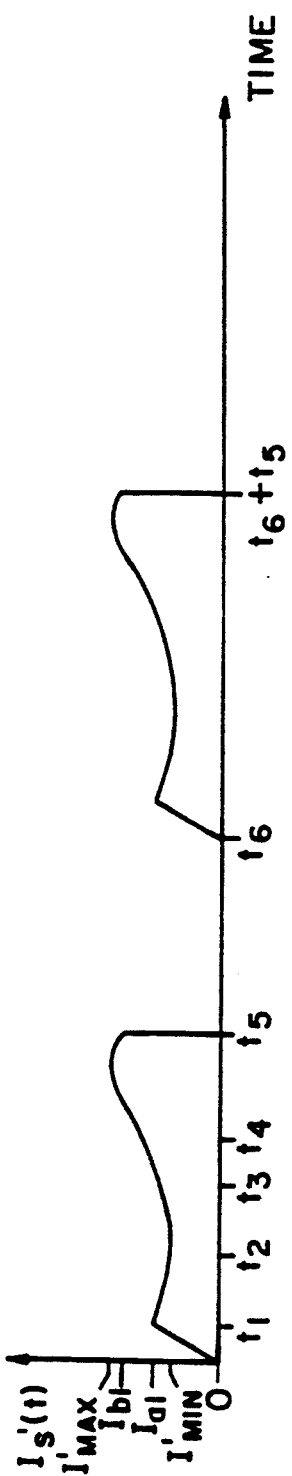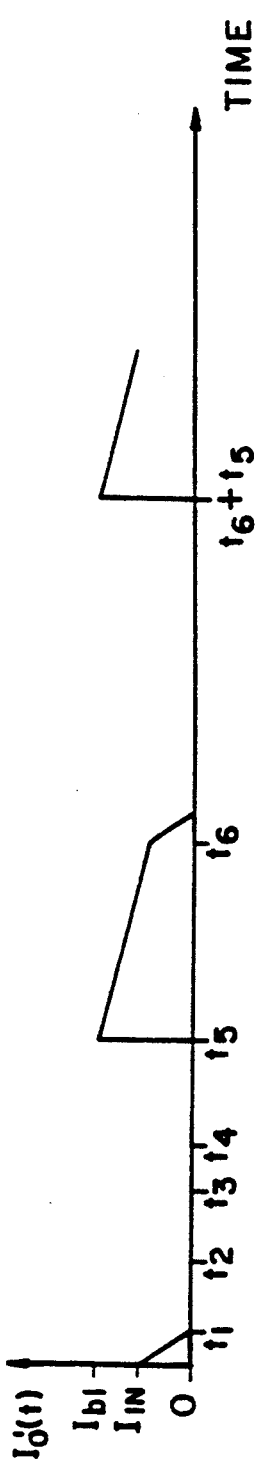

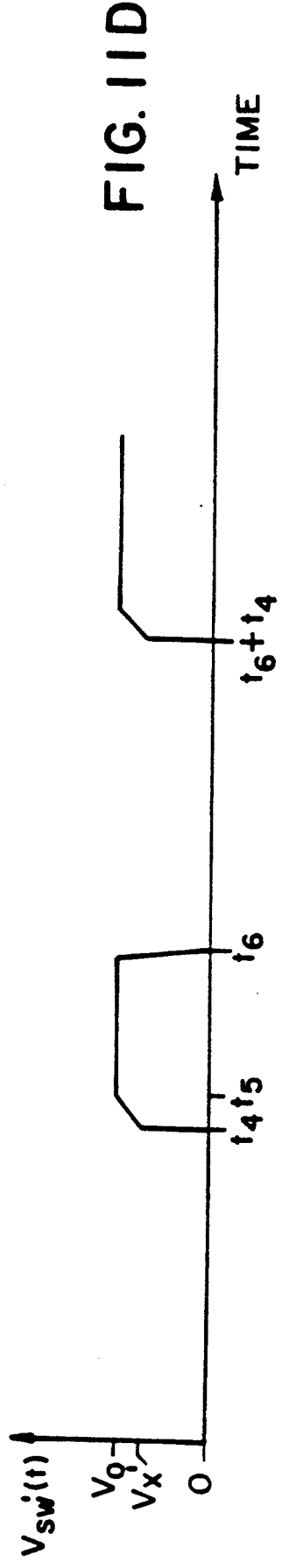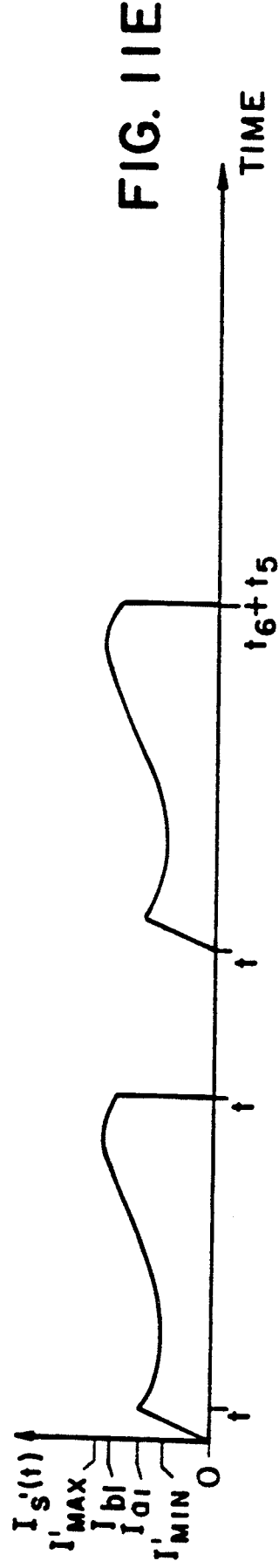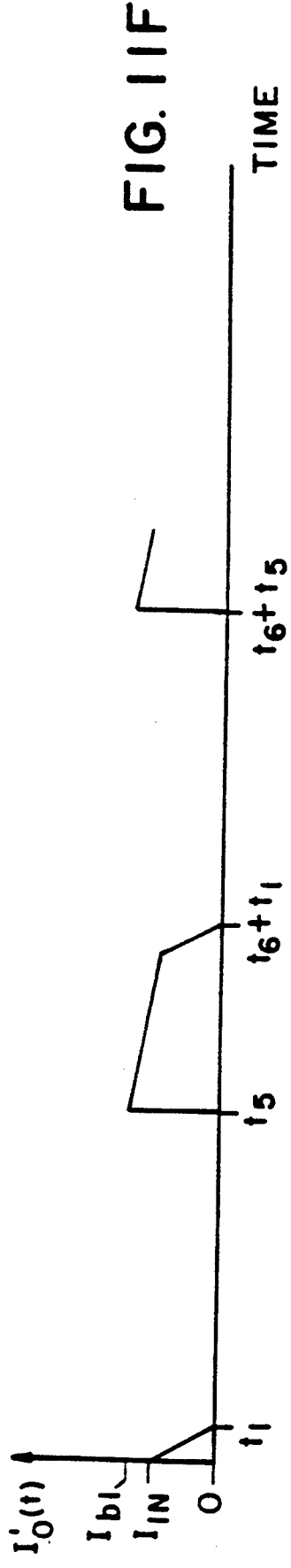

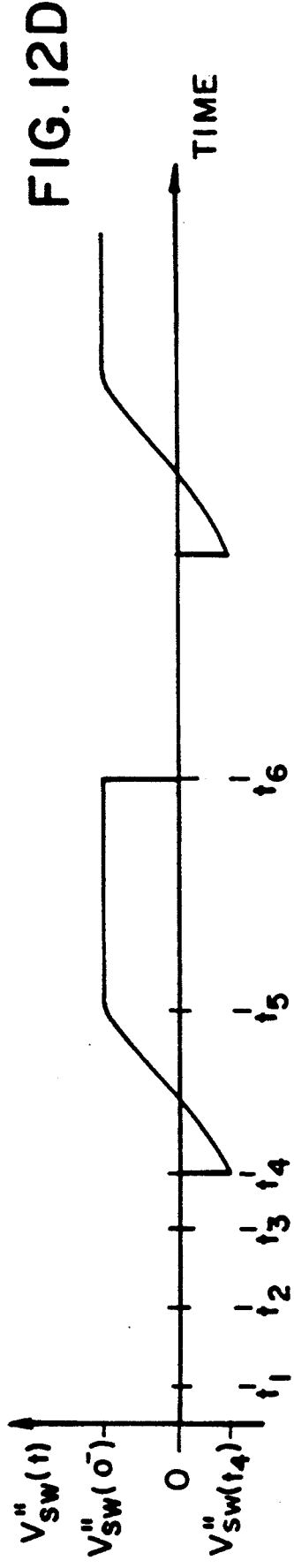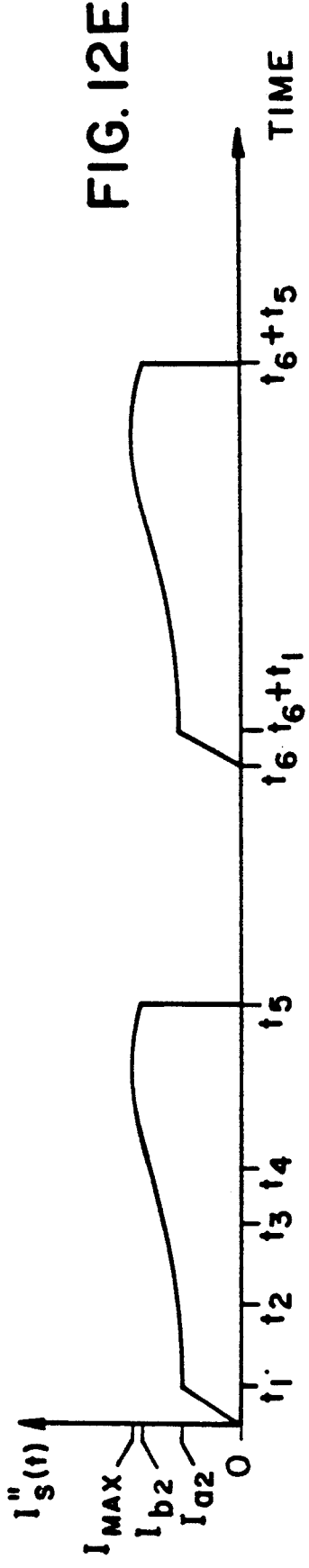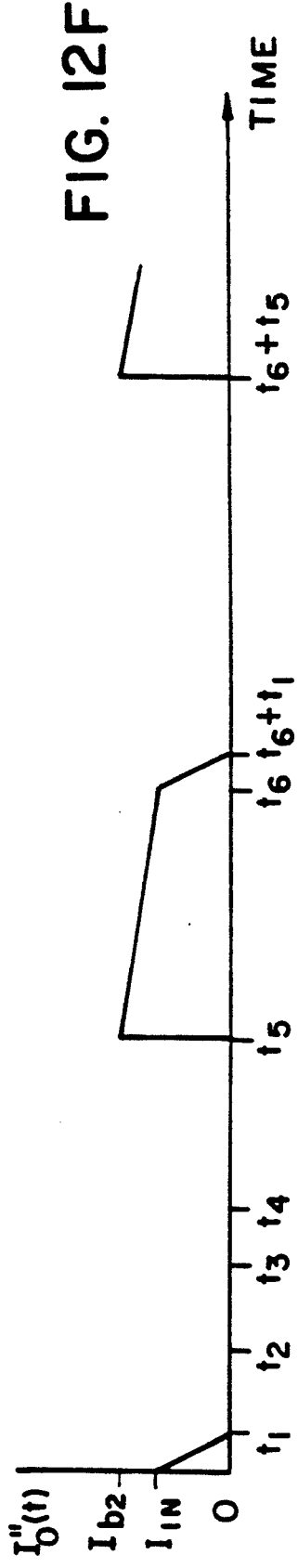

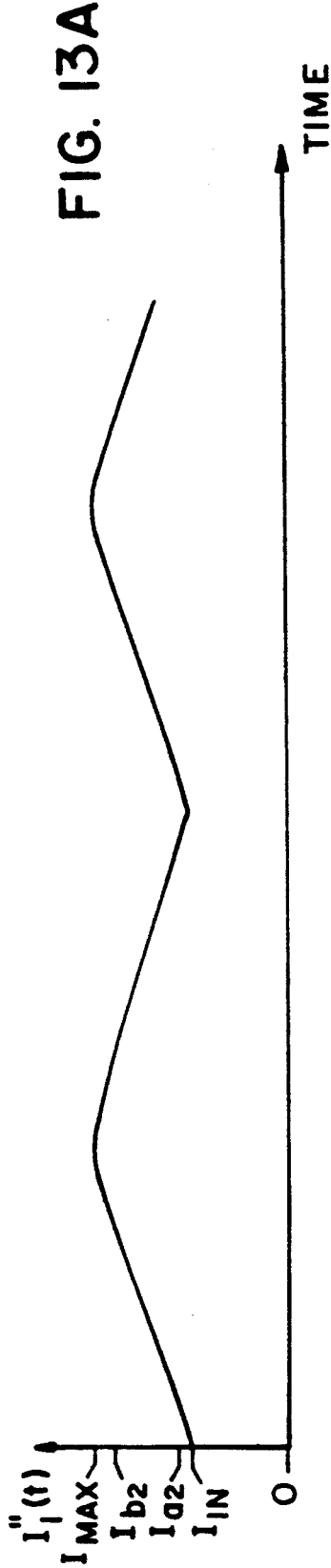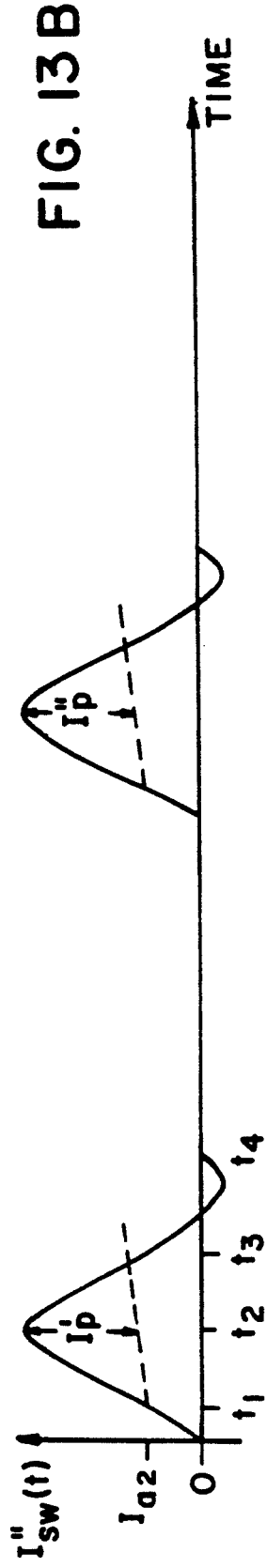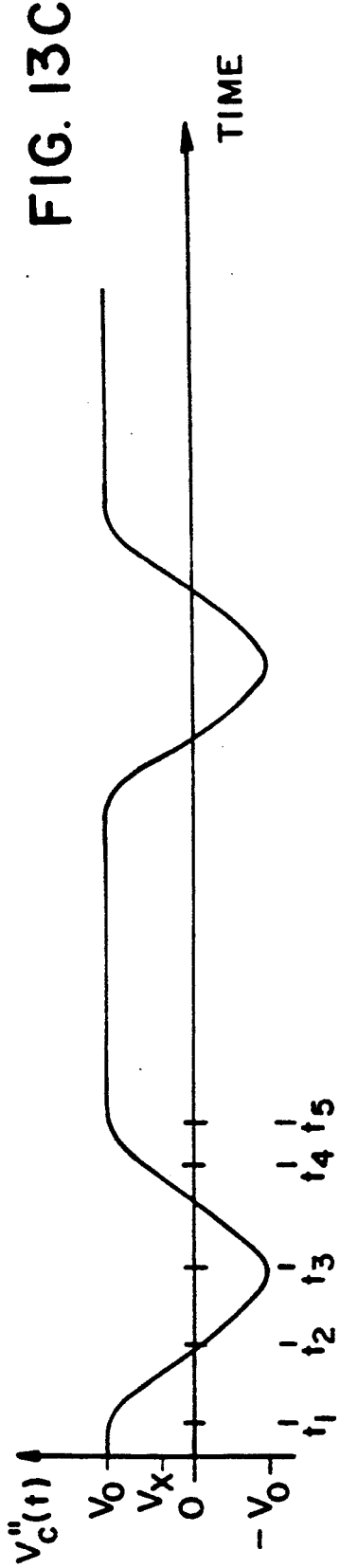

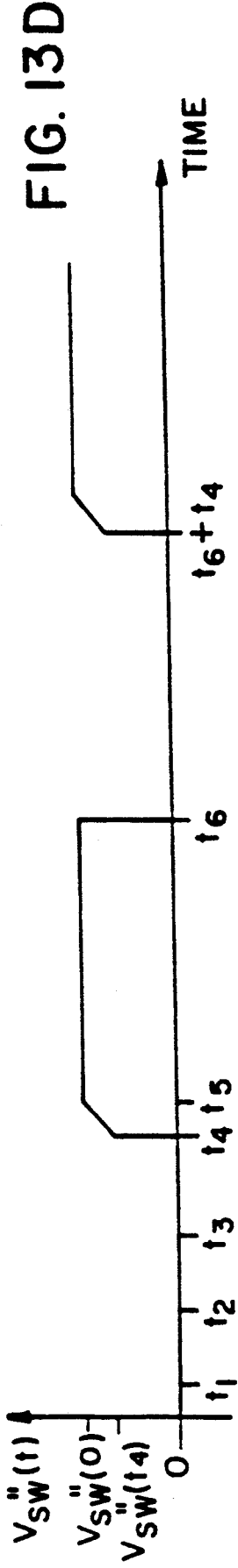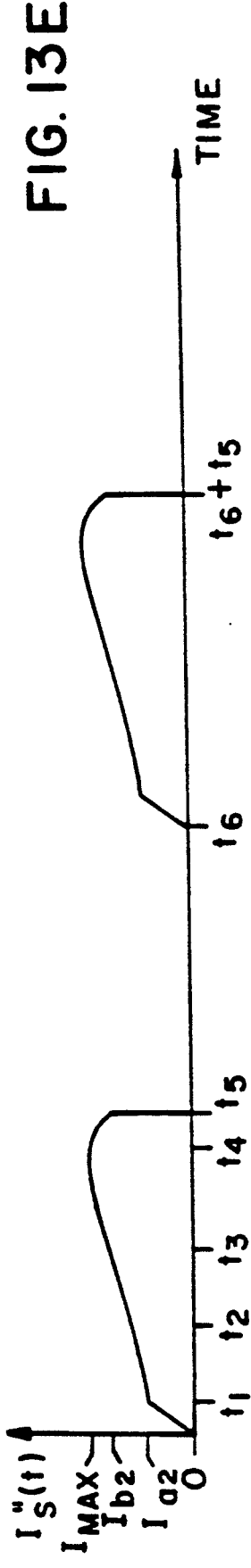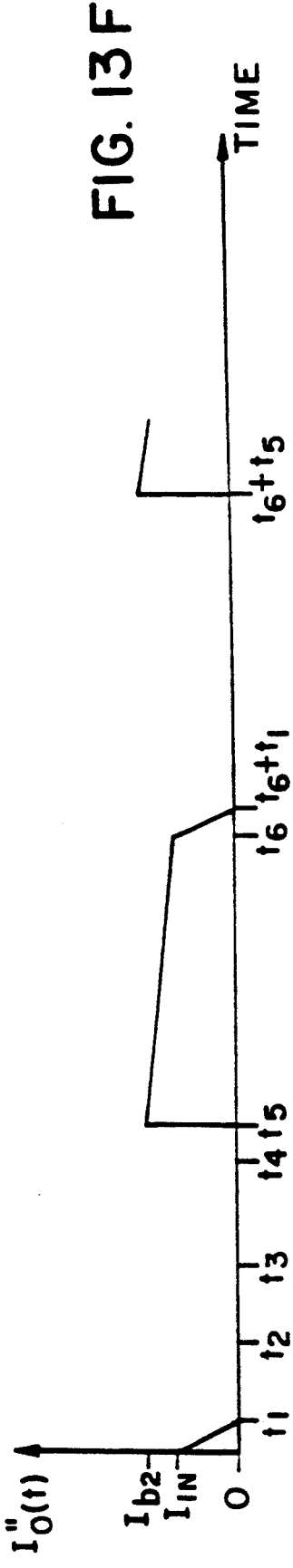

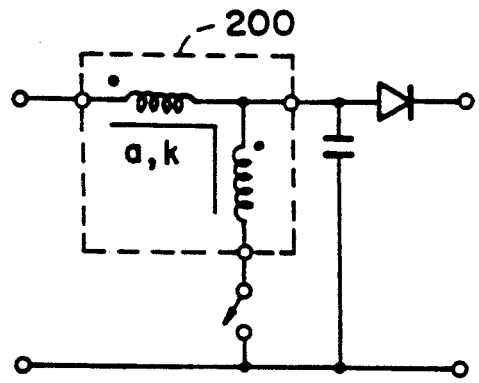
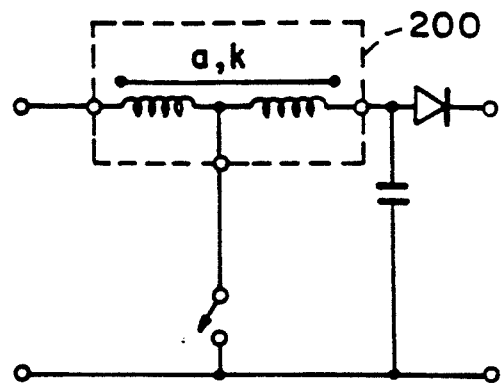
FIG. 15A  FIG. 15B
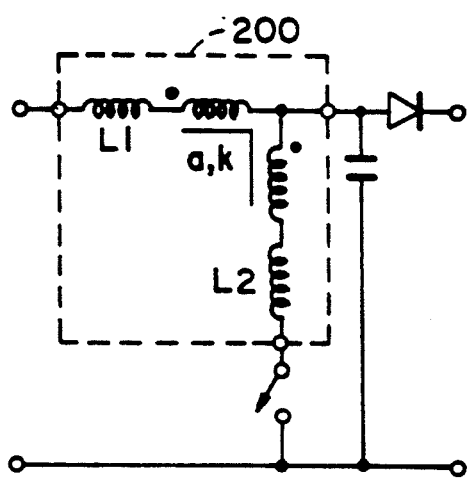
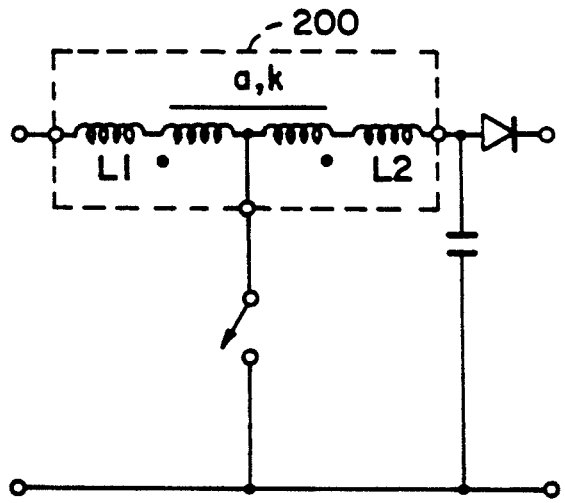
FIG. 15C  FIG. 15D
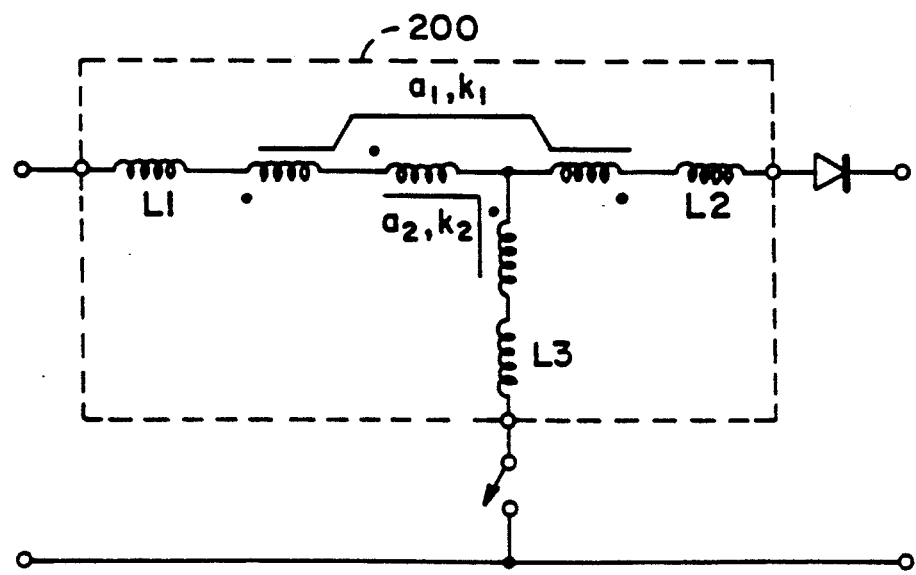
FIG. 15E

| Case | $V_{sw}$ at $t=0^-$ |
|---|---|
| General | $V_{sw}(0^-) = V_o + \dfrac{Lm}{a(Lm + Ll1)}(V_o - V_{in})$ |
| Equally Coupled: $k1 = k2 = k$ | $V_{sw}(0^-) = V_o + \dfrac{k}{a}(V_o - V_{in})$ |
| Tightly Coupled: $k1 = k2 = k$ $k$ approaches 1 | $V_{sw}(0^-) = V_o + \dfrac{1}{a}(V_o - V_{in})$ |
| Zero Coupling (Discrete): $k = 0$ $L_{pri} = a^2 L_{sec}$ | $V_{sw}(0^-) = V_o$ |

FIG. 19

| Case | $V_{sw}$ at $t=0^-$ |
|---|---|
| General | $V_{sw}(0^-) = V_o + \dfrac{Lm(a-1) - a^2 Ll2}{Lm(a-1)^2 + a^2(Ll1 + Ll2)}(V_o - V_{in})$ |
| Equally Coupled:<br>$k1 = k2 = k$ | $V_{sw}(0^-) = V_o + \dfrac{ak-1}{a^2 - 2ak + 1}(V_o - V_{in})$ |
| Tightly Coupled:<br>$k1 = k2 = k$<br>$k$ approaches 1 | $V_{sw}(0^-) = V_o + \dfrac{V_o - V_{in}}{a - 1}$ |
| Zero Coupling (Discrete):<br>$k = 0$<br>$Lpri = a^2 Lsec$ | $V_{sw}(0^-) = V_o - \dfrac{V_o - V_{in}}{a^2 + 1}$ |

FIG. 20

| Case | Leq | Voc |
|---|---|---|
| General | $$L2\left[\dfrac{L1(1+\dfrac{a^2 L2}{Lm})+a^2 L2}{(a+1)^2 Lm+a^2(L1+L2)}\right]$$ | $$V_{in}\dfrac{(a+1)Lm+a^2 L2}{(a+1)^2 Lm+a^2(L1+L2)}$$ |
| Equally Coupled: $k1 = k2 = k$ | $$\dfrac{Lpri(1-k^2)}{a^2+2ka+1} = \dfrac{L1(1+k)}{a^2+2ka+1}$$ | $$V_{in}\dfrac{1+ka}{a^2+2ka+1}$$ |
| Tightly Coupled: $k1 = k2 = k$ $k$ approaches 1 | $$\dfrac{2L1}{(a+1)^2}$$ | $$\dfrac{V_{in}}{1+a}$$ |
| Zero Coupling (Discrete): $k = 0$ $Lpri = a^2 Lsec$ | $$\dfrac{Lpri}{a^2+1} = \dfrac{L1}{a^2+1}$$ | $$\dfrac{V_{in}}{a^2+1}$$ |

FIG. 21A

| Case | Leq | Voc |
|---|---|---|
| General | $L_{l2} + \frac{1}{a^2} \frac{L_{l1} \cdot L_m}{L_{l1} + L_m}$ | $\frac{V_{in}}{a} \frac{L_m}{L_m + L_{l1}}$ |
| Equally Coupled: $k1 = k2 = k$ | $L_{sec}(1-k^2) = L_{l2}(1+k)$ | $V_{in} \frac{k}{a}$ |
| Tightly Coupled: $k1 = k2 = k$ $k$ approaches 1 | $2L_{l2}$ | $\frac{V_{in}}{a}$ |
| Zero Coupling (Discrete): $k = 0$ $L_{pri} = a^2 L_{sec}$ | $L_{sec} = L_{l2}$ | 0 |

FIG. 22A

L - CONFIGURATION CONVERTER (FIGURES 7, 17, AND 21)

| Case | Isw(t) During Energy Transfer Phase |
|---|---|
| Equally Coupled: $k1 = k2 = k$ | $Isw(t) = Ia + Vin \frac{a^2}{Lpri(a^2+2ak+1)}(t-t1)$ $+ \frac{a(a+k)}{a^2+2ak+1}\sqrt{\frac{C}{Leq}}(Vo - Vin\frac{1+ak}{a^2+2ak+1})\sin(\omega_{eq}(t-t1))$ |
| Tightly Coupled: $k1 = k2 = k$ $k$ approaches 1 | $Isw(t) = Ia + Vin \frac{a^2}{Lpri(a+1)^2}(t-t1)$ $+ \frac{a}{a+1}\sqrt{\frac{C}{Leq}}(Vo - Vin\frac{1}{a+1})\sin(\omega_{eq}(t-t1))$ |
| Zero Coupling (Discrete): $k = 0$ $Lpri = a^2 Lsec$ | $Isw(t) = Ia + Vin \frac{a^2}{Lpri(a^2+1)}(t-t1)$ $+ \frac{a^2}{a^2+1}\sqrt{\frac{C}{Leq}}(Vo - Vin\frac{1}{a^2+1})\sin(\omega_{eq}(t-t1))$ |

FIG. 23

L - CONFIGURATION CONVERTER (FIGURES 8, 18, AND 22)

| Case | Isw(t) During Energy Transfer Phase |
|---|---|
| Equally Coupled: $k1 = k2 = k$ | $Isw(t) = Ia + \frac{Vin}{Lpri}(t - t1) + \frac{a-k}{a}\sqrt{\frac{C}{Leq}}(Vo - Vin\frac{k}{a})\sin(\omega_{eq}(t - t1))$ |
| Tightly Coupled: $k1 = k2 = k$ $k$ approaches 1 | $Isw(t) = Ia + \frac{Vin}{Lpri}(t - t1) + \frac{a-1}{a}\sqrt{\frac{C}{Leq}}(Vo - Vin\frac{1}{a})\sin(\omega_{eq}(t - t1))$ |
| Zero Coupling (Discrete): $k = 0$ $Lpri = a^2 Lsec$ | $Isw(t) = Ia + \frac{Vin}{Lpri}(t - t1) + Vo\sqrt{\frac{C}{Leq}}\sin(\omega_{eq}(t - t1))$ |

FIG. 24

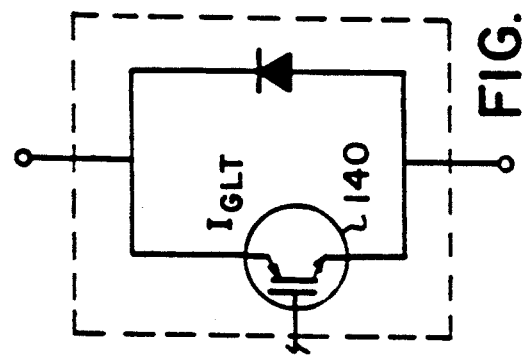
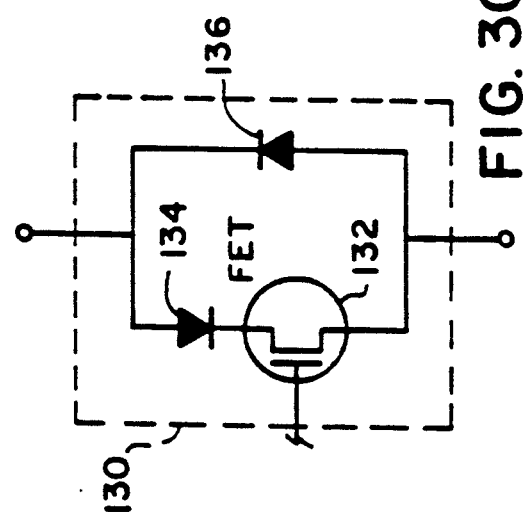
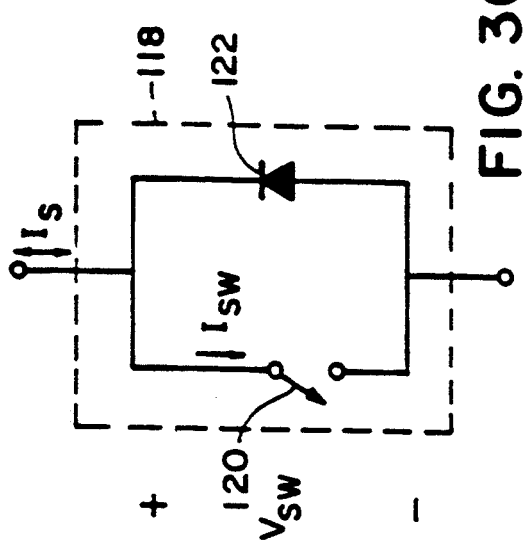
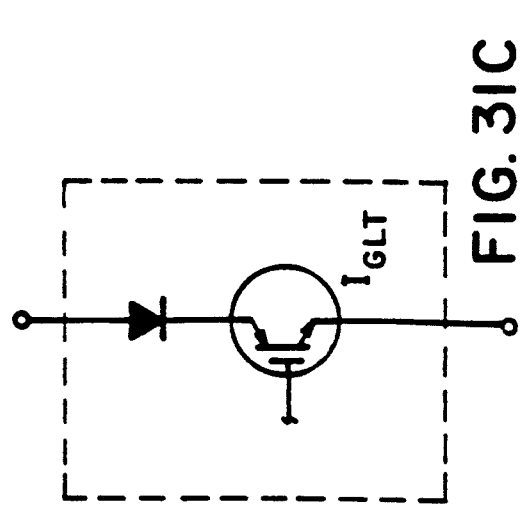
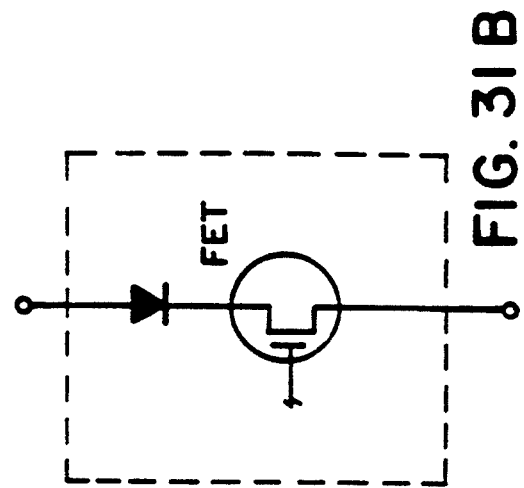
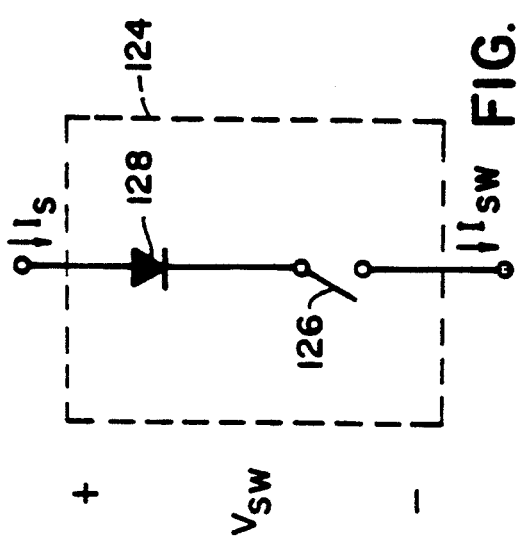

BOOST SWITCHING POWER CONVERSION

This application is a continuation in part of U.S. patent application Ser. No. 07/666,878, filed Mar. 8, 1991, now abandoned.

BACKGROUND OF THE INVENTION

This invention relates to boost switching power converters.

Boost switching power converters accept power from an input voltage source and deliver power to a load at a controllable load voltage value which is greater than the voltage delivered by the input source. Such converters are useful in applications where a load must be supplied with a voltage greater in magnitude than the available source voltage, or where the magnitude of the voltage delivered by an input source may, under either steady-state or transient conditions, drop below the minimum value of operating voltage required by the load. In one increasingly important application, a boost switching converter forms the core element of a power factor correcting AC to DC preregulator. In such preregulators, an AC voltage source is rectified and delivered to the input of a boost switching power converter. The boost switching power converter is controlled so as to maintain the load voltage at or above both the peak value of the AC source voltage and the minimum operating voltage of the load, while simultaneously forcing the boost converter input current to follow the time varying periodic waveform of the AC source. In this way, the voltage delivered by the boost switching converter is controlled to be within the operating voltage range of the load, while the power factor presented to the AC source is kept at essentially unity. Examples of preregulators of this type are described in Wilkerson, U.S. Pat. No. 4,677,366, Williams, U.S. Pat. No. 4,940,929, and Vinciarelli, U.S. patent application Ser. No. 07/642,232, filed Jan. 16, 1991. One such prior art boost switching converter is shown in FIG. 1. In the Figure, an input inductor 12 is connected in series with an input voltage source 14, of magnitude Vin, and a switch 16. A diode 18, connected between the junction of the input inductor and the switch, is poled to carry current towards an output capacitor 20 and a load 22. In operation, the frequency at which the switch 16 is turned on and off during a converter operating cycle is fixed, and the duty cycle of the switch (i.e., the fraction, D, of the time that the switch is on during an operating cycle) is varied as a means of controlling the converter output voltage, Vo. The inductor smooths the input current, I1, keeping it essentially constant throughout the operating cycle, and the output capacitor smooths the effect of variations in the current Io so that the converter delivers an essentially DC output voltage. When the switch is on, the voltage across the switch is zero (assuming ideal circuit elements) and all of the input current flows losslessly in the switch; when the switch is off all of the input current flows through the diode toward the capacitor and the load and the voltage across the switch is equal to the output voltage Vo. Under steady state conditions, the average voltage across the input inductor must be zero, else the average value, Iin, of the input current, I1, will vary. Thus, the average value of the voltage across the switch, $(1-D) \cdot Vo$, must equal Vin, hence $Vo = Vin/(1-D)$. Since D must be between zero and one, $Vo > Vin$. In prior art boost switching converters of the kind illustrated in FIG. 1, neither the switch nor the diode is ideal, and both elements contribute to converter losses. When the switch is turned on it is exposed to both the current flowing in the input inductor and to a reverse current which flows from the output capacitor back through the diode during the diode reverse recovery time. Switch turn-off occurs when the switch is carrying the full converter input current. Since both the rise and fall time of the switch are finite, the presence of switch voltage and current during the switch transition times will cause power to be dissipated in the switch, and, all other conditions being equal, these switching losses will increase directly with converter operating frequency. Thus, although increased operating frequency is desirable in that it allows reducing the size of the input inductor and the output capacitor (and hence the size of the converter), prior art converters inherently must trade power density against operating efficiency. As a practical matter, as the operating frequency of a prior art boost switching power converter is raised much beyond 100 KHz, efficiency declines rapidly and the thermal and electrical stresses on the switch become unmanageable. Another characteristic of prior art boost switching converters is that two or more units connected to a common input source and load will not inherently share load power if operated synchronously. Current sharing between units connected in this way is first-order dependent on second-order effects (e.g., diode voltage drops, switch impedance).

SUMMARY OF THE INVENTION

A zero-current switching boost converter according to the present invention offers improved performance over prior art converters. By essentially eliminating switching losses, a zero-current switching boost converter reduces losses in, and stresses on, the switching elements included within the converter and overcomes the operating frequency barrier exhibited by prior art converters. As a result, a zero-current switching boost converter can be operated at higher converter operating frequencies than a prior art converter with a corresponding improvement in converter power density. A zero-current switching boost switching converter incorporates the natural power sharing mechanism inherent to quantized power converters (note Vinciarelli, U.S. Pat. No. 4,648,020), thereby allowing two or more such converters to simultaneously supply power to a common load, with each converter carrying an essentially fixed share of the total load power.

Thus, in general, in one aspect, the invention features apparatus for controlling transfer of power from an input current source to an output voltage sink. The apparatus includes a switch for controllably permitting or inhibiting delivery of current from the source to the output sink when the switch is, respectively, off or on; circuit elements defining a characteristic time scale for the time variation of the flow of current in the switch after the switch is turned on; a switch controller for turning the switch on and off at times when the current in the switch is zero, the turn on times being controlled to regulate the ratio of the voltage across the output voltage sink to the average value of voltage across the input source, the ratio being greater than or equal to one, and a unidirectional conducting device poled to permit current flow into the output voltage sink after the switch is opened and to prevent current flow in reverse from the output voltage sink back toward the input source.

The invention includes the following preferred embodiments.

The circuit elements which define the characteristic time scale are an inductor and a capacitor. In some embodiments, the inductor and the switch form a series circuit and the capacitor is connected in parallel with the series circuit. In other embodiments, the inductor and the capacitor form a series leg connected in parallel with the switch. The first inductance and the first capacitor define the characteristic time scale as Tc=pi.sqrt(L1.C), for the sinusoidal component of the switch current which flows after turning the switch on.

In some embodiments, the controller is arranged to turn the switch off at essentially the first instant in time, following the time when the switch is turned on, when the current in the switch returns to zero. In other embodiments, the switch is turned off at essentially the second instant in time when the current in the switch returns to zero.

In general, in another aspect, the invention features a boost power converter apparatus in which a switch is connected in series with the input source and with a portion of a magnetic circuit, a first capacitor is connected between the magnetic circuit and the junction of the switch and the input source, a portion of the magnetic circuit thereby being connected in series with the capacitor and the switch. The capacitor and the magnetic circuit cooperate with the magnetic circuit to define a characteristic time constant for the time variation of the sinusoidal component of the switch current which flows after the switch is closed.

Preferred embodiments of the invention include the following features. The magnetic circuit comprises an input terminal, an output terminal and a shunt terminal, the input source being connected to the input terminal, the switch being connected to the shunt terminal and the first capacitor and the first unidirectional conducting device being connected to the output terminal. In some embodiments, the magnetic circuit comprises a first discrete inductor connected between the input terminal and the shunt terminal, and a second discrete inductor connected between the shunt terminal and the output terminal. In other embodiments, the magnetic circuit comprises a first discrete inductor connected between the input terminal and the output terminal, and a second discrete inductor connected between the shunt terminal and the output terminal.

In some embodiments, the magnetic circuit comprises a coupled inductor having a first winding and a second winding, the first winding being connected between the input terminal and the shunt terminal, the second winding being connected between the shunt terminal and the output terminal, the polarity of the windings being arranged so that imposition of a positive voltage between the input terminal and the shunt terminal induces a positive voltage to appear between the output terminal and the shunt terminal. In other embodiments, the magnetic circuit comprises a coupled inductor having a first winding and a second winding, the first winding being connected between the input terminal and the output terminal, the second winding being connected between the shunt terminal and the output terminal, the polarity of the windings being arranged so that imposition of a positive voltage between the input terminal and the output terminal induces a positive voltage to appear between the output terminal and the shunt terminal.

The magnetic circuit may also include a discrete inductor connected in series with the first winding, or in series with the second winding. The magnetic circuit may include a second coupled inductor having a third winding and a fourth winding, the third winding connected to the input terminal and in series with the first winding and the fourth winding connected between the junction of the first and second windings and the output terminal. A discrete inductor may be connected in series with the third winding or with the fourth winding.

In some embodiments, the switch comprises a bidirectional two-terminal switch capable of carrying bipolar current when on and capable of withstanding a unipolar voltage when off, the bidirectional two-terminal switch comprising a unipolar switch capable of withstanding a unipolar voltage when turned off, the polarity of the unipolar voltage defining positive and negative poles on the switch, and capable of carrying a unipolar current, when turned on, between the positive and negative poles; and a first unidirectional conducting device connected in parallel with the unipolar switch, the first unidirectional conducting device being poled so that it conducts current in a direction opposite of that which can be carried by the unipolar switch.

In other embodiments of the bidirectional two-terminal switch, the first unidirectional conducting device is connected in series with the unipolar switch, the first unidirectional conducting device being poled so that it conducts current in the same direction as the unipolar switch.

The unipolar switch may comprise a bipolar transistor, a field effect transistor, an insulated gate bipolar transistor, or (in the case of a parallel connection between the unidirectional conducting device and the unipolar switch) a field effect transistor in series with a second unidirectional conducting device, the second unidirectional conducting device being poled so that it carries current in the same direction as the field effect transistor.

In general, in another aspect, the invention features a boost power converter apparatus for transferring power from an input voltage source to a load at a load voltage of magnitude greater than the magnitude of the voltage of the input voltage source. An input inductance and a switching circuit (of the kind referred to above) are connected in series with the input voltage source.

In some embodiments, the converter includes an input inductance, of value L2, and the switching circuit connected in series with the input voltage source; and the first inductance, the input inductance, and the first capacitor define a characteristic time scale, Tc=pi.sqrt(Lp.C), where Lp=(L1.L2)/(L1+L2), for the sinusoidal component of the switch current which flows after turning the switch on.

In other embodiments, the first inductance and the first capacitor define a characteristic time scale, Tc=pi.sqrt(L1.C), for the sinusoidal component of the switch current which flows after turning the switch on.

In preferred embodiments, a unidirectional conduction device is connected to the source; e.g., a full-wave rectifier may be connected between an AC input source and the switching circuit. An output capacitor may be connected in parallel with the load, the capacitance of the output capacitor being large enough so that it smooths the effect of time variations in the output current delivered to the load so that the output voltage of the converter is an essentially DC value. An output voltage controller may be used to control the frequency of the switch turn-on times in response to the output voltage at the load. The output voltage controller may include a reference signal, indicative of a desired value of output voltage of the converter apparatus; a divider which delivers a second signal, indicative of actual output voltage of the converter apparatus; an error amplifier which compares the reference signal to the second signal and which delivers an output indicative of the difference between the desired value of converter output voltage and the actual converter output voltage; and a variable frequency control circuit which accepts the output of the error amplifier and delivers a third signal to the switch controller, the third signal being indicative of the rate at which switch turn-on times are to be initiated so as to maintain the actual converter output voltage essentially equal to the desired value of converter output voltage.

In some embodiments, the output voltage controller is a power factor preregulating controller which maintains the output voltage at or above both the peak value of the voltage delivered by the AC source and the minimum operating voltage of the load while simultaneously forcing the input current drawn by the boost power converter to follow the time varying waveform of the AC source.

In general, in other aspects, the invention includes methods for controlling transfer of power.

Other advantages and features will become apparent from the following description of the preferred embodiment and from the claims.

DESCRIPTION

We first briefly describe the drawings.

Figure 2:
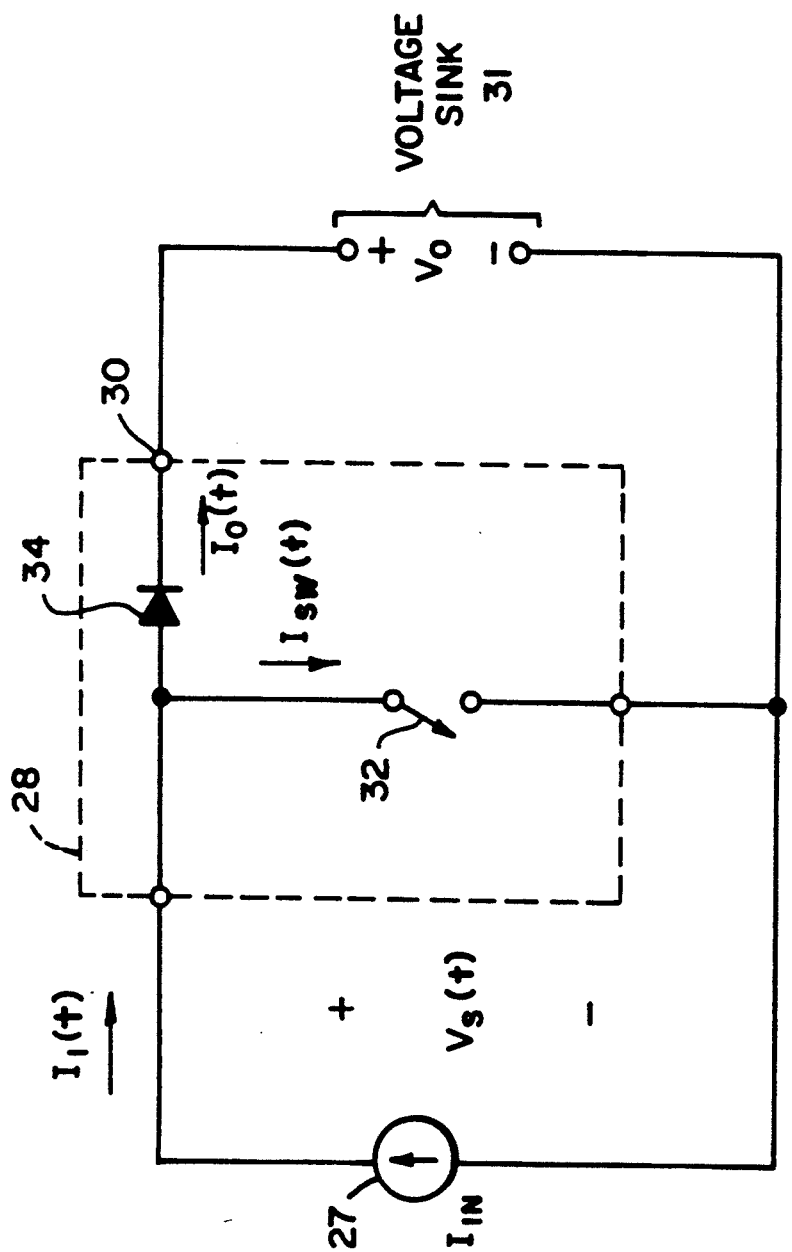
FIG. 2 shows a prior art current-commutating switch.
Figure 3A:
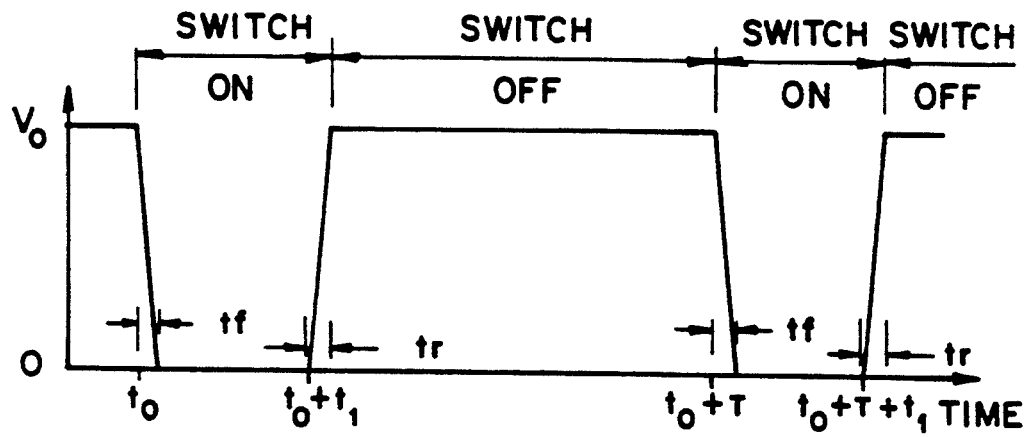
Figure 3B:
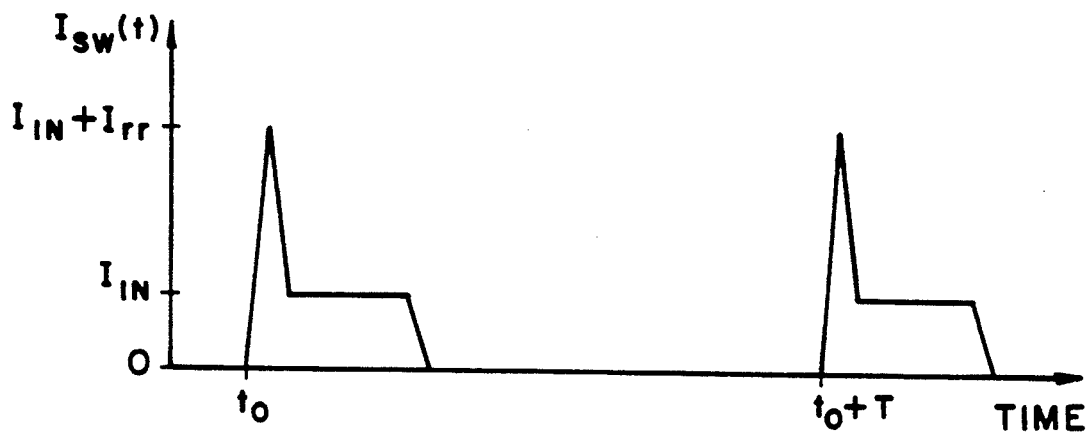
Figure 3C:
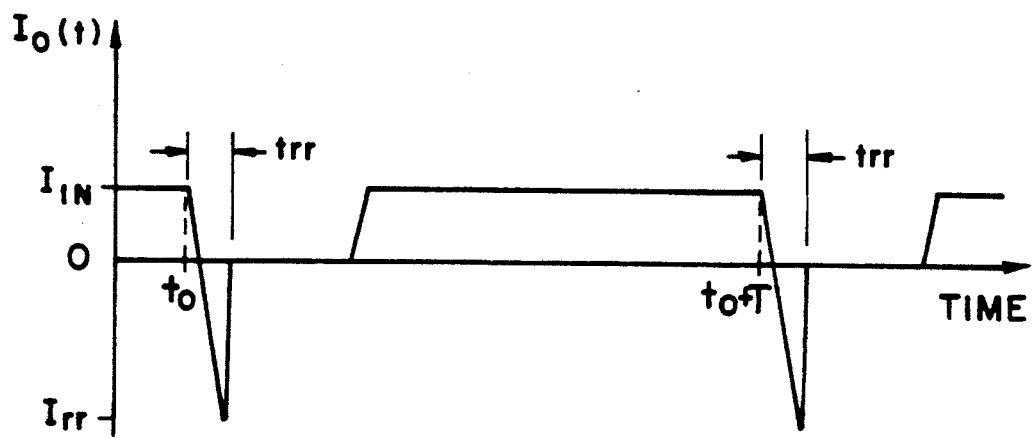

FIGS. 3A, 3B, and 3C show operating waveforms for the current-commutating switch of FIG. 2.

Figure 4A:
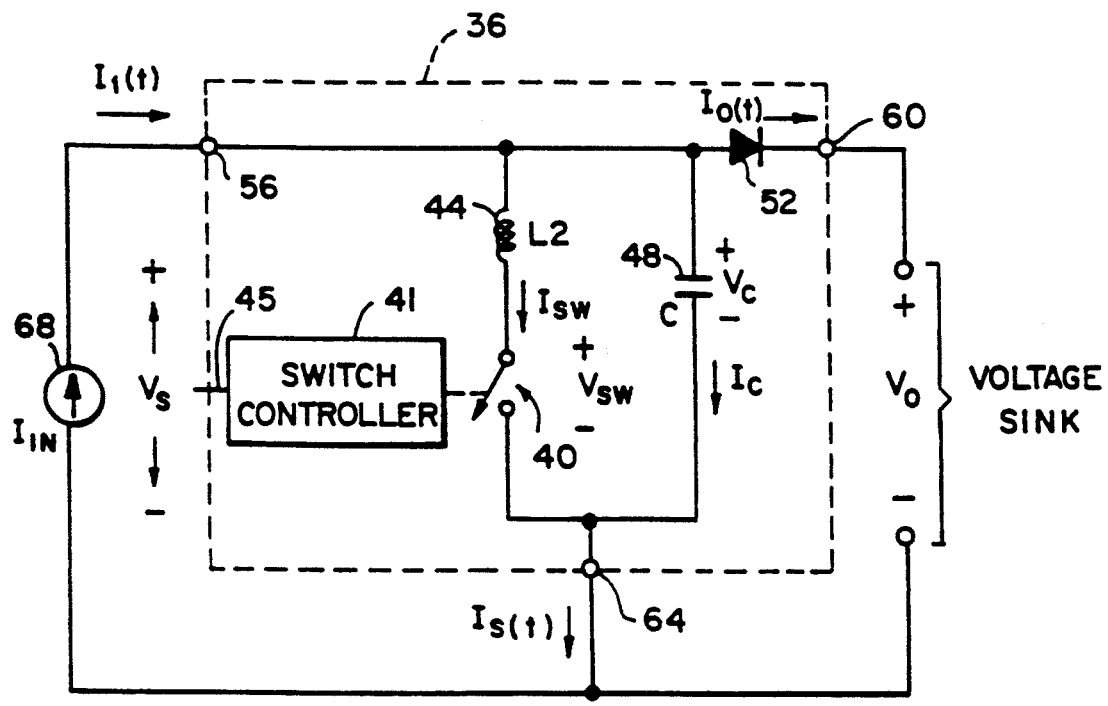
Figure 4B:
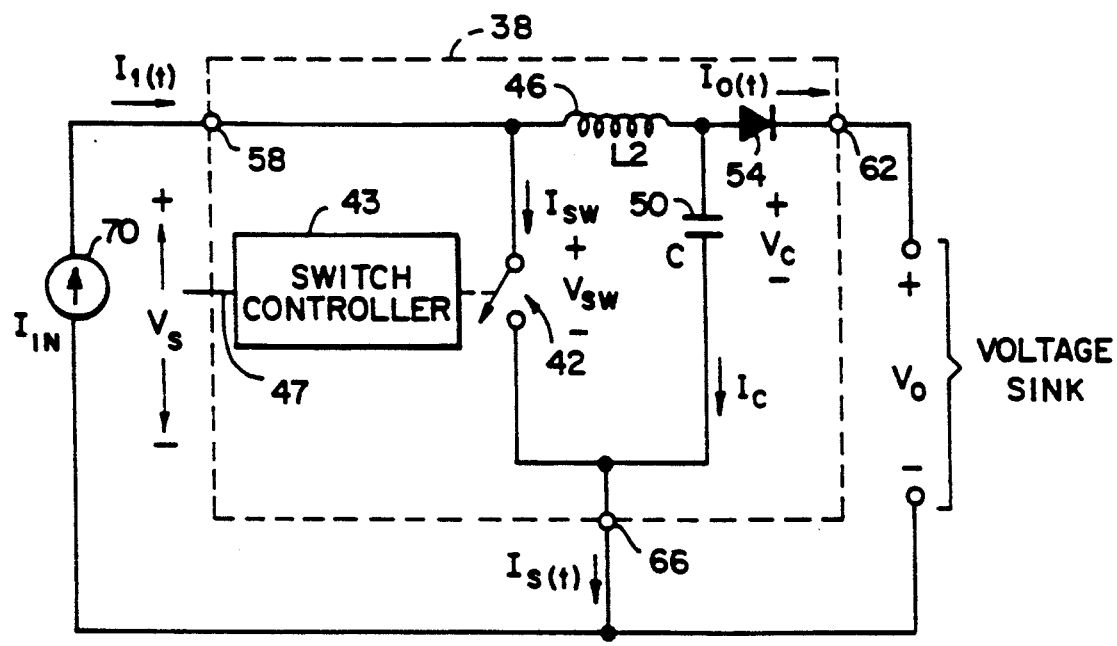

FIGS. 4A and 4B show two embodiments of a zero-current-switching current-commutating switch.

FIGS. 5A through 5F show operating waveforms for either of the switches of FIG. 4A or FIG. 4B in an operating mode called the short cycle mode.

FIGS. 6A through 6F show operating waveforms for either of the switches of FIG. 4A or FIG. 4B in an operating mode called the long cycle mode.

Figure 7:
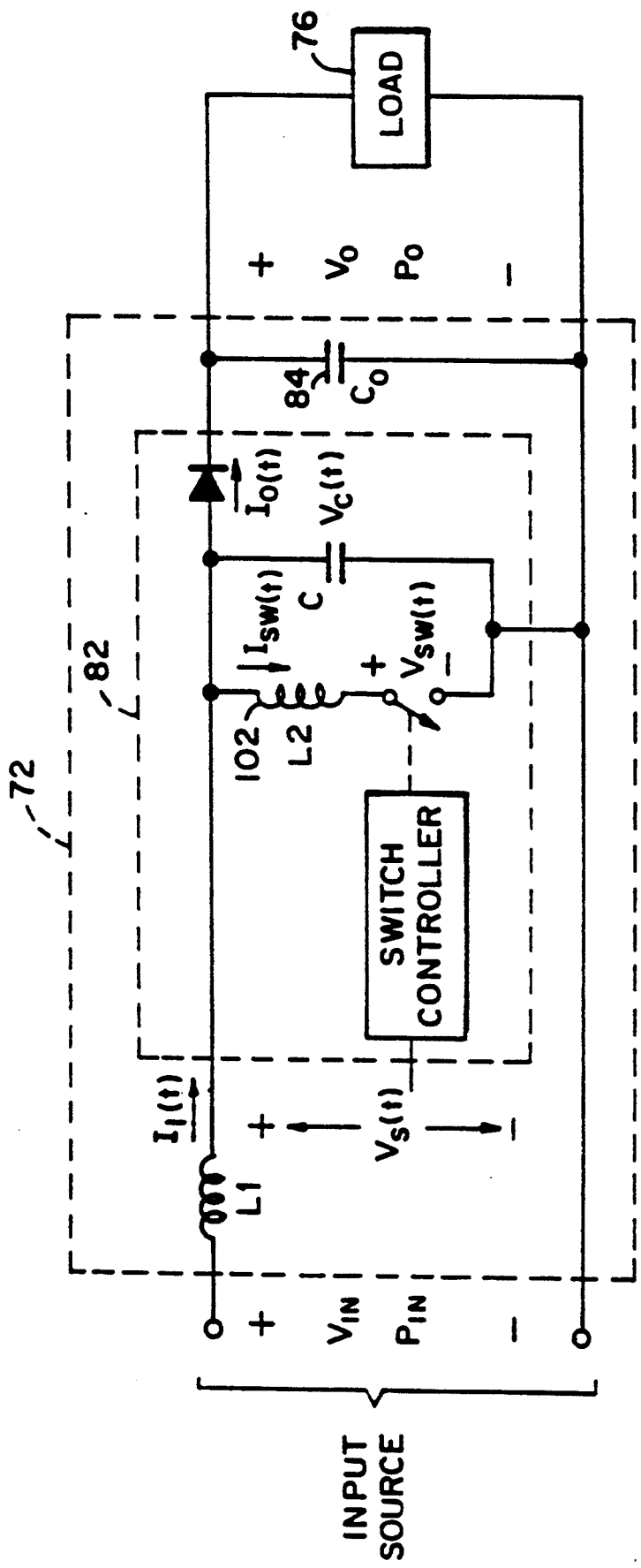

FIG. 7 is a zero-current-switching boost switching power converter which includes a zero-current-switching current-commutating switch of the kind shown in FIG. 4A.

Figure 8:
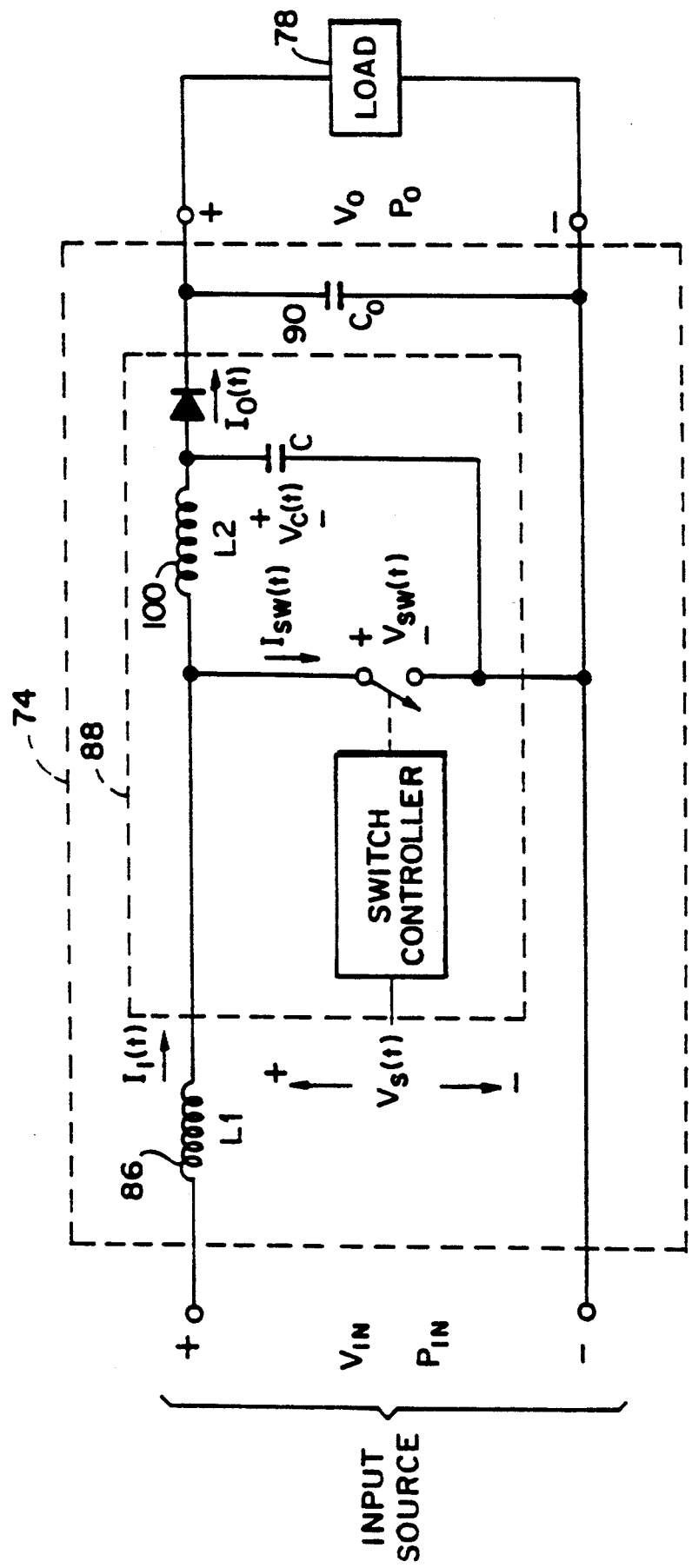

FIG. 8 is a zero-current-switching boost switching power converter which includes a zero-current-switching current-commutating switch of the kind shown in FIG. 4B.

Figure 9:
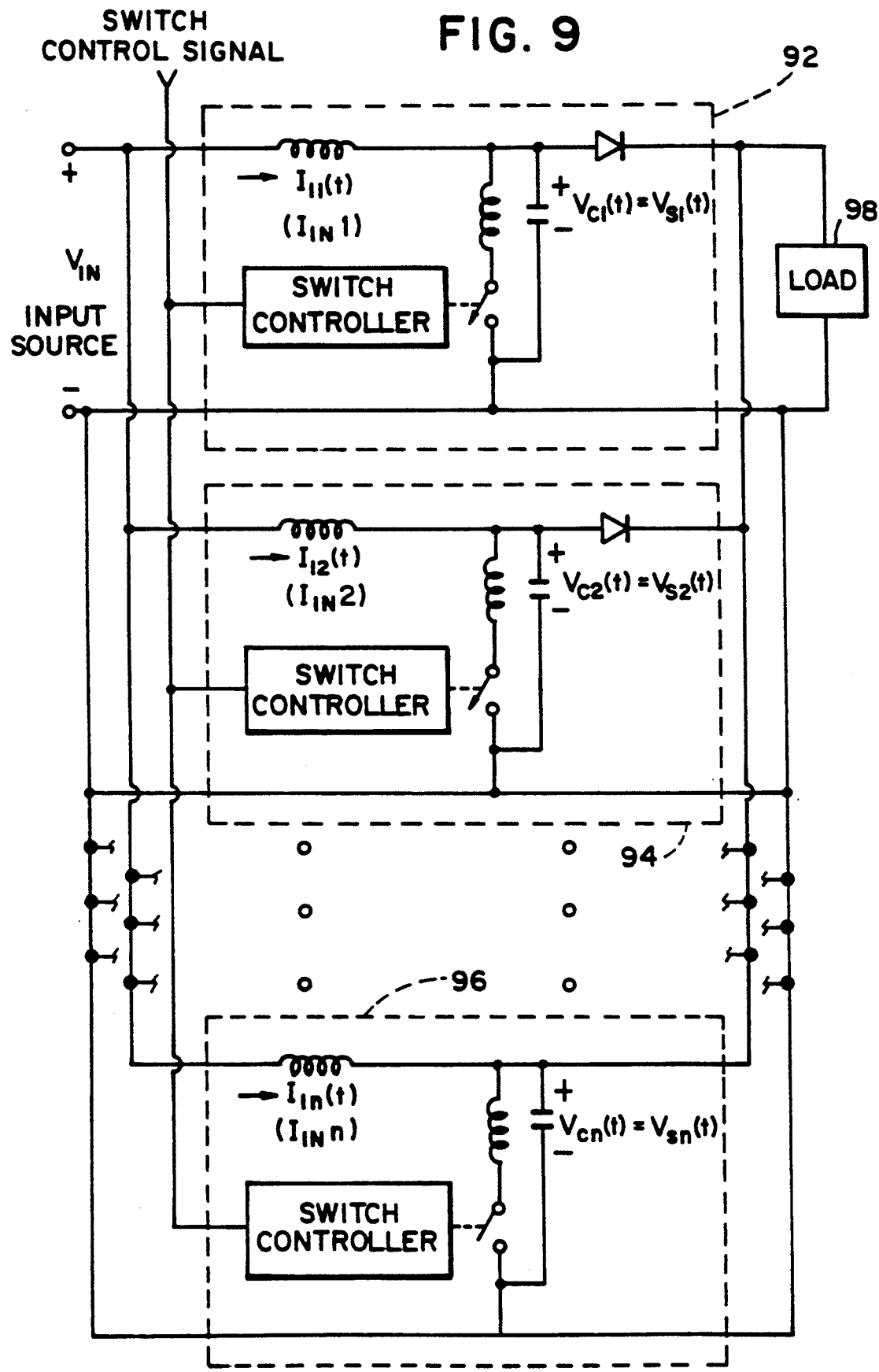

FIG. 9 shows an array of zero-current-switching boost switching power converters.

FIGS. 10A through 10F show waveforms for a converter of the kind shown in FIG. 7, operating in the short cycle operating mode, wherein the ratio of the inductance values, L1 and L2, is finite.

FIGS. 11A through 11F show waveforms for a converter of the kind shown in FIG. 7, operating int he long cycle operating mode, wherein the ratio of the inductance values, L1 and L2, is finite.

FIGS. 12A through 12F show waveforms for a converter of the kind shown in FIG. 8, operating in the short cycle operating mode, wherein the ratio of the inductance values, L1 and L2, is finite.

FIGS. 13A through 13F show waveforms for a converter of the kind shown in FIG. 8, operating in the long cycle operating mode, wherein the ratio of the inductance values, L1 and L2, is finite.

Figure 14:
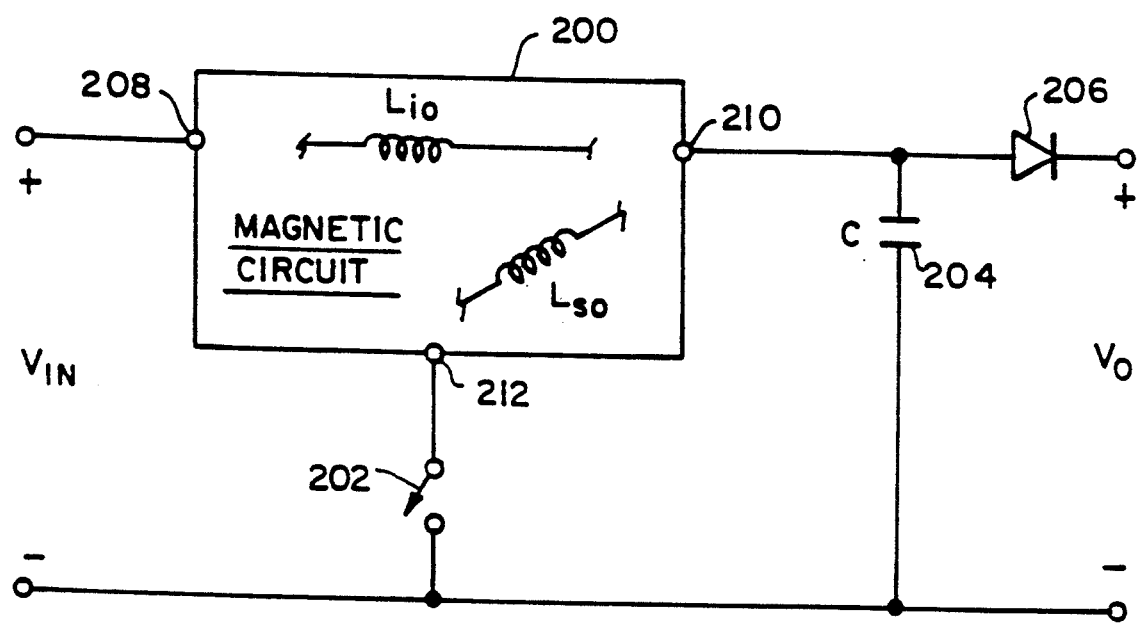

FIG. 14 is a generalized circuit model, illustrating a general magnetic circuit structure, for a zero-current switching boost converter.

FIG. 15A through 15E illustrate embodiments of zero-current switching boost converters which include coupled inductors.

Figure 16:
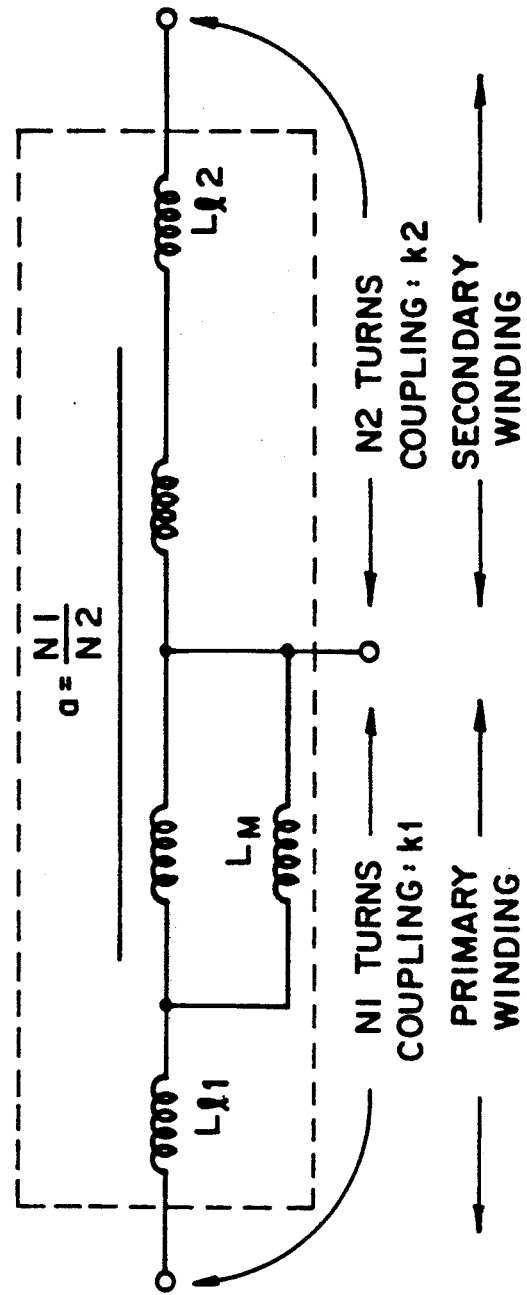

FIG. 16 is a circuit model for a coupled inductor.

Figure 17:
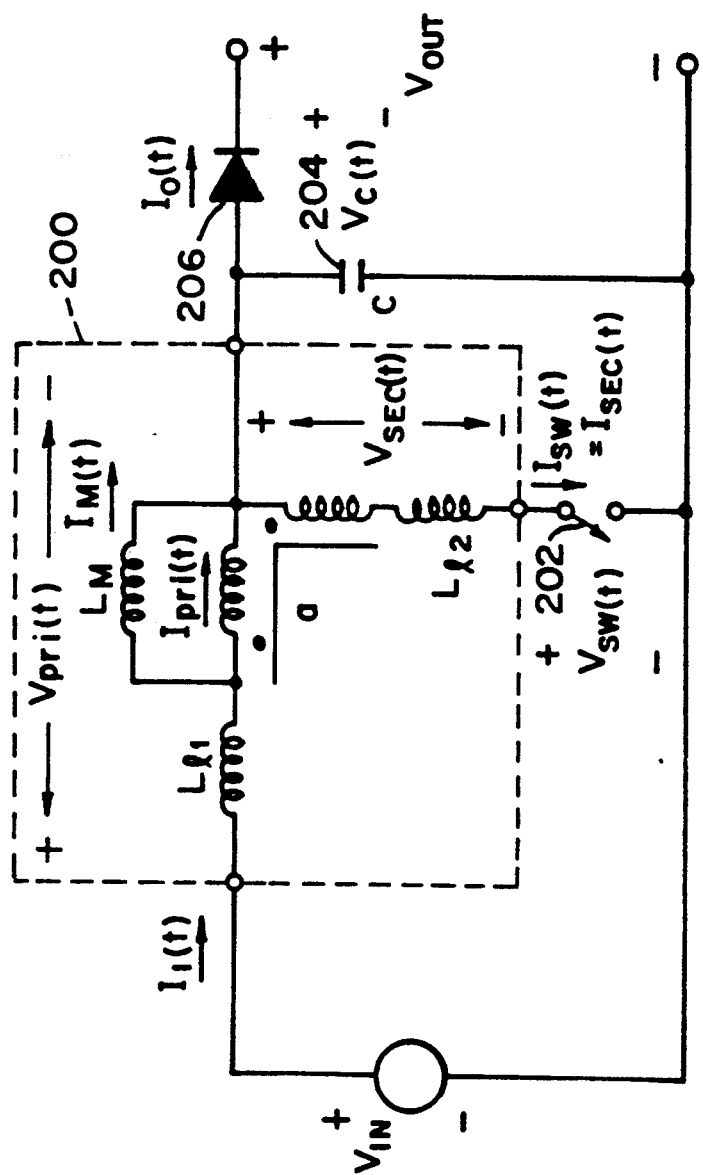

FIG. 17 shows the converter of FIG. 15A with the coupled inductor replaced with the circuit model of FIG. 16.

Figure 18:
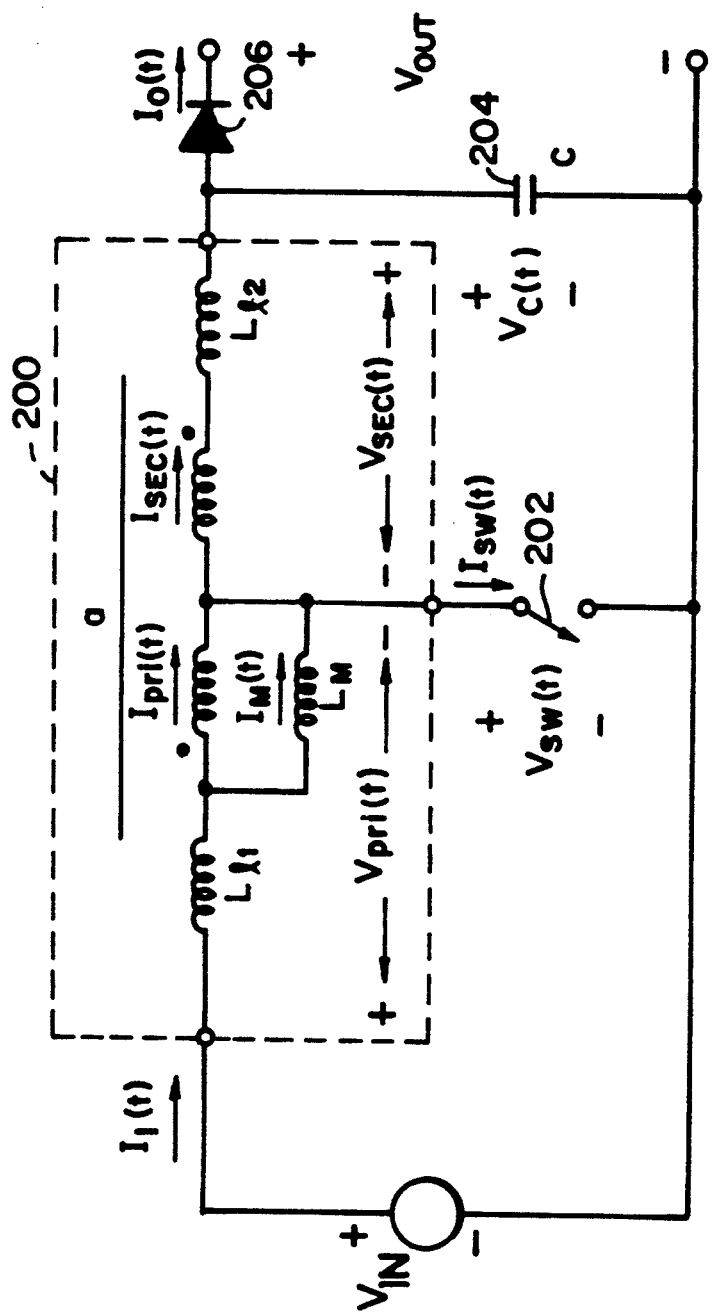

FIG. 18 shows the converter of FIG. 15B with the coupled inductor replaced with the circuit model of FIG. 16.

FIG. 19 is a table of equations for the switch voltage, just prior to closure of the switch, for the converter of FIG. 17, for different coupling conditions.

FIG. 20 is a table of equations for the switch voltage, just prior to closure of the switch, for the converter of FIG. 18, for different coupling conditions.

Figure 21:
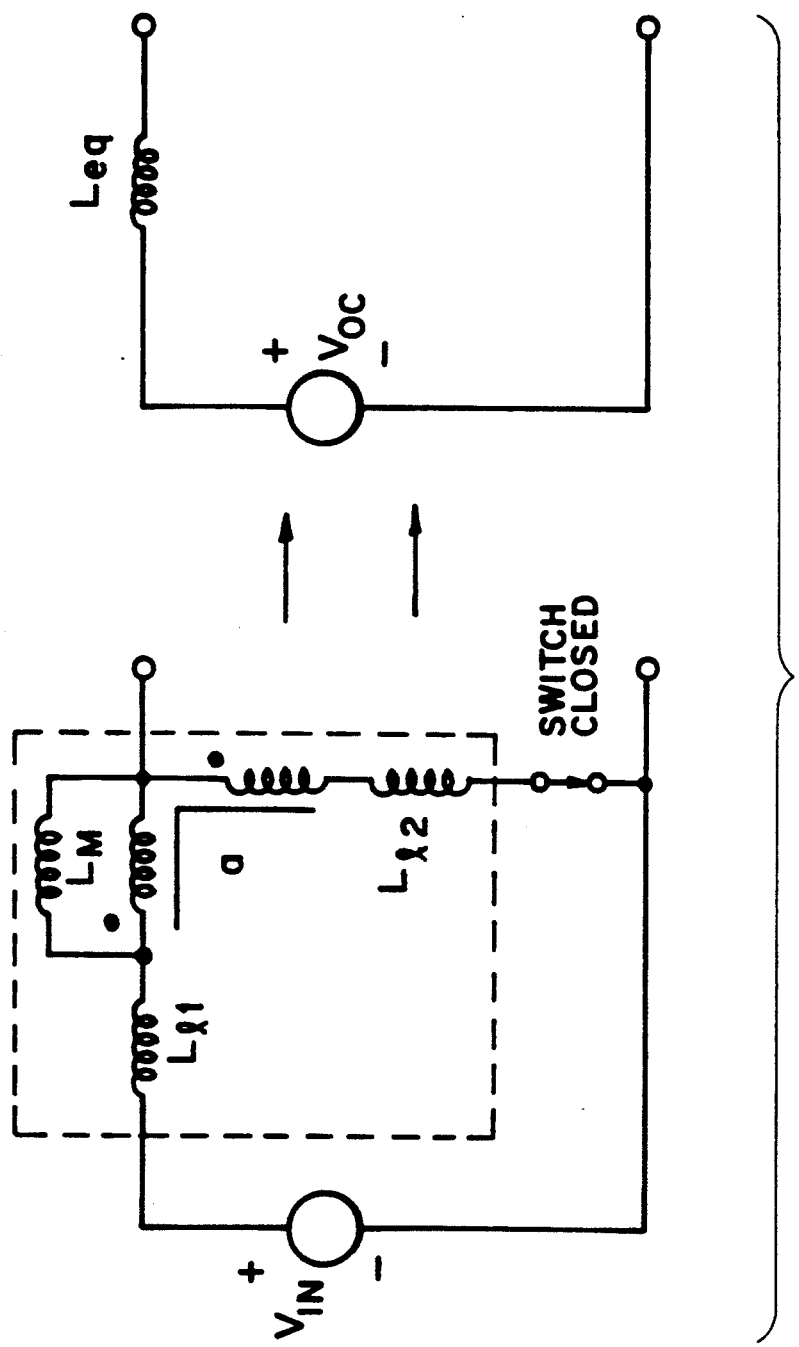

FIGS. 21 and 21A are a Thevenin's equivalent circuit model (and associated equations) which combines the circuit effects of the input source and the coupled inductor, with the switch closed, for the converter of FIG. 17.

Figure 22:
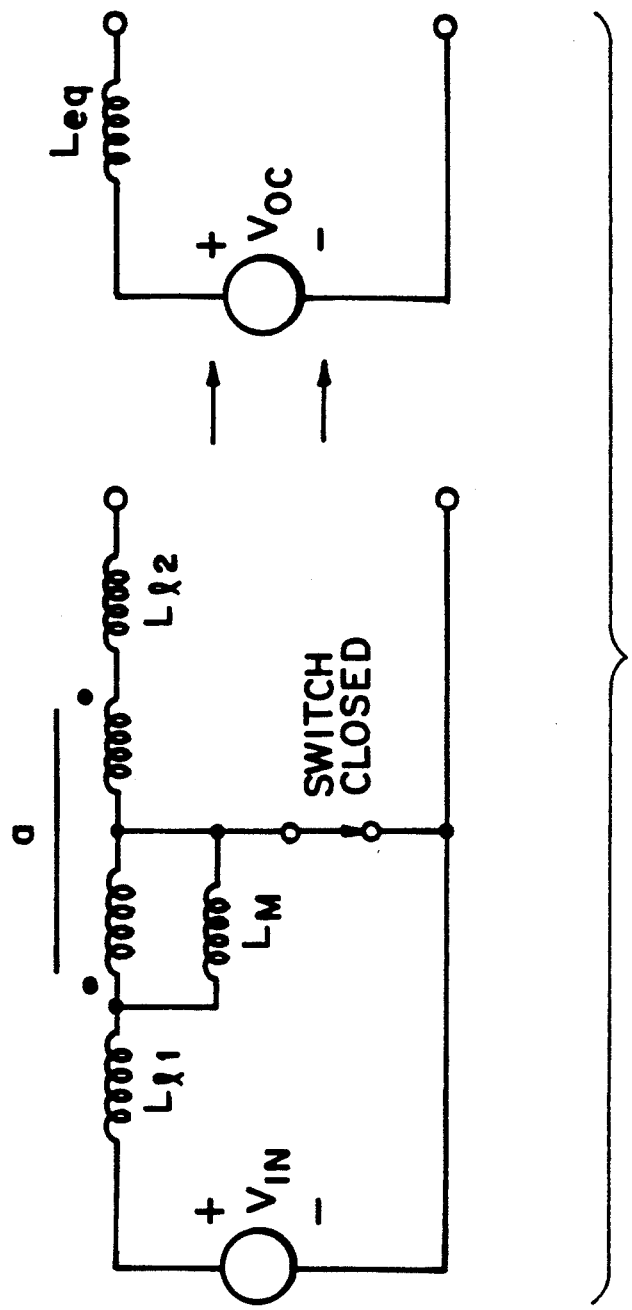

FIGS. 22 and 22A are a Thevenin's equivalent circuit model (and associated equations) which combines the circuit effects of the input source and the coupled inductor, with the switch closed, for the converter of FIG. 18.

FIG. 23 is a table of equations for the current flowing in the switch in the converter of FIG. 17 during the energy transfer phase.

FIG. 24 is a table of equations for the current flowing in the switch in the converter of FIG. 18 during the energy transfer phase.

Figure 25A:
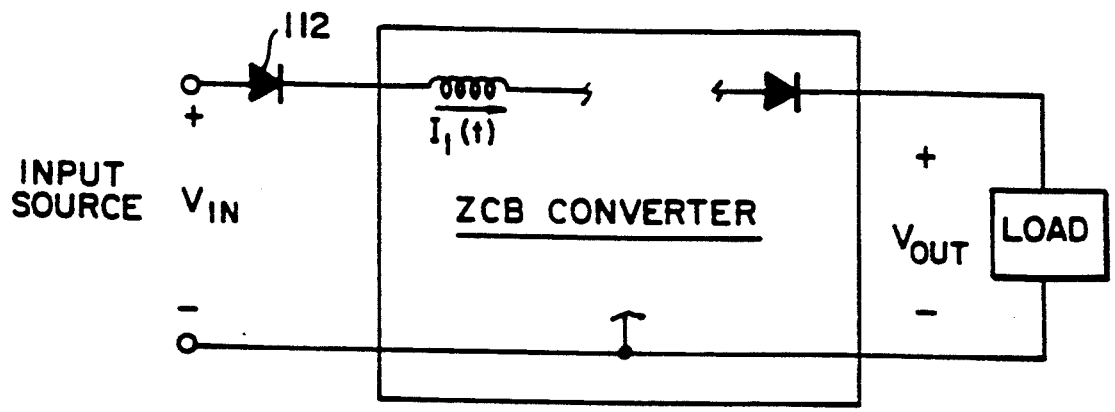
Figure 25:
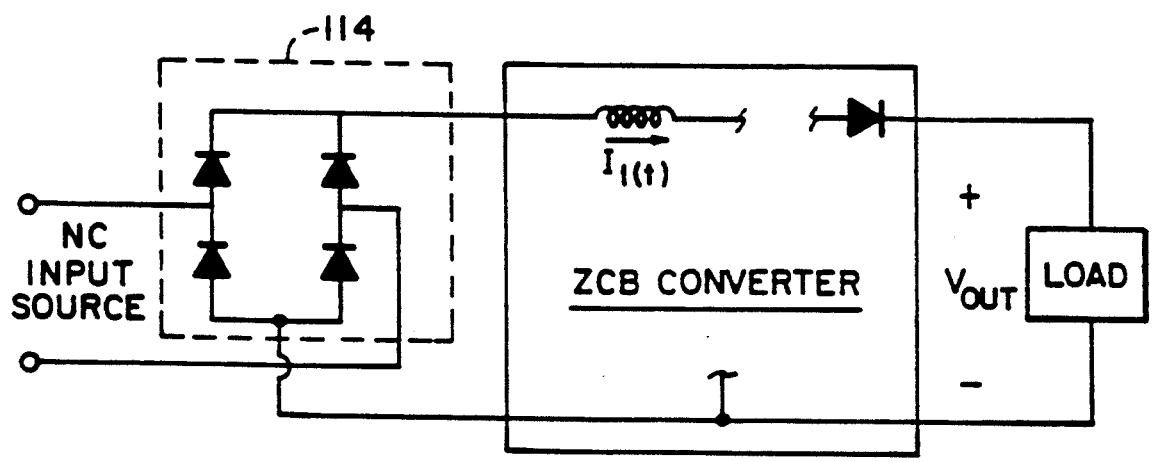

FIGS. 25 and 25A illustrate use of a unidirectional conducting device at the input of a zero-current-switching boost switching power converter.

FIGS. 26A through 26C show waveforms which illustrate the change in characteristic time constant associated with discontinuous flow of input current during the active portion of an operating cycle.

FIG. 27A through 27D show embodiments of zero-current switching boost converters which incorporate a forward diode.

Figure 27A:
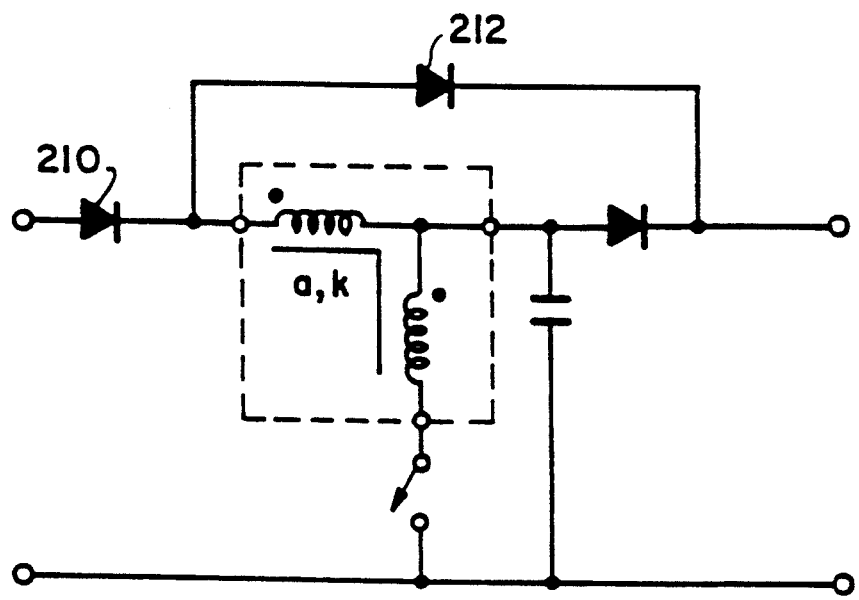
Figure 27B:
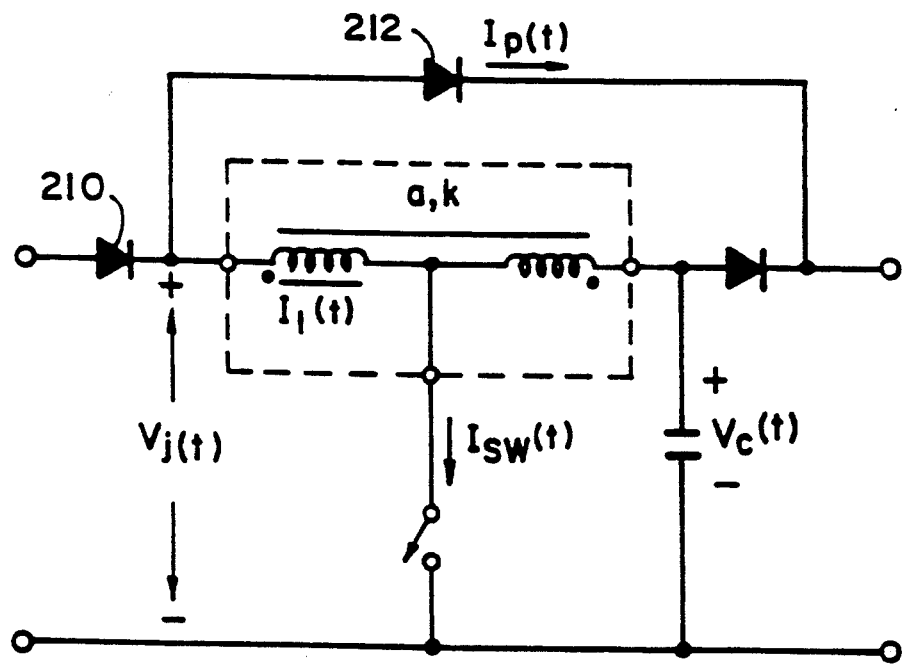
Figure 27C:
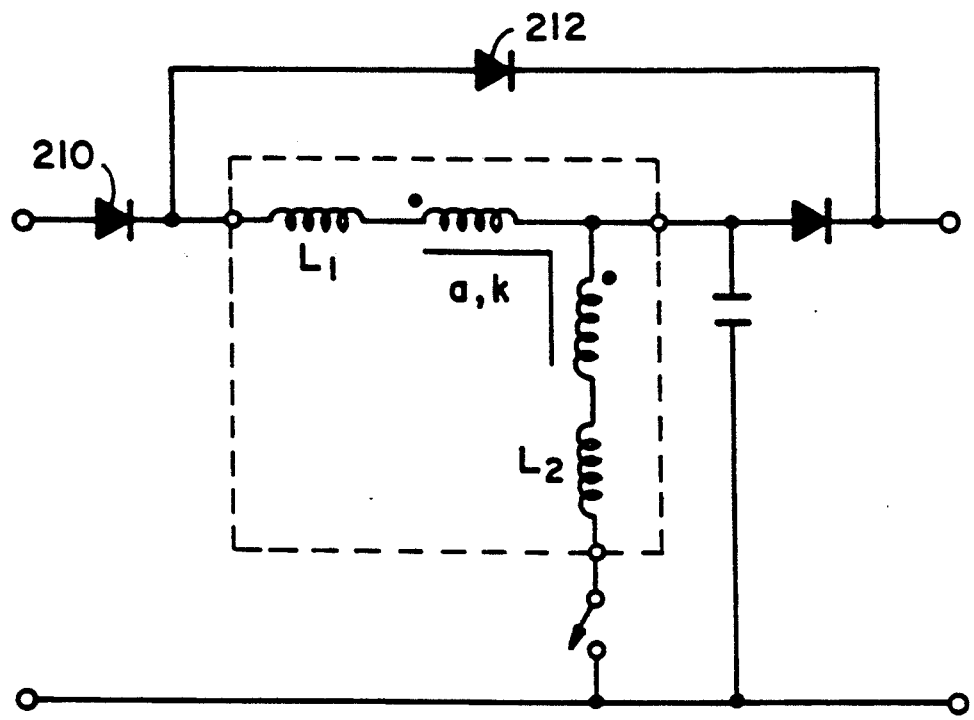
Figure 27D:
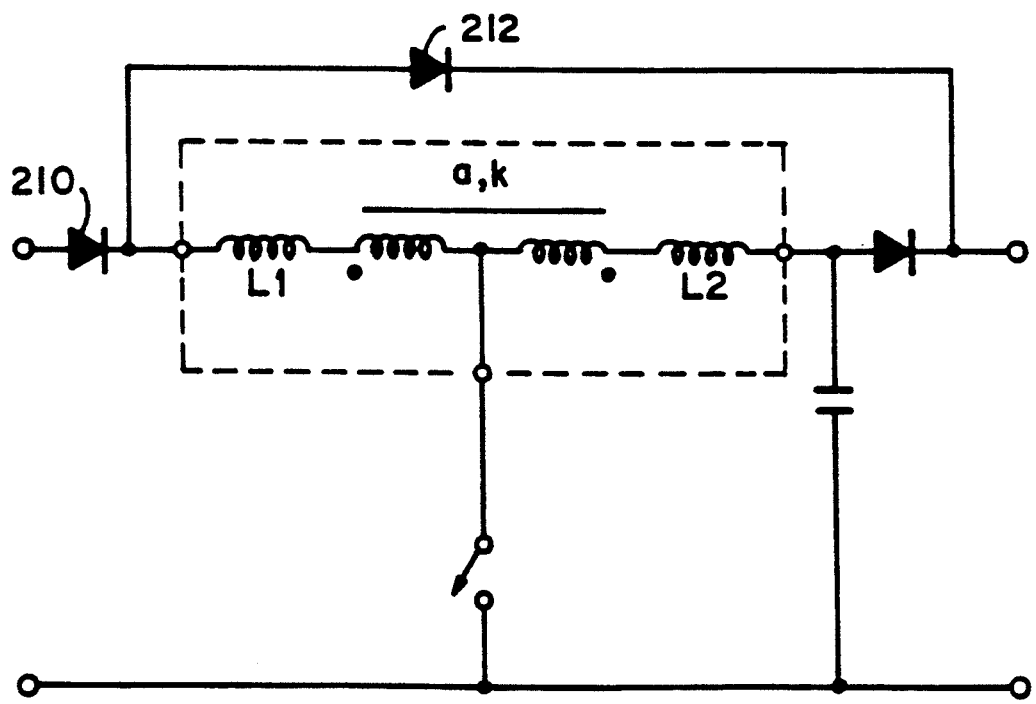

FIGS. 28A through 28E show waveforms for the converter of FIG. 27B.

Figure 29A:
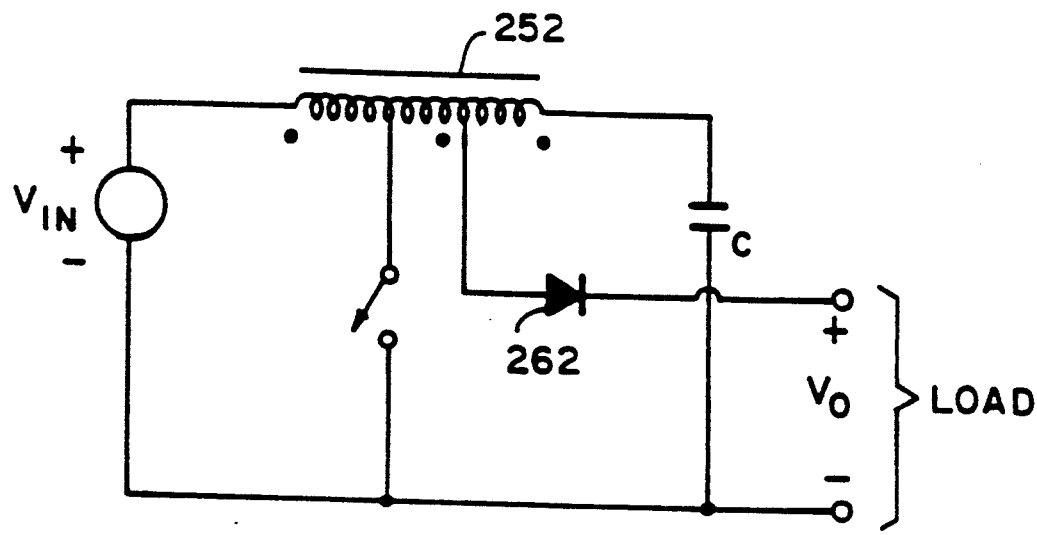
Figure 29B:
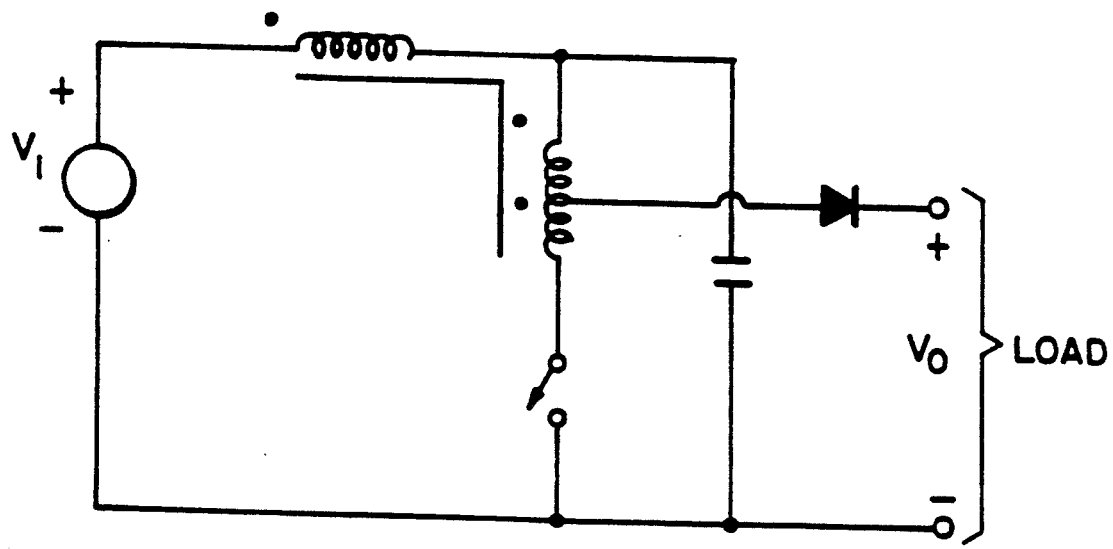

FIGS. 29A and 29B show other embodiments of a zero-current switching boost converter.

FIGS. 30A through 30C embodiments of a two-terminal switch for use in a zero-current-switching boost switching power converter which operates in the long cycle operating mode.

FIGS. 31A through 32C show embodiments of a two-terminal switch for use in a zero-current-switching boost switching power converter which operates in the short cycle operating mode.

Figure 32:
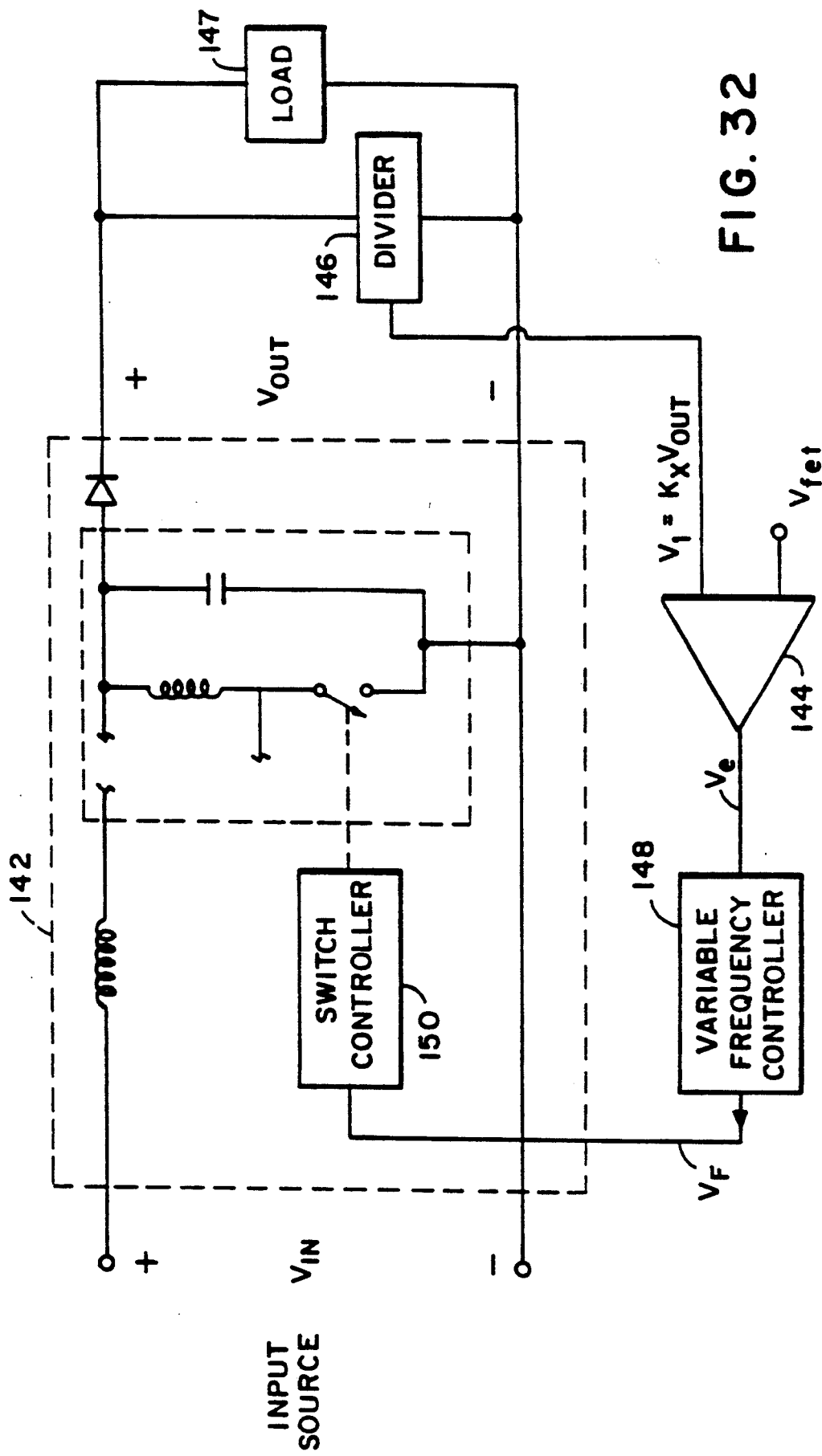

FIG. 32 shows a zero-current-switching boost switching power converter and a controller for maintaining the output voltage of the converter at some desired value as the converter input voltage and load vary.

Figure 33:
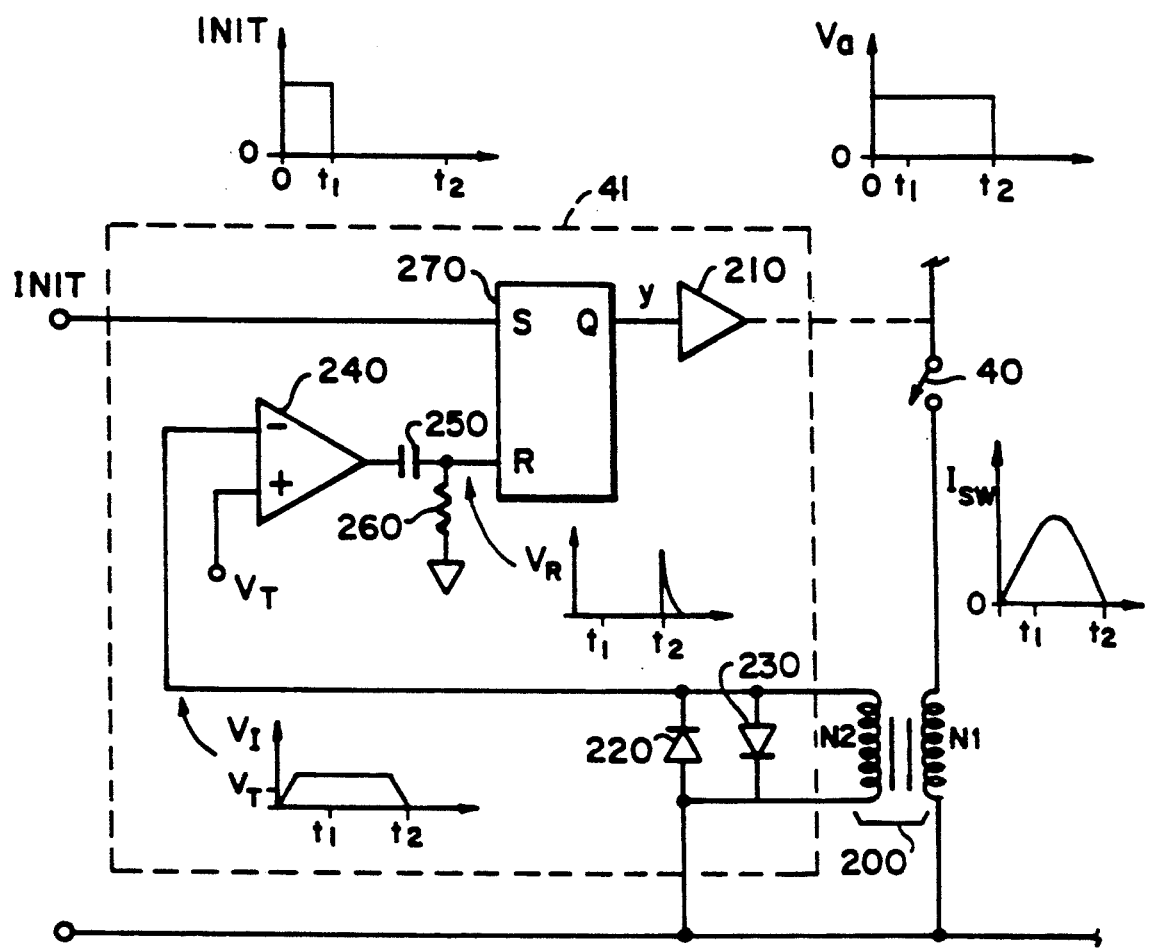

FIG. 33 shows an implementation of a switch controller suitable for operating a ZCB converter in the short cycle mode.

Figure 34:
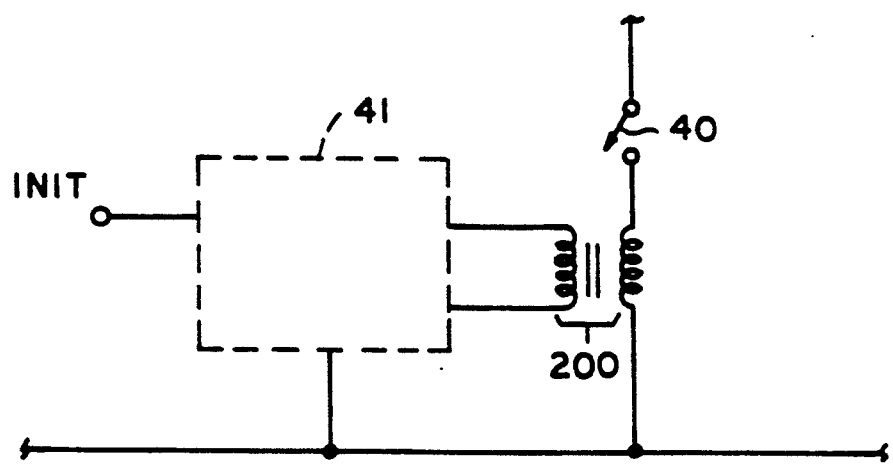
Figure 5F:
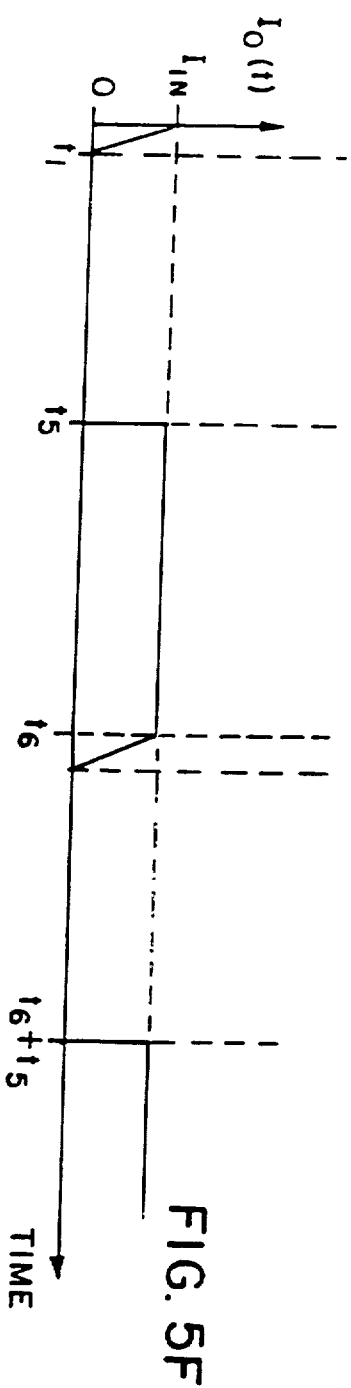
Figure 5E:
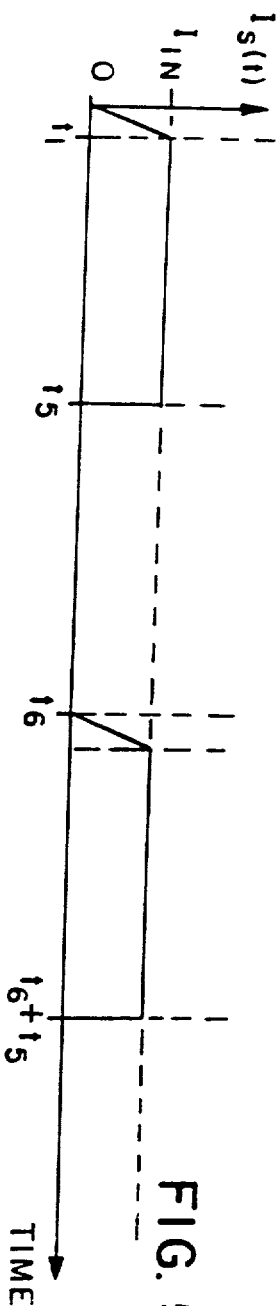
Figure 5D:
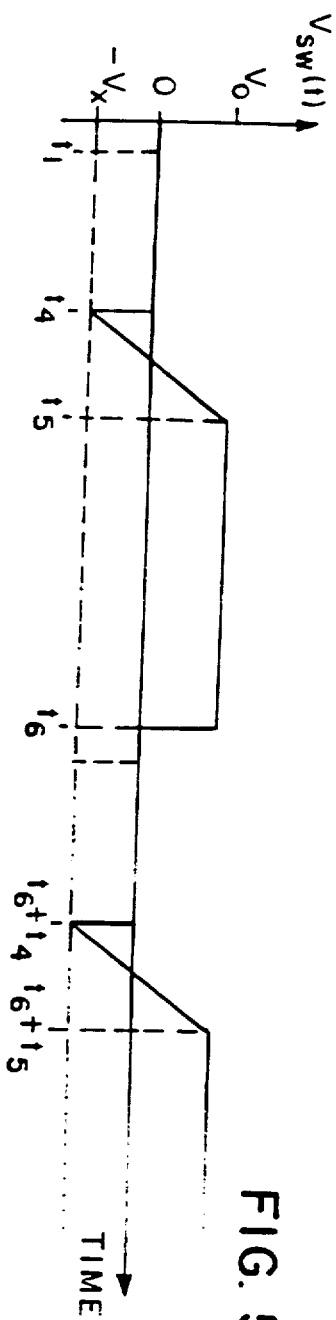
Figure 6A:
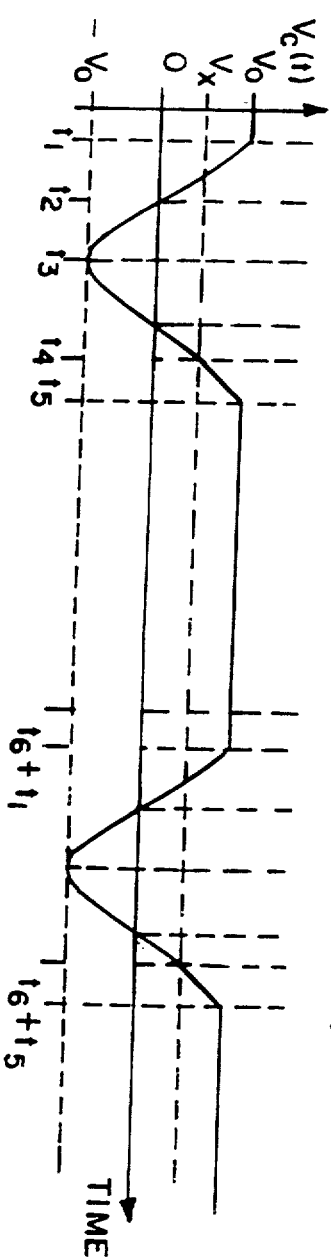
Figure 6B:
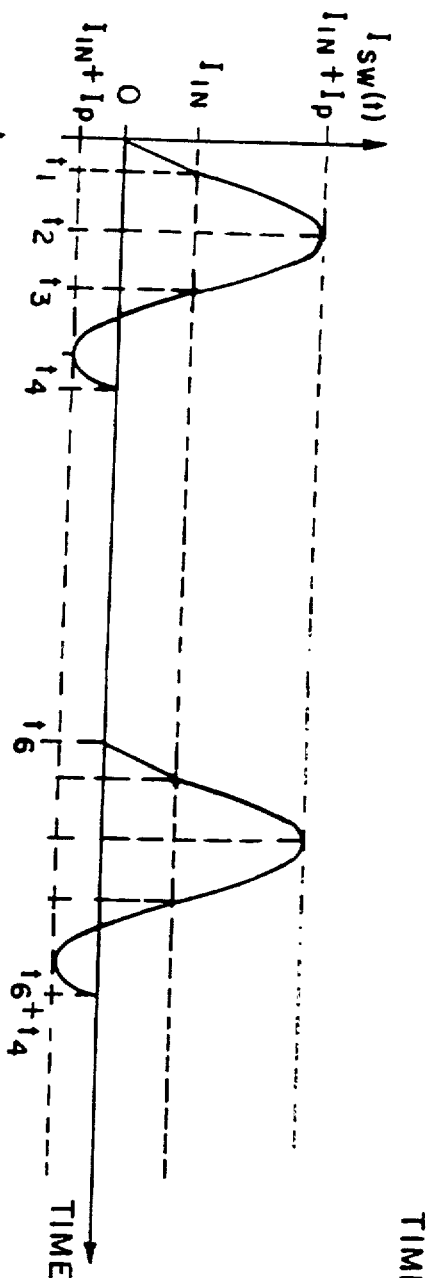
Figure 6C:
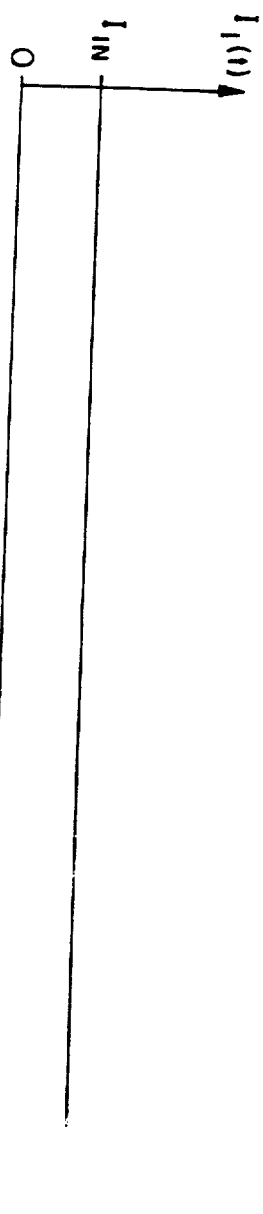

FIG. 34 shows another implementation of a switch controller for operating a ZCB converter in the long cycle mode.

Structure and Operation

Figure 1:
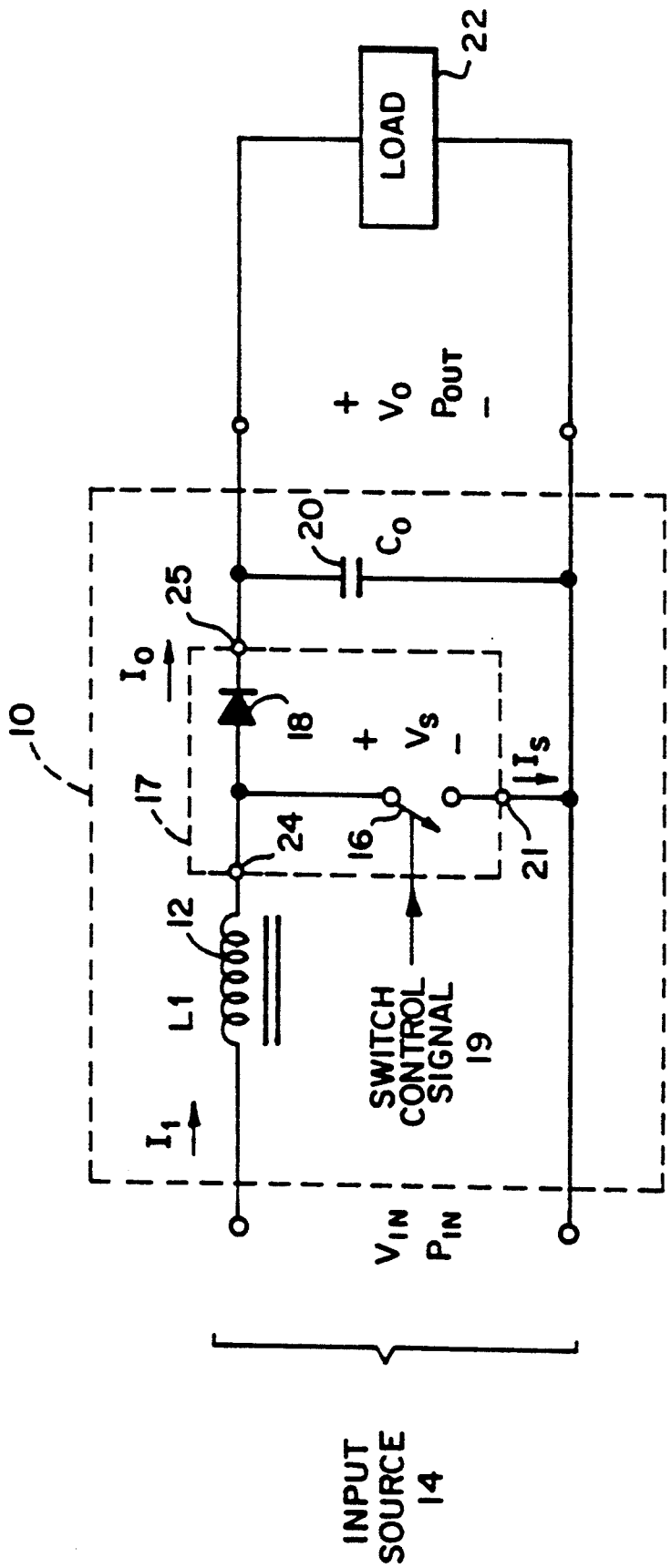
FIG. 1 shows a prior art boost switching power converter.

FIG. 1 shows a circuit model of one kind of prior art boost switching converter 10 which delivers power from an input voltage source 14, of value Vin, to a load 22, at a load voltage Vo, where Vo>Vin. The converter includes a current-commutating switch 17, an input inductor 12, and an output capacitor 20. The current commutating switch 17 consists of a two-terminal switch 16 and a diode 18. A switch control signal 19, delivered to the current commutating switch at a switch control input, turns the two-terminal switch 16 on and off. When the two-terminal switch is on, the current, I1, flowing into the input terminal 24 of the current-commutating switch 17, flows out of the shunt terminal 21 (i.e., Is=I1) and the switched voltage, Vs, is zero. When the two-terminal switch 16 is turned off, the current, I1, flowing into the input terminal of the current-commutating switch, flows through the diode 18 and out of the output terminal 25 (i.e., Io=I1), and the switched voltage, Vs, is equal to the output voltage, Vo. Assuming ideal components, there is no switch loss associated with the flow of currents Is and Io. Both the basic operating principles and the performance limitations of the prior art converter may be illustrated, without loss of generality, by assuming that the rate at which the two-terminal switch is turned on and off (i.e., the converter operating frequency) is fixed; that the switch is operated at a fixed duty cycle, D (where D is the fraction of the time that the switch is on during a converter operating cycle); that the average value of the current, I1, flowing in the input inductor is Iin; that the value, L1, of the input inductor is large enough so that the flow of I1 is maintained in the direction indicated in the Figure throughout the operating cycle; and that the value, Co, of the output capacitor is also large enough so that, by smoothing the effects of variations of the current Io during an operating cycle, the converter delivers an essentially DC output voltage, Vo. It should be apparent that the size of both the input inductor and the output capacitor (and hence the size of the converter) can be reduced as the converter operating frequency is increased. Under these conditions, the average value of the current Io will be $(1-D) \cdot Iin$, the average value of the current Is will be $D \cdot Iin$, and the average value of the switched voltage, Vs, will be $(1-D) \cdot Vo$. Under steady-state conditions the average voltage across the input inductor, $Vin-(1-D) \cdot Vo$, must be zero, else the average value of the input current, Iin, will increase or decrease until this condition is met. Therefore, the steady-state DC output voltage will be $Vo=Vin/(1-D)=Rv \cdot Vin$, and the ratio of converter output voltage to converter input voltage, Rv, will be maintained independent of converter loading. This property inherent to the converter, where development of nonzero average voltage across the converter input inductor causes the converter input current to self-adjust until a ratio of output to input voltage is achieved which returns the average input inductor voltage back to zero, will be referred to as "volt-second" regulation. Thus, under steady state conditions, $Pin = Vin \cdot Iin = Pout = Vo \cdot Iload$, and the average values of the currents and voltages are: $Iin = Pin/Vin$; $Io = Iin/Rv$; $Is = D \cdot Iin$; $Vs = Vin$; and $Vo = Rv \cdot Vin$. Since $1 > D > 0$, Vo must be greater than Vin. It should also be noted that if two of the converters of FIG. 1 are connected in parallel and they are operated synchronously at the same frequency and duty cycle, the fraction of the total power delivered to the load by each converter cannot be predicted. The volt-second regulation mechanism will only ensure that the sum of the converter output currents is consistent with powering the load at an output voltage $Vo = Rv \cdot Vin$; it will not ensure that the individual output currents are in any particular ratio.

In physically realizable converters neither the two-terminal switch nor the diode are ideal, and each of these components will contribute to converter losses. Dominant loss factors associated with a prior art current-commutating switch can be illustrated with reference to FIGS. 2 and 3. FIG. 2 shows a current source 27, of value Iin, feeding a prior art current-commutating switch 28. The output terminal 30 of the current-commutating switch is connected to a voltage sink 31 (which might, for example, be a large capacitor charged to a voltage Vo). The nonideal two-terminal switch 32, which, in practice, might be a field effect or bipolar transistor, is characterized by finite rise and fall times, tr and tf, respectively. The nonideal diode 34 is characterized by a finite reverse recovery time, trr (i.e., the time period during which reverse current can flow in the diode as the diode reverts from a forward conducting to a reverse blocking state). FIG. 3 shows voltage and current waveforms for two operating cycles of the current commutating switch of FIG. 2. When the switch is turned on (FIG. 3A, at times to and to +T), it must immediately begin to conduct both the current flowing in the input inductor, Iin(t), and the reverse current, Irr (FIG. 3C), which flows from the output capacitor back through the diode during the diode reverse recovery time, trr. This reverse current can be very large, since there is relatively little impedance to limit its magnitude. At times to +t1 and to +T+t1, switch turn-off occurs when the switch is carrying the full converter input current (FIGS. 3A and 3B). Since both the rise time, tr, and fall time, tf, of the switch are finite, the simultaneous presence of switch voltage and current during the switch transition times will cause power to be dissipated in the switch, and, all other conditions being equal, these switching losses will increase directly with converter operating frequency. Thus, although increased operating frequency is desirable in that it allows reducing the size of the input inductor and the output capacitor (and hence the size of the converter), prior art converters inherently must trade power density against operating efficiency. As a practical matter, as the operating frequency of a prior art boost switching power converter is raised much beyond 100 KHz, switching losses become a dominant loss factor, efficiency declines rapidly and the thermal and electrical stresses on the switch become unmanageable.

FIGS. 4A and 4B show two embodiments 36, 38 of a zero-current-switching current-commutating switch (hereinafter referred to as a ZC switch) which, by effectively eliminating switching losses, can be used to implement zero-current-switching boost switching converters which overcome the disadvantages and performance limitations inherent to prior art boost switching converters. In the Figures, both ZC switches consist of a two-terminal switch 40, 42, a first inductor, 44, 46, of value L2, a first capacitor 48, 50, of value C, a diode 52, 54, and a switch controller 41, 43. Each ZC switch has an input terminal 56, 58, an output terminal 60, 62, and a shunt terminal 64, 66. For comparison with the prior art current commutating switch of FIGS. 1 and 2, the input terminal of each switch in FIG. 4 is connected to a current source 68, 70 of value Iin and the output terminal of each is connected to a voltage sink of value Vo. A switch control signal, delivered to the switch controller of each ZC switch at the switch control input 45, 47, initiates the beginning of a ZC switch cycle by turning the two-terminal switch on (at zero current). The switch controller turns the two-terminal switch off when the current, Isw, in the two-terminal switch returns to zero. The operation of each switch, in each of two operating modes, will now be described.

FIG. 5 illustrates the operation of the ZC switch of FIG. 4A in an operating mode called the short-cycle mode. In this mode, an operating cycle is initiated by closing the two-terminal switch at time t=0 (Fig. 5) and the switch is opened, by the switch controller, at the first subsequent point in time that the current in the switch, Isw(t) (FIG. 5B), returns to zero. Just prior to closing the two-terminal switch (at time t=0−) the current Iin is flowing through the diode 52 into the voltage sink. Thus, Isw(0−)=Ic(0−)=Is(0−)=0, and Vsw(0−)=Vs(0−)=Vc(0−)=Vo. When the switch closes at t=0 the current in the switch, Isw(0), is zero (FIG. 5B) and this current cannot change instantaneously due to the presence of the first inductor 44. The voltage across the first inductor rises to Vo and the switch current, Isw(t), starts to ramp up linearly at a rate Vo/L2 amperes/second, until, at time $$t1 = Iin \cdot L2 / Vo, \qquad (1)$$

the currents Isw(t1)=Is(t1)=Iin (FIGS. 5B and 5E), the current Io(t1) has ramped to zero (FIG. 5F), and the diode ceases conducting. Between times t1 and t4 the voltages and currents associated with the first inductor 44 and the first capacitor 48 vary sinusoidally during an energy transfer phase having a characteristic time constant $$Tc = \pi \sqrt{L2 \cdot C} = \pi/\omega_0. \qquad (2)$$

At time t2=t1+Tc/2, the capacitor voltage Vc(t2)=0 (FIG. 5C) and the peak switch current is at a maximum value Isw(t2)=Iin+Ip, where $$Ip = Vo \sqrt{C/L2}. \qquad (3)$$

At time t3=t1+Tc, the capacitor voltage has rung negative to a value Vc(t3)=−Vo and the switch current Isw(t3)=Iin. At time t4, the switch current returns to zero and the switch is turned off by the switch controller. The length of the energy transfer cycle is therefore:

$$T14 = t4 - t1 = Tc + \frac{\arcsin\left(\frac{Iin}{Ip}\right)}{\omega_o}, \qquad (4)$$

and, at time t4, when the switch is turned off, the switch voltage, Vsw(t4), becomes equal to the negative capacitor voltage, −Vx, where $$Vx = |Vc(t5)| = Vo\sqrt{1 - \frac{Iin^2}{Ip^2}}. \qquad (5)$$

For t>t4, the full input current, Iin, flows in the first capacitor causing Vc(t) to increase linearly back to Vo at a rate equal to Iin/C volts/second. At time t=t5, the capacitor voltage again equals Vo. After time t5, the capacitor voltage is clamped at Vo by the diode, the input current, Iin, flows through the diode (hence, Io=−Iin, Fig. 5F) into the voltage sink, the capacitor current drops to zero, and the conditions are the same as they were at time t=0. At time t=t6 another cycle is initiated.

FIG. 6 illustrates the operation of the ZC switch of FIG. 4A in an operating mode called the long-cycle mode. For the same initial conditions that were assumed for FIG. 5, the operation of the switch in the long-cycle mode between time t=0 and time t=t3 (FIG. 6) is the same as the operation described for the short cycle mode. However, instead of turning the switch off at the first zero crossing of the switch current, Isw(t), (at time t4 in FIG. 5), the energy transfer interval is allowed to continue until the second zero crossing (at time t=t4 in FIG. 6B). Equations 1, 2, 3, and 5 apply for the long cycle mode, except Vx is now the value of the positive voltage to which the capacitor is charged at the end of the energy transfer cycle (FIG. 6C). The length of the energy transfer cycle is also different $$T14 = t4 - t1 = \frac{3}{2} Tc - \frac{\arcsin\left(\frac{Iin}{Ip}\right)}{\omega_o}. \qquad (6)$$

With respect to the two different operating modes, several points are to be noted:

a) In both the short and the long cycle modes, voltage transitions across the two-terminal switch take place at times of zero current and the time variations in the switch and diode currents are smooth and without sharp transitions. In this way, switching losses associated with finite rise and fall time in the ZC switch, as well as the effects of the diode reverse recovery time, are essentially eliminated.

b) For both modes Ip represents an upper bound on Iin. For values of Iin greater than Ip, the current in the switch will not return to zero, and the advantages of the switch are lost.

c) The modes differ in terms of the length of the energy transfer phase (T14, Equations 4 and 6); the dependence of T14 on Iin; and the overall length of the active portion of the cycle (t5). For the short cycle mode, T14 increases, from a minimum value Tc to a maximum value 3·Tc/2, as Iin increases from zero to Ip. In contrast, for the long cycle mode, T14 decreases, from a maximum value of 2·Tc to a minimum value 3·Tc/2, as Iin increases from zero to Ip. Furthermore, for the short cycle mode, the time span t=t4 to t=t5 increases in inverse proportion to the input current Iin. This is characteristic of this operating mode, since the voltage, −Vx, across the capacitor at the time the ZC switch is opened becomes more negative for smaller values of Iin. As Iin tends toward zero, −Vx approaches −Vo, and the time required to charge the capacitor back to +Vo gets increasingly longer. Thus, the length of the active portion of the cycle, t5, varies over a very wide (theoretically infinite) range as Iin varies between zero and Ip. For the long cycle mode, however, the time span t=t4 to t=t5 decreases as Iin decreases since, as Iin approaches zero, the positive voltage +Vx, across the capacitor at the end of the energy transfer cycle approaches Vo. Thus, variation in the length of the active portion of the long cycle, t5 (FIG. 6), is relatively narrow and much less than the variation in the short cycle mode (t5, FIG. 5).

d) The energy transfer cycle (time t=t1 to t=t4) is not a mechanism by which energy is transferred forward from the input source to the load. Rather, it is a process for performing current commutation under controlled conditions of switch voltage and current. By suitable connection of appropriate circuit elements (e.g., in FIGS. 4A and 4B, the first inductor 44, 46, and the first capacitor 48, 50) to the switch 40, 42, a characteristic time scale is defined for the time variation of the current which flows in the switch after the switch is turned on. In this way the rate of change of switch current after turn-on, and both the time varying behavior of the switch current and the time at which it subsequently returns to zero, become first order dependent only upon the values of the chosen circuit elements and the values of the input source 68, 70 and voltage sink. The energy transfer cycle is therefore a mechanism for avoiding switching losses while simultaneously controlling the relative average values of Is and Io.

The waveforms for short and long cycle operation of the ZC switch of FIG. 4B are, respectively, the same as the waveforms shown in FIGS. 5 and 6 for the ZC switch of FIG. 4A. In operation, the differences between the switches of FIGS. 4A and 4B are as follows:

a) The average current in the first inductor 44 in the ZC switch of FIG. 4A is equal to the average value of the shunt path current Is. For the ZC switch of FIG. 4B the average current in the first inductor 46 is equal to the average value of Io.

b) The voltage, Vs(t), across the source of current feeding the ZC switch of FIG. 4A is equal to the capacitor voltage, Vc(t). For the ZC switch of FIG. 4B the voltage, Vs(t), seen by the source is equal to the switch voltage, Vsw(t). Although the time variations of these waveforms are different, it can be shown that, for equivalent operating conditions (Iin, Vout, t6, L2, C and the operating mode are the same), the average value of Vs(t), over an operating cycle, is the same for both switches.

FIGS. 7 and 8 show embodiments of zero-current-switching boost switching converters (hereinafter referred to as ZCB converters) which utilize the ZC switches of FIGS. 4A and 4B. In both Figures the ZCB converter 72, 74 is connected to an input source, of voltage Vin, and delivers power to a load 76, 78 at an output voltage Vo. In FIG. 7 the converter 72 consists of an input inductor 80, of value L1, a ZC switch 82 of the kind shown in FIG. 4A, and an output capacitor 84, of value Co. In FIG. 8 the converter 74 consists of an input inductor 86, of value L1, a ZC switch 88 of the kind shown in FIG. 4B, and an output capacitor 90, of value Co. In both converters, the value, Co, of the output capacitor is assumed to be large enough so that it smooths the effects of variations of the current Io during an operating cycle and the converter delivers an essentially DC output voltage, Vo.

The operating principles of the ZCB converters of FIGS. 7 and 8 can be demonstrated by initially assuming that the average value of the current I1(t) is Iin (and, therefore, the input power to the converter is Vin·Iin) and that the value, L1, of the input inductor, is much greater than the value, L2, of the first inductor 102, 100, included in each ZC switch. Under these circumstances, the current I1(t) can be considered to be essentially constant (I1(t)=Iin) over several converter operating cycles, and the waveforms of the voltages and currents within the converter will be essentially the same as those shown in FIGS. 5 and 6. Thus, the waveforms for either of the converters of FIG. 7 or 8 will correspond to the waveforms shown in FIG. 5 if the ZC switch is operated in the short cycle mode, and the waveforms for either of the converters will correspond to the waveforms shown in FIG. 6 if the ZC switch is operated in the long cycle mode. As for the prior art converter, the volt-second regulation process will demand that, in the steady state, the average value of the voltage Vs(t) (FIGS. 7 and 8) be equal to the input voltage, Vin. Within this context, it is most informative to examine how the total length of an operating cycle (t6 in FIGS. 5 and 6) must be varied so as to maintain the converter output voltage at a fixed value, Vo>Vin, as both the load power, Po, and the input voltage, Vin, vary. We first note that if the load power is Po, and the input voltage is Vin, then, to first order, neglecting losses, Vin·Iin=Vo·Io, Iin=Po/Vin.

For the long cycle mode, taking the average of the voltage Vs(t) (which, as noted previously, is equal to Vc(t) (FIG. 6C) for the converter of FIG. 7, and is equal to Vsw(t) (FIG. 6D) for the converter of FIG. 8, both waveforms having the same average value) over an operating cycle, it can be shown that at full load (Iin=Ip), the length of the operating cycle will be at a minimum value, $$t6minlc = \frac{2\pi}{\omega_o \cdot \left(1 - \frac{Vin}{Vo}\right)} = \frac{1}{fmaxlc} \quad (7)$$

to maintain the average value of Vs(t) equal to Vin, whereas at no load (Iin=0) the length of the cycle will be at a maximum value:

$$t6maxlc = \frac{3 \cdot (1 + \pi)}{2 \cdot \omega_o \cdot \left(1 - \frac{Vin}{Vo}\right)} = \frac{1}{fminlc} . \quad (8)$$

In the long cycle mode, the ratio of the maximum converter operating frequency, fmaxlc, to the minimum converter operating frequency, fminlc, is:

$$\frac{fmaxlc}{fminlc} = \frac{4 \cdot \pi}{3 \cdot (1 + \pi)} = 1.01 \quad (9)$$

Thus, in the long cycle mode, the range of operating frequency is weakly dependent on load (Equation 9), whereas, as indicated by Equations 7 and 8, for any given load the absolute value of the operating frequency will decrease as Vin approaches Vo. This is suggestive of the operation of a prior art converter having a fixed switch on-time and a variable operating frequency: operating frequency is essentially independent of load, and decreases as Vin approaches Vo.

It has already been noted that, in the short cycle mode, the time duration of the active portion of the cycle (t5, FIG. 5) varies over a very wide range as a function of Iin. At full load (Iin=Ip), the minimum length of an operating cycle, t6minsc, for either of the converters of FIG. 7 or 8 operating in the short cycle mode, will be the same as that given in Equation 7 for the long cycle mode (examination of FIGS. 5 and 6, and Equations 1 through 6, indicates that the waveforms for both modes become the same when Iin=Ip). However, as Iin approaches zero, the assumption that the relatively large, but finite, value, L1, of the input inductor can maintain Iin essentially constant over several operating cycles breaks down, since this assumption would predict an infinite maximum operating cycle time, t6maxsc. It can be shown, however, that for small values of Iin (e.g less than 0.1·Ip), the length of an operating cycle required to maintain the average value of Vs(t) equal to Vin is closely approximated by:

$$t6minsc = \frac{2 \cdot Ip}{\omega_o \cdot Iin \left(1 - \frac{Vin}{Vo}\right)} = \frac{1}{fminsc} \quad (10)$$

Thus, as Iin decreases from a value Ip to values of Iin less than 0.1·Ip, the range of variation of the converter operating frequency will be closely approximated by:

$$\frac{fmaxsc}{fminsc} = \frac{4 \cdot Ip}{3 \cdot Iin \cdot (1 + \pi)} = 0.32 \frac{Ip}{Iin} \quad (11)$$

At light loads, the converter operating frequency will decrease in direct proportion to Iin, and the relative range of variation of the converter operating frequency as a function of load is very wide.

It has been noted that if two or more prior-art converters are connected to the same source and load, and each is operated at the same duty cycle (operated in a paralleled array), they will not inherently deliver equal fractions of the total load power. If two or more of the converters of FIGS. 7 or 8, having the same characteristic time constant, Tc, and equal values of input inductor, L1, are connected in a paralleled array (as in FIG. 9, which shows converters of the kind shown in FIG. 7), and the converters 92, 94, 96 are operated at the same operating frequency (as indicated in the Figure by the common switch control signal being delivered to all converters), they will tend to share the power delivered to the load 98 (see Vinciarelli, U.S. Pat. No. 4,648,020). In the short cycle mode, because of the strong dependence of t5 (FIG. 5) on Iin, power will tend to be shared essentially equally between converters and second order effects in physically realizable converters, such as diode and switch voltage drops and inductor resistances, will be rendered essentially insignificant. In the long cycle mode, where the dependence of t5 on Iin is much weaker, these effects will be more significant and the degree to which physically realizable converters will share the load power will be reduced.

As the value of the input inductor, L1, is reduced the assumption that Iin remains essentially constant throughout the operating cycle is no longer valid, but the operating principles of the converter remain the same. FIGS. 10 and 11 illustrate the effects of a finite ratio of L1 to L2 on the waveforms of the ZCB converter of FIG. 7, operating in the short and long cycle modes, respectively; FIGS. 12 and 13 illustrate the effects of a finite ratio of L1 to L2 on the waveforms of the ZCB converters of FIG. 8, operating in the short and long cycle modes, respectively. In all of the Figures the input current at the time the switch is closed (t=0) is Iin an the converter output voltage is Vo. The key effects of the finite ratio of L1 to L2 are as follows, where primed values (e.g., Ip') indicate values for the ZCB converter of Figure 7 having a finite inductance ratio; double-primed values (e.g., Ip'') indicate values for the ZCB converter or Figure 8 having a finite inductance ratio; and unprimed values (e.g., Ip) refer to results, previously described, for the ZCB converters in which the inductance ratio is very large:

a) t=0−: In the ZCB converter of FIG. 8, in either the short or the long operating mode, the maximum switch voltage, Vsw''(0−) (FIGS. 12D and 13D), will be reduced by the voltage divider action of the two inductors:

$$Vsw''(0-) = Vo - (Vo - Vin) \cdot \frac{L2}{L1 + L2}.$$

b) 0<t≦t1: For the ZCB converter of FIG. 7, in either the short or the long operating mode, the current in the input inductor, I1'(t), will decline (FIGS. 10A and 11A) due to the presence of reverse voltage, Vo−−Vin, across the input inductor, L1. This will tend to reduce both t1 and the current flowing in the input inductor at time t1 (I1'(t1)=Ia1). For the ZCB converter of FIG. 8, the current in the input inductor will tend to increase (Figs. 12A and 13A), to a value I1''(t1−)=Ia2, due to the input voltage source being impressed across the inductor, but t1 will remain unchanged.

c) t1<t≦t4: For the ZCB converter of FIG. 7, in either operating mode, the characteristic time constant will be dependent upon the paralleled value of the input inductor and the first inductor and will therefore be somewhat reduced:

$$Tc' = \frac{\pi}{\omega_o'} = \pi \sqrt{Lp \cdot C}, \text{ where } Lp = \frac{L1 \cdot L2}{L1 + L2}.$$

Figure 11A:
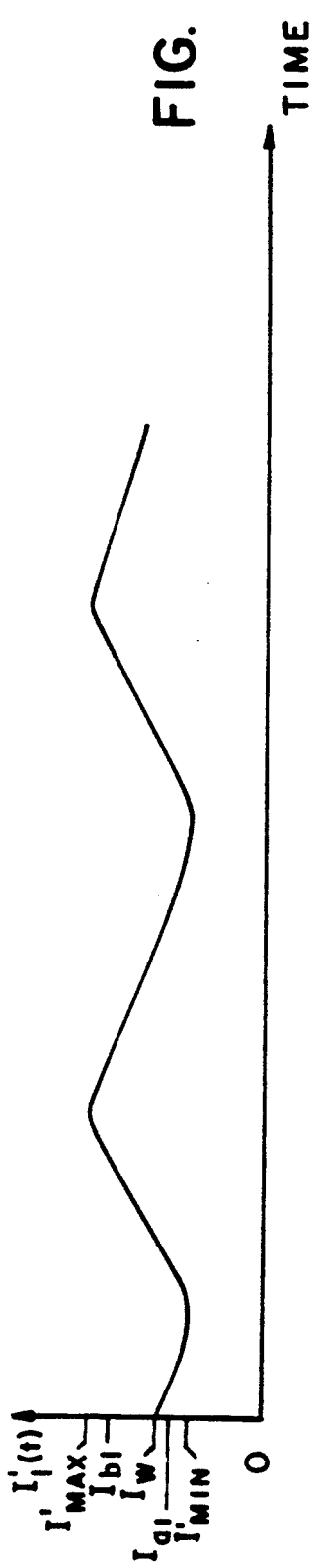
Figure 11B:
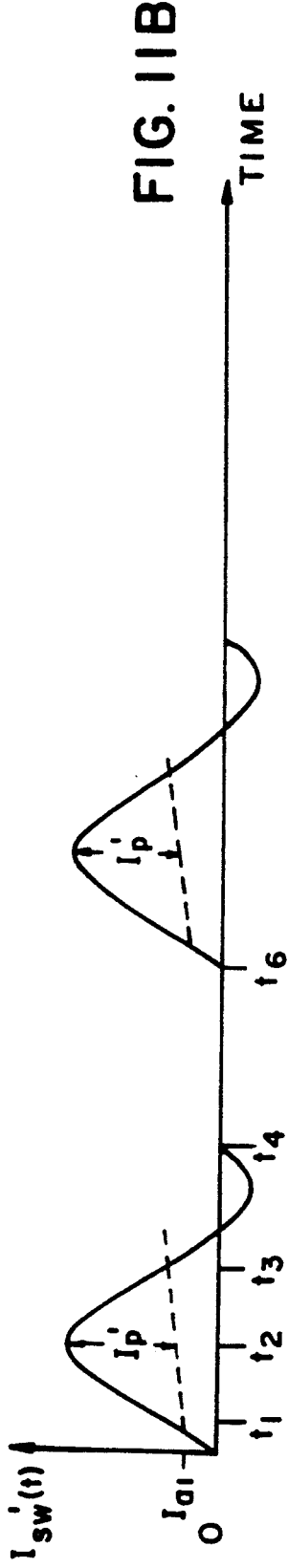
Figure 11C:
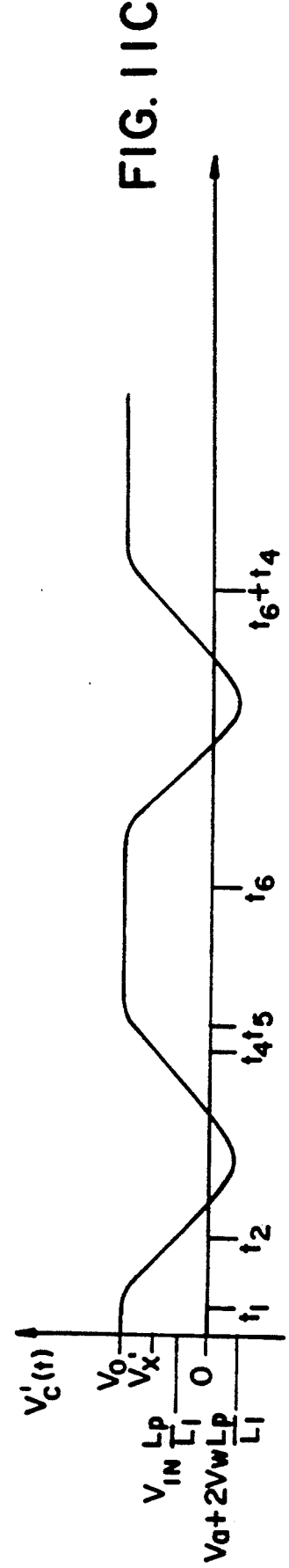
Figure 12A:
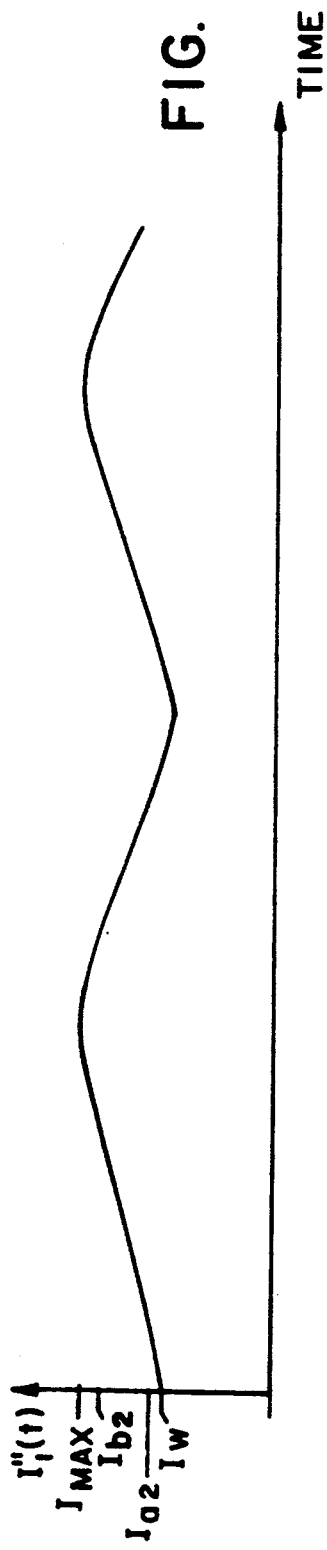
Figure 12B:
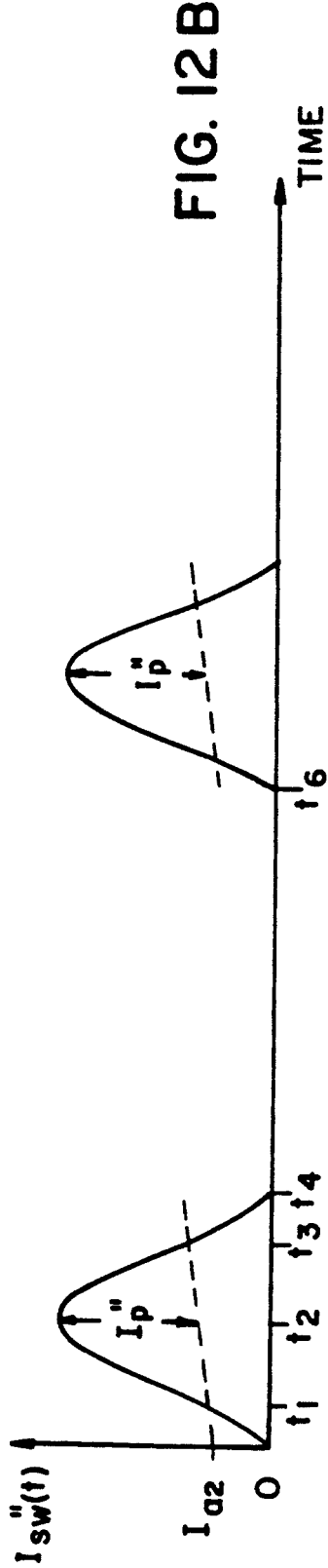
Figure 12C:
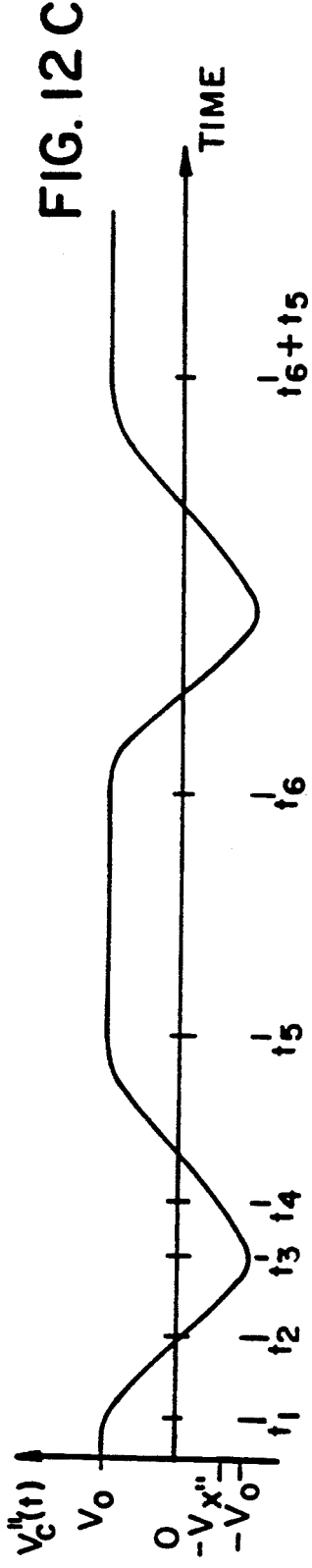
Figure 10A:
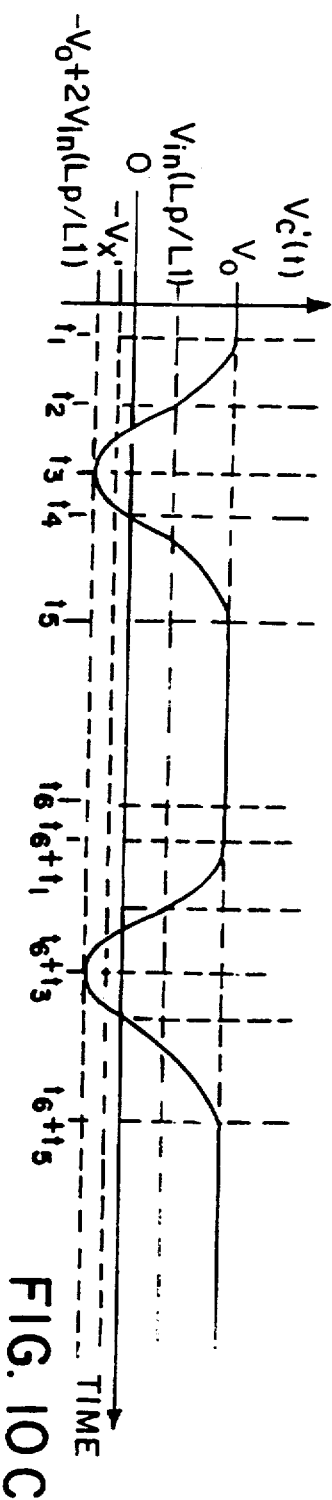
Figure 10B:
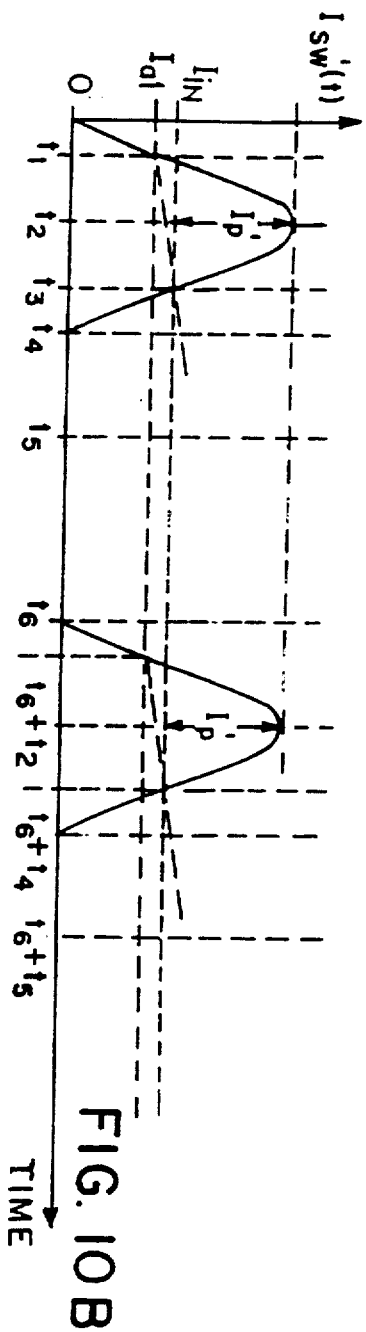
Figure 10C:
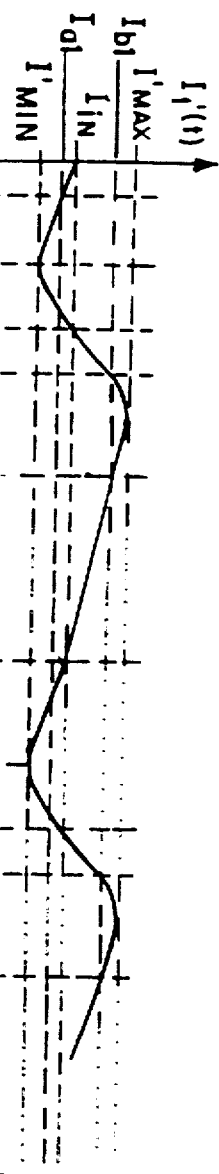
Figure 10F:
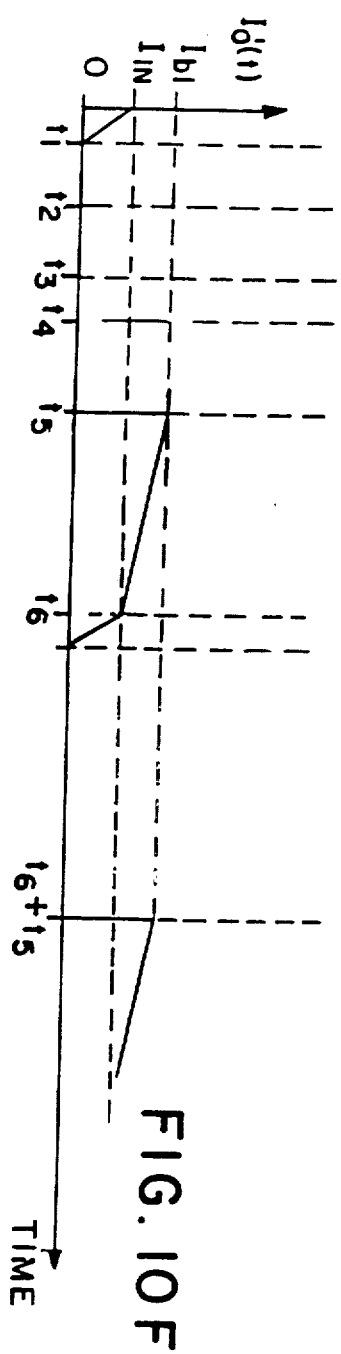
Figure 10E:
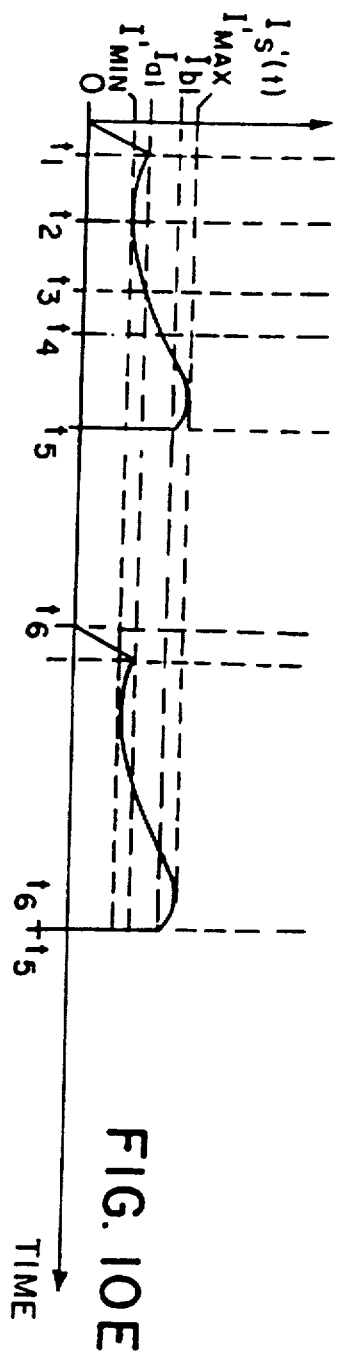
Figure 10D:
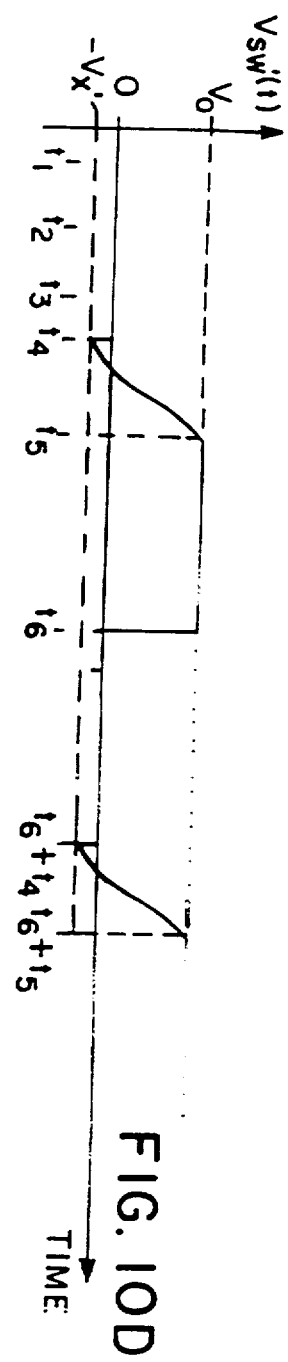
Figure 11C:
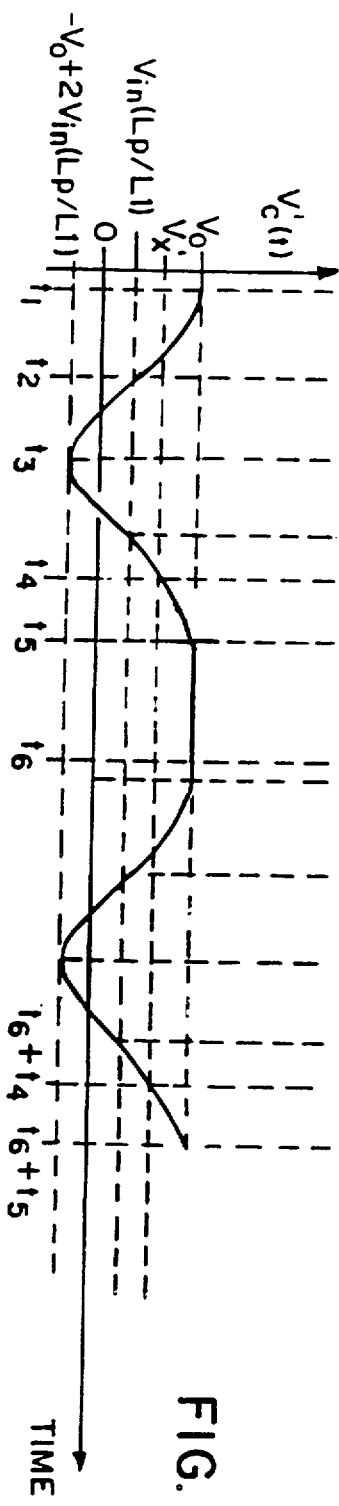
Figure 11B:
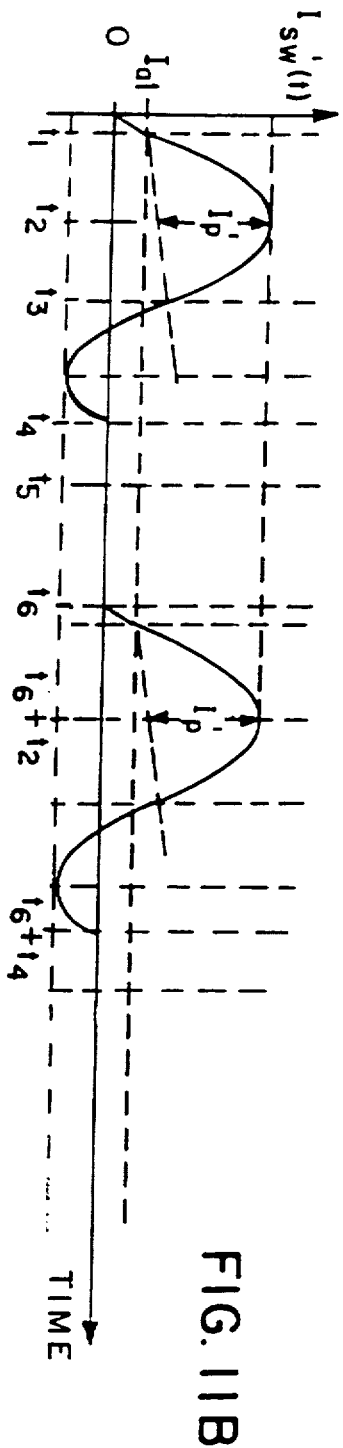
Figure 11A:
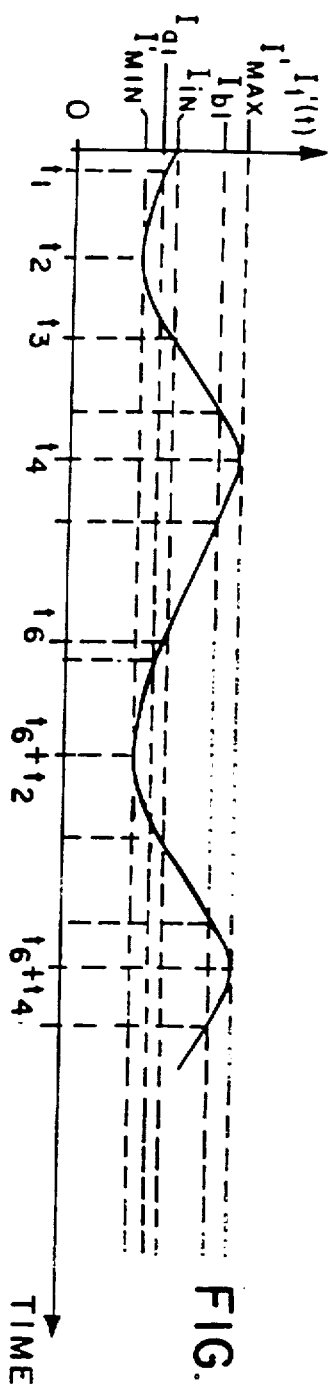
Figure 11D:
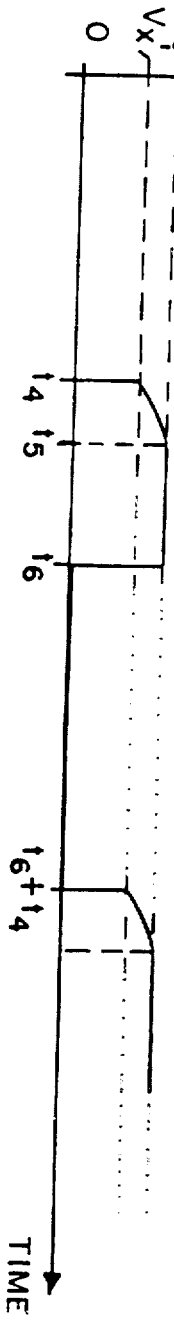
Figure 11E:
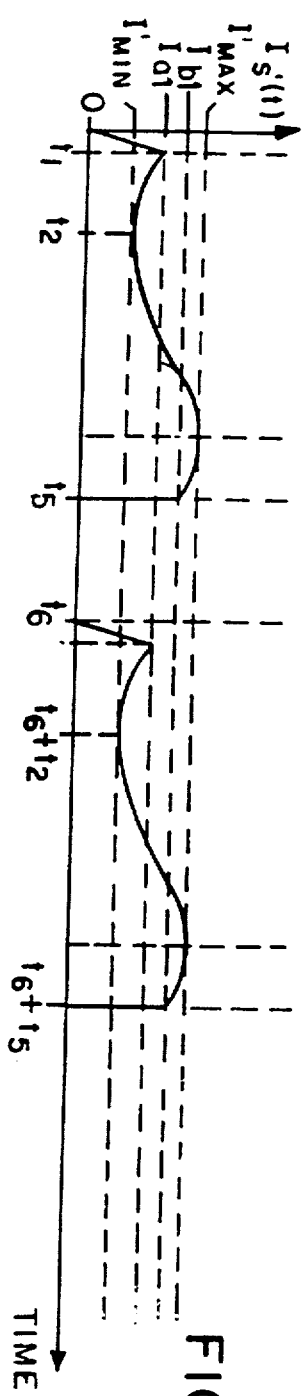
Figure 11F:
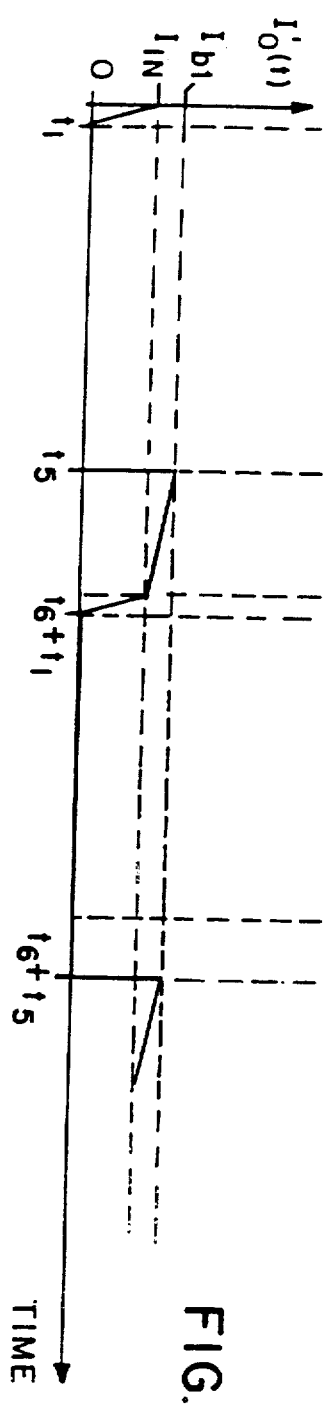
Figure 12C:
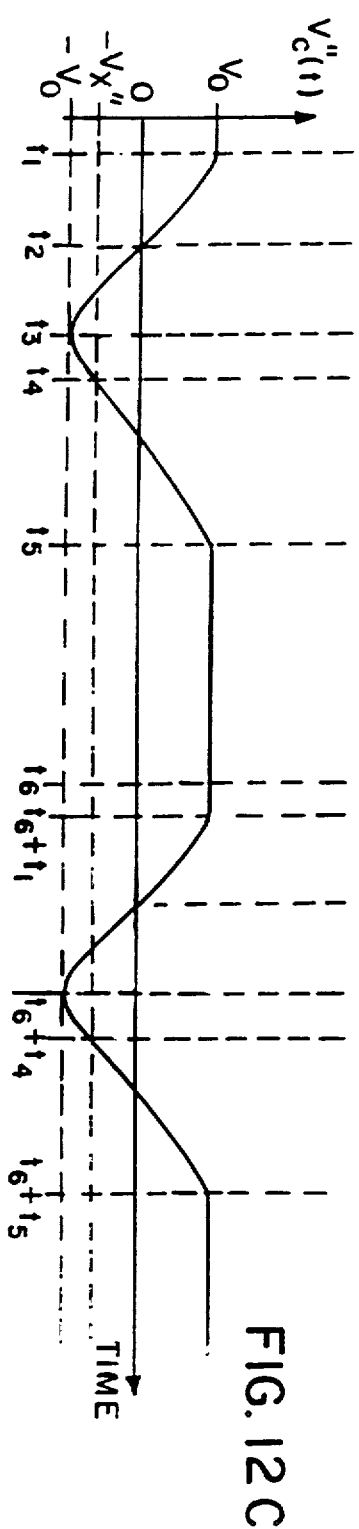
Figure 12B:
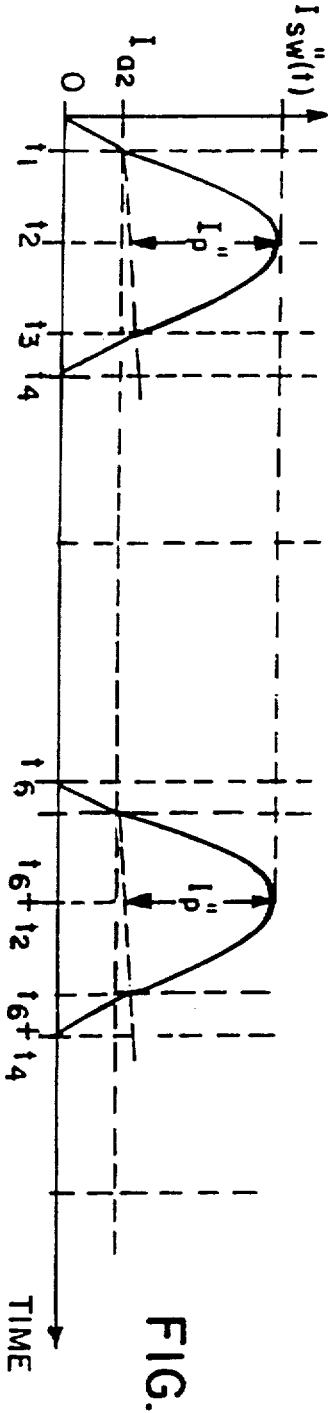
Figure 12A:
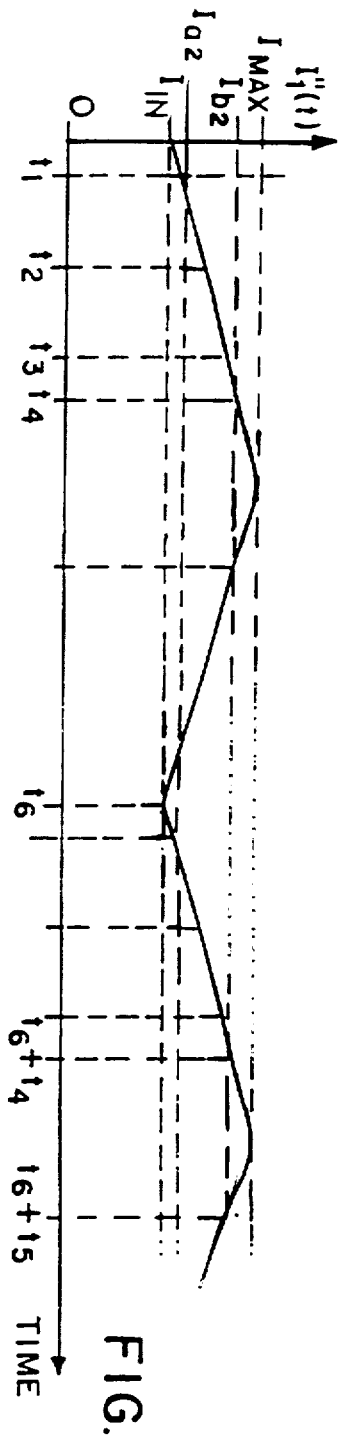
Figure 12D:
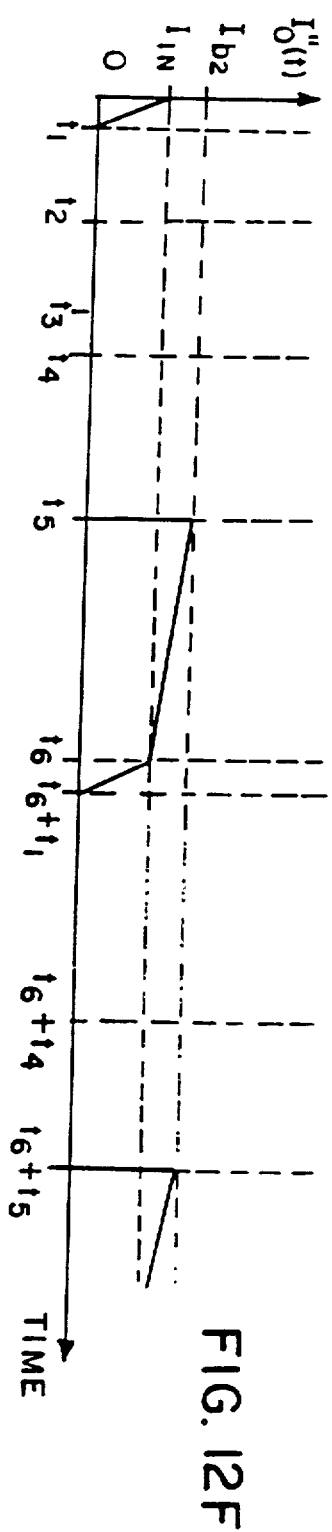
Figure 12E:
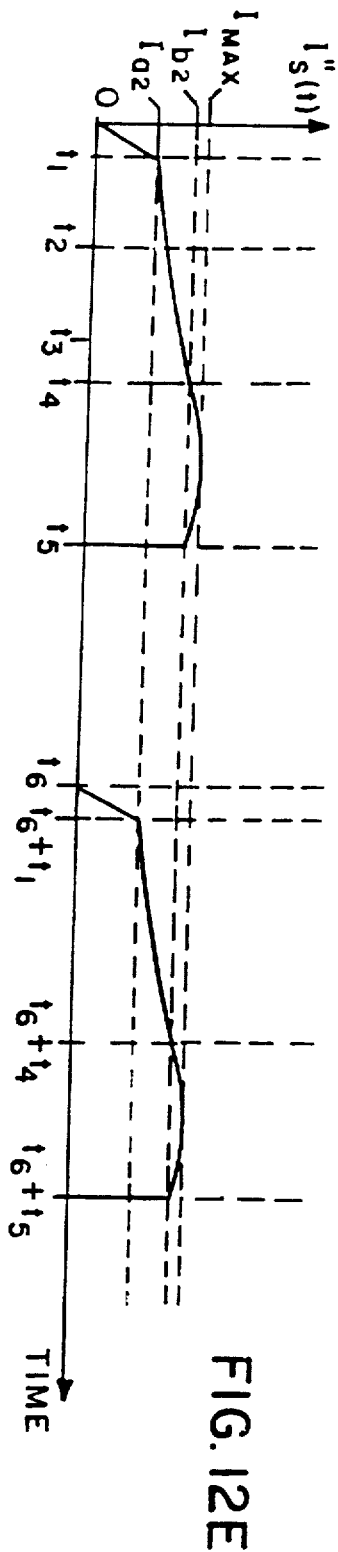
Figure 12F:
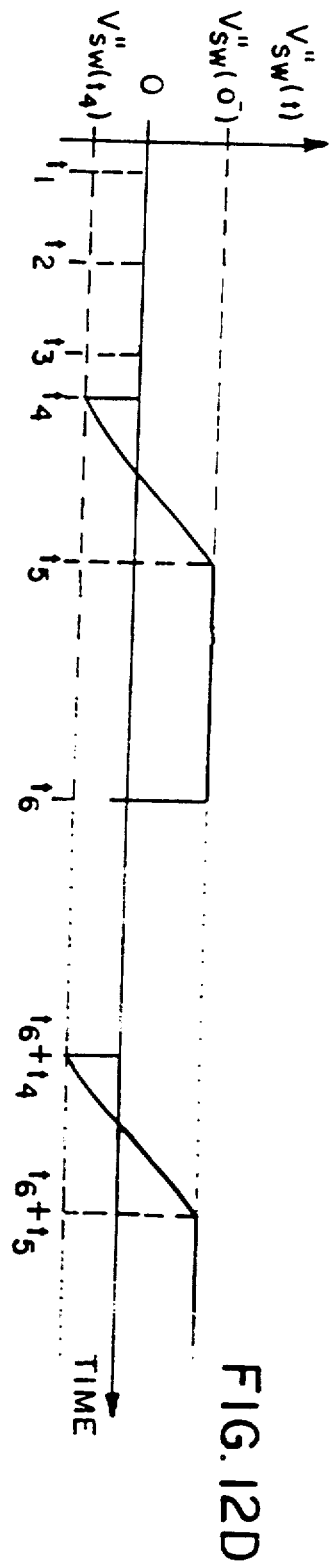
Figure 28:
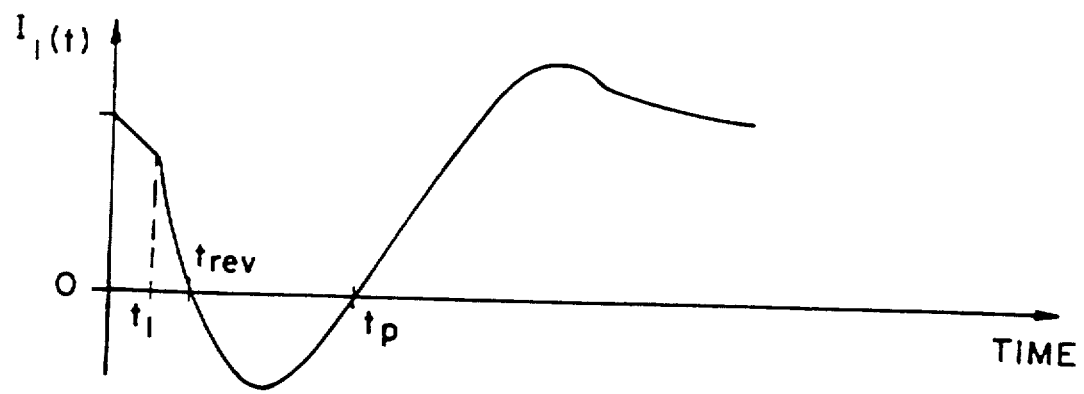
Figure 28:
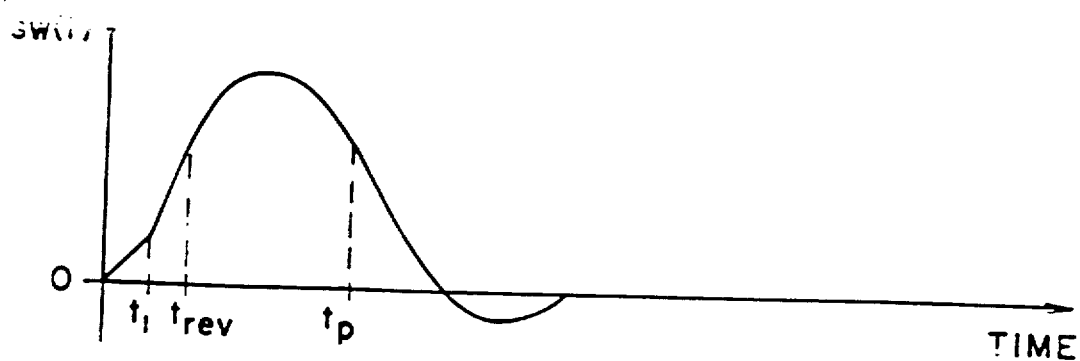
Figure 28:

Furthermore, since energy transfer takes place between the first capacitor and both inductors, and the input inductor is connected to the input source, the peak sinusoidal excursions of the currents and voltages are reduced to values which are closely approximated by:

$$Vc'(t3) = -Vo + 2 \cdot \Delta V;$$

$$Vx' = (Vo - 2 \cdot \Delta V) \sqrt{1 - \frac{Ia1^2}{Ip^2}}; \text{ and}$$

$$Ip' = \frac{Lp}{L2} (Vo = \Delta V) \sqrt{\frac{C}{Lp}}; \text{ where}$$

$$\Delta V = Vin \cdot \frac{Lp}{L1},$$

and Ia1 is current in the first inductor at time t1. Thus, the peak negative excursions of the voltages across the capacitor, and the peak excursions of the currents in the switch and capacitor are reduced as the input source voltage is increased. Also, as shown in FIGS. 10A and 11A, a fraction of first capacitor current flows as a sinusoidal current in the input inductor during this interval. The ZCB converter of FIG. 8 does not exhibit these effects because the switch connects the input inductor to the input source return; hence the values Tc'', Vc"(t3), Vx", and Ip" for this converter are equal to the values, Tc, Vc(t3), Vx and Ip, previously given for the case where L1>>L2. For both converters, a linearly increasing component of current (as indicated by the dashed line in the waveforms for Isw(t) in FIGS. 10B through 13B), resulting from the input source voltage being impressed across one or both inductors, will also flow in the switch. This incremental switch current increases the duration of the energy transfer interval, and reduces the maximum allowable value of the average input currents to a value below their respective values of Ip', Ip". Thus as the ratio of L1 to L2 is reduced the maximum power rating of the converter will decrease.

For the converter of FIG. 7, the current I1'(t) will reach a minimum value, I'min (FIGS. 10A and 11A), when the value of the capacitor voltage, Vc'(t) (FIGS. 10C and 11C), declines to a value equal to Vin (and the voltage across L1 equals zero), and the current will then increase as the capacitor voltage continues to decrease. In the short cycle mode the current will continue to increase throughout this time period, since the capacitor voltage remains below Vin. In the long cycle mode, the capacitor voltage may again rise above Vin (for light loads) during the period and the current may reach its peak value, I'max (Fig. 11A).

d) t4<t≦t5: When the switch opens, the voltage across the switch in the converter of FIG. 8, Vsw"(t4) (FIGS. 12D and 13D), will not equal the voltage across the first capacitor, Vc"(t4), because of the voltage divider effect of the two inductances. Rather, the voltage will equal Vsw"(t4)=(Vc(t4)·L$_1$/(L$_1$+L$_2$))+(Vin·L$_2$/(L$_1$+L$_2$)), where Vc(t4) equals +Vx in the long cycle mode, and −Vx in the short cycle mode. The absolute value of Vsw"(t4) will be less than Vo. After the switch opens at time t4, the currents and voltages in the ZCB converters of FIGS. 7 and 8, will, for a finite ratio of L1 to L2, exhibit sinusoidal variations having characteristic time scales $$T1' = \frac{\pi}{\omega_1'} = \pi \sqrt{L1 \cdot C} \text{ and}$$

$$T1'' = \frac{\pi}{\omega_1''} = \pi \sqrt{(L1 + L2) \cdot C},$$

respectively. For either of the converters of FIG. 7 or 8 operating in the short cycle mode, it can be shown that, as the load is reduced, the time period, t=t4 to t=t5, during which the capacitor recharges to Vc'(t5)=Vc"(t5)= +Vo, will range between T1'/2 (T1"/2) and T1' (T1"), dependent on the relative values of Vin and Vo and the ratio of L1 to L2. As the ratio L1/L2 increases, the time period increases, and, for very large inductance ratios, as previously described, the variation will become essentially linear and the time period can become very large as Iin is reduced. As a practical matter, the ratio of L1 to L2 would not generally be made very small (e.g., less than 10 to 1), else the linear ramp in current in L1, induced by the input source during the time period t=0 to t=t4, described above, will become large. Larger L1/L2 ratios are desirable from a viewpoint of parallel array operation, since wider variation in t5 as a function of load reduces the significance of second-order effects (e.g., diode and switch voltage drops in physically realizable converters) on power sharing between converters. A finite inductance ratio has similar effects on long cycle operation. However, because the dependence of t5 on load is weak, even where L1 is much greater than L2, the reduction in the duration of this portion of the operating cycle is less significant. In general, the current in the input inductor will have reached its maximum value (I'max (FIGS. 10A and 11A) for the converter of FIG. 7, and I"max (FIGS. 12A and 13A) for the converter of FIG. 8) prior to time t5, as a result of the capacitor voltage rising above Vin, and, at time t5, will be decreasing. At time t5 the input current will be Ib1<I'max (FIGS. 10A and 11A), for the converter of FIG. 7, and will be Ib2<I"max (FIGS. 12A and 13A), for the converter of FIG. 8.

e) t5<t≦t6: A time t5 the current flowing in the input inductors of each converters of FIGS. 7 and 8, Ib1 and Ib2, respectively, will be greater than Iin, due to the linear increase in input current induced in the input inductor by the input source voltage during the preceding portions of the operating cycle. Thus, the output currents, Io'(t5)=Ib1, and Io"(t5)=Ib2, will be greater than Iin at time t=t5. As noted previously, the switch voltage in the converter of FIG. 8 will assume a value less than Vo.

Throughout the balance of the period, the currents Io'(t) and Io"(t) will decline linearly back toward Iin due to the reverse voltage, Vo−Vin, being impressed across one or both of the inductors.

In general, the advantages afforded by the current-commutating switches of FIGS. 4A and 4B result from the following topological features of the switch:

a) placement of an inductive element in the serial loop formed by the bidirectional switch, the output diode and the voltage sink (e.g., the output capacitor and the load), one end of the inductive element being connected to the bidirectional switch;

b) placement of the output diode between the end of the inductive element which is not connected to the bidirectional switch and the voltage sink;

c) placement of capacitor at the junction of the output diode and the inductive element, the capacitor cooperating with the inductive element to define the characteristic time scale for the rise and fall of the sinusoidal component of current which flows in the bidirectional switch.

Placement of inductance, as noted in (a) above, ensures that current in the switch is zero when the switch is turned on; that the rate-of-change of current at turn-on is finite; and that reverse recovery effects associated with the output diode are essentially eliminated. Placement of the output diode, as noted in (b), above, ensures that the current, I1(t), flowing into the input terminal of the current commutating switch at the time that the bidirectional switch is turned off (when Isw is zero) will flow through to the voltage sink. Placement of the capacitor, as noted in (c), above, provides for the smooth variation of the rise and fall of switch current and return of the switch current to zero subsequent to closure of the switch. In the ZCB converters of FIGS. 7 and 8, interposition of inductance between the input voltage source and the input terminal of the ZC switch provides the basic mechanism for allowing energy to be transferred from a low voltage source to a higher voltage sink. In general, then, as shown in FIG. 14, a ZCB converter according to the present invention may be viewed as consisting of a magnetic circuit 200, a two-terminal switch 202, a first capacitor 204 and an output diode 206. The magnetic circuit has three terminals: an input terminal 208, an output terminal 210 and a shunt terminal 212, and is characterized by a value of inductance, Lio, which exists between the input terminal 208 and the output terminal 210 and a value of inductance, Lso, which exists between the shunt terminal 212 and the output terminal 210. In practice, the inductance between the input terminal and the shunt terminal will be greater than or equal to the inductance between the shunt terminal and the output terminal. If a magnetic circuit meeting these conditions is used in the ZCB converter of FIG. 14, then the primary conditions for achieving both zero-current switching and transfer of energy from a low voltage source to a higher voltage sink will have been met. Interposition of inductance between the capacitor and the two-terminal switch (the inductance between the output terminal and the shunt terminal of the magnetic circuit) ensures that the rise and fall of switch current will be smooth (sinusoidal) and therefore provides the basis for switching at zero current. Presence of inductance in series with the input source (the equivalent input inductance at the input terminal of the magnetic circuit) provides the basic mechanism for allowing energy to be transferred from a low voltage source to a sink at higher voltage. Thus, although the ZCB converters of FIGS. 7 and 8 utilize a magnetic structure consisting of two lumped inductors, a ZCB converter according to the present invention can be implemented with many other magnetic circuit structures. For example, FIG. 15 illustrates five other possible embodiments of ZCB boost converters which utilize coupled inductors. In Figures 15A and 15B the magnetic circuits 200 consist of a single coupled inductor. In FIGS. 15C and 15D the magnetic circuits 200 consist of a combination of a coupled inductor and lumped inductors. In FIG. 15E the magnetic circuit 200 in the ZCB converter includes a pair of coupled inductors and up to three lumped inductors.

In the converters of FIG. 15, the coupled inductors are of the conventional kind where the two windings are not perfectly coupled. Thus, each winding has an inductance value which combines a "leakage inductance" (equivalent to a lumped inductance associated with that portion of the flux in the winding which does not couple into the other winding) and a "magnetizing inductance" (representative of the inductance associated with flux that links both windings). As a circuit element, such a structure exhibits transformer action which is moderated by the effects of the leakage inductances. The traditional circuit model for such a device is shown in FIG. 16. In the Figure, the coupled inductor consists of a primary winding having N1 turns and a secondary winding having N2 turns. The coupling coefficients of the two windings are k1 and k2, respectively ($0 \leq k1, k2 \leq 1$). The effect of flux linkage between the windings is represented by an ideal transformer having a turns ratio $a = N1/N2$ and a lumped magnetizing inductance, of value Lm. The leakage inductances of the primary and secondary windings are represented by lumped inductors of value L11 and L12, respectively. The relative values of the lumped inductors, L11, L12 and the magnetizing inductance Lm are dependent on the magnetic properties of the media linking the windings (e.g., the permeability of the magnetic material used) and the construction of the coupled inductor (e.g., N1, N2, k1 and k2). The total inductance of the primary winding alone is $Lpri = L11 + Lm$; the total inductance of the secondary winding alone is $Lsec = L12 + Lm/a^2$.

To first order, the relationships between L11, L12, and Lm are shown in Figure 16 for both the general case (k1 not equal to k2) and for the case where $k1 = k2 = k$. The effects of the coupled inductor on the operation of the ZCB converter may be illustrated with reference to FIGS. 17 and 18, which show, respectively, the ZCB converters of FIGS. 15A and 15B with the coupled inductors replaced by the circuit model of FIG. 16. It should be apparent that the operating principles of these converters apply directly to the converters of FIGS. 15B and 15D, since, for any combination of a coupled inductor and lumped inductances, there is an equivalent single coupled inductor having appropriate values of k1, k2, a, N1 and N2.

The primary effects of coupling in the magnetic circuits of the converters of FIG. 17 and 18 can be illustrated by comparing the operation of these "coupled" converters to the operation, previously described, of their "discrete" equivalents of FIGS. 7 and 8 (and, within this context, it should be noted that the converters of FIGS. 7 and 8 are limiting cases of the "coupled" converters of FIGS. 17 and 18: if Lpri (or Lsec) is assumed to be fixed, then as k goes to zero the coupled inductor reverts to two lumped inductors). For convenience, we will refer to the ZCB converter configurations of FIGS. 7 and 17 as "L" configurations (because of the orientation of the inductors in the circuit models), and the converters of FIGS. 8 and 18 as the "T" configurations. Thus, the converters of FIGS. 7, 8, 17 and 18 will be referred to, respectively, as: discrete-L; discrete-T; coupled-L; and coupled-T configurations. We will also assume that an operating cycle starts with closure of the bidirectional switch at $t = 0$, at which time the current, $I1(0^-)$, flowing into the input of the ZCB converter is equal to Iin; the input source voltage is Vin; and the converters are delivering an output voltage Vo, where $Vo > Vin$. The conventions used in FIGS. 4, 5, 10, 11, 12 and 13 for defining the beginning and end of each phase will also be used: the current Io(t) goes to zero at time t1; the energy transfer phase begins at time t1 and ends at time t4 (when the bidirectional switch is opened at zero current); the active portion of the cycle ends at time t5, when Vc(t) returns to Vo; and the operating cycle ends at time t6 with another closure of the bidirectional switch and the start of a new cycle. Although the relative values of voltages, currents and time intervals will be different for the discrete and the coupled converters, the shapes of the waveforms for a given operating mode will be similar to those in FIGS. 10 through 13, and these figures will be used for reference.

With reference to FIGS. 17 and 18, the effects of coupling can be summarized as follows: an increase in the voltage across the bidirectional switch when the switch is off; reduction in the peak voltage swing across the capacitor during the energy transfer phase; and a reduction in the peak current in the bidirectional switch:

a) Switch Voltage: For the converter of FIG. 17, at time $t = 0^-$ (just prior to closure of the bidirectional switch), the voltage Vpri is negative and equal to $-(Vo - Vin)$. Due to coupling, a portion of this voltage will appear across the secondary winding, and, with the polarity of the windings shown in FIG. 17, the switch voltage at $t = 0^-$ will be greater than Vo. FIG. 19 gives both a general equation for $Vsw(0^-)$, as well equations for three special cases:

1) Equally Coupled: In this case we assume that $k1=k2=k$. Under these circumstances $Lpri=a^2 \cdot Lsec$, $Ll1=a^2 \cdot Ll2=(1-k) \cdot Lpri=a^2 \cdot (1-k) \cdot Lsec$ and $Lm=k \cdot Lpri$. This case allows illustrating the basic operating principles of the coupled converters, and the general effects of k and a on circuit performance.

2) Tightly Coupled: In this case we assume that $k1=k2=k$, and that k approaches (but does not equal) unity. Under these circumstances $Lpri=a^2 \cdot Lsec$, $Ll1=a^2 \cdot Ll2$ and $Lm>>Ll1,Ll2$. By implication, the coupled inductor is assumed to be wound with a relatively large number of turns so that the leakage inductances are not vanishingly small. The relatively large value of Lm implies that the current, Im, flowing in the magnetizing inductance will not vary significantly during an operating cycle and that the energy stored in the magnetizing inductance is essentially constant and relatively large.

3) Zero Coupling: In this case We also assume that $k1=k2=k$, and that k goes to zero. In this limiting case, the effect of transformer action disappears and the coupled inductor degenerates into two lumped inductors: $Lm=0$ and $Lpri=Ll1=a^2 \cdot Lsec=a^2 \cdot Ll2$. As noted above, in this case the coupled converters of FIG. 17 and 18 become equivalent to the discrete converters of FIGS. 7 and 8.

In general, for nonzero coupling, the switch voltage will increase as a function of both (Vo−Vin) and k, and will decrease as the turns ratio, a, increases. Switch voltage is maximized if the coupled inductor is Tightly Coupled or if the input voltage approaches zero (as would occur in a power factor correcting preregulator application at times of AC line crossover). As the coupling approaches zero (discrete configuration), the switch voltage approaches Vo.

The equations for the switch voltage at $t=0^-$ for the converter of FIG. 18 are given in FIG. 20. Examination of the equations indicates that, if the coupling is zero, $Vsw(0^-)$ is always less than Vo, due to the voltage division effect of the two discrete inductors, whereas for the other cases $Vsw(0^-)$ may either be greater than or less than Vo. Consideration of the Equally Coupled and Tightly Coupled equations indicates that: a) for $Vsw(0^-)$ to be positive, $k<a$, and b) for $Vsw(0^-)$ to be less than Vo, $a<1/k$. Thus, for Vo to be both positive and less than Vo, $1/k>a>k$. As k goes to zero any positive value of a will meet this condition, and $Vsw(0^-)$ will always be less than Vo. However, for finite coupling ($0<k<1$) there is a range of values of a which satisfy the condition (e.g., for $k=0.5$, values of a between 0.5 and 2), and this range reduces to zero as k approaches 1. Thus, in the Tightly Coupled case, $Vsw(0^-)$ is always greater than Vo.

b) Capacitor Voltage and Switch Current During Energy Transfer Phase: The switch closes at time $t=0$ and remains closed until, at time $t=t4$, the current in the switch returns to zero. Between time $t=0$ and $t=t1$, the output current, Io(t), is ramping down and the capacitor voltage, Vc(t), is constant and, to first order, equal to Vo. At time t1 the output current goes to zero, the output diode blocks, and the energy transfer phase begins. As previously discussed, time t4 may correspond to either the first zero crossing (short cycle mode) or the second zero crossing (long cycle mode) of the current Isw(t). Whereas in the discrete configurations the currents in the inductors were dependent only upon the voltage across the inductor, in the coupled configurations the voltage and current for either winding is, in general, dependent upon the voltage and current in the other winding. As k approaches unity, the coupled inductor becomes more "transformer-like" and the relationships between the winding voltages and currents approach $Vpri=a \cdot Vsec$ and $Ipri=Isec/a$. Insight into the effects of coupling can be gained by considering the T-configuration converter (FIG. 18) with the bidirectional switch closed. If $k=0$, the input source is impressed entirely across the input inductor and the input source voltage has no effect on the voltage or current in the output inductor. If, however, the inductors are tightly coupled, a portion of the input voltage (approaching Vin/a as k approaches unity) is reflected into the secondary winding. Since the rate at which the output current declines between $t=0$ and t1, and the peak swing in capacitor voltage between time t1 and t4, are both dependent upon this reflected voltage, it would be expected that increased coupling (more reflected voltage) would cause an increase in t1 and a decrease in the peak sinusoidal voltage swing across the capacitor, and that these effects would be reduced as the turns ratio, a, increases (less reflected voltage). A similar argument applies to the L-configuration converter of FIG. 17.

To predict converter behavior during the period between $t=0$ and t4, it is useful to lump the effects of all of the circuit elements between the input source and the capacitor (e.g., the coupled inductor, the closed switch, and the input voltage source) into a Thevenin's equivalent circuit. Thus, FIG. 21 is a circuit model of the L-configuration converter of FIG. 17 with the bidirectional switch closed and the referenced circuit elements replaced with a Thevenin's equivalent circuit model (the "L-equivalent" circuit); FIG. 22 is a circuit model of the T-configuration converter of FIG. 18 with the bidirectional switch closed and the referenced circuit elements replaced with a Thevenin's equivalent circuit model (the "T-equivalent" circuit). In both Figures the effects of the coupled inductor, the input source, and the closed switch are lumped into an equivalent open-circuit input voltage source, of value Voc, and an equivalent inductance, of value Leq. The values of Voc and Leq, for the various cases previously defined, are shown in the Figures. The values of Leq and C will define the characteristic time constant for the energy transfer interval (time t1 to t4) and the values of Voc, Vo and Leq will define the rate at which the current Io(t) declines during the time interval $t=0$ to $t=t1$. Examination of the equations indicates that the magnitude of Leq is, in all cases, essentially first order dependent on the leakage inductance values (which, for the discrete case, are the values of the lumped inductances) and the values of k and a. Even where the primary and secondary inductances, Lpri and Lsec, may be very large in comparison to the values of the leakage inductances (i.e the Tightly Coupled case with k close to unity) Leq cannot exceed $2 \cdot Ll2$.

When the switch closes at $t=0$, the output current, Io(t) will start to ramp down. If $Il(0)=Io(0)=Iin$, then, with reference to FIGS. 21 and 22:

$$Io(t) = Iin - \frac{Vo - Voc}{Leq} t \qquad (12)$$

$$0 < t < t1$$

where $Io(t1) = 0$:

$$t1 = \frac{Iin \cdot Leq}{Vo - Voc}. \tag{13}$$

For converters having the same values of Leq, t1 will tend to increase as Voc increases. Examination of FIGS. 21 and 22 indicates that, in general, Voc increases with increased coupling and decreases with increased turns ratio, a. Thus, as predicted above, t1 will increase with increased k, and this effect is reduced as a increases. With respect to the behavior of the converter input current, I1(t), during this time period, it has been shown that the input current for the discrete-L converter declines during the period t=0 to t=t1, while this current increases for the discrete-T. In the coupled-L converter input current will also decline during this period. However, for the coupled-T converter, the degree to which the output voltage is reflected back into the primary winding will determine whether the input current increases or decreases, and this will depend upon the values of Vo, Vin, a, and k. With reference to FIG. 18, it can be shown that the input current of a coupled-T converter will increase between t=0 and t=t1 if k·a<Vin/Vo, else the current will decrease.

Starting at time t1, the energy transfer phase begins. Since the capacitor voltage at time t1, Vc(t1), equals Vo, then, with reference to FIGS. 21 and 22, the capacitor voltage during the energy transfer interval will be:

$$Vc(t) = Voc + (Vo - Voc) \cdot \cos(\omega_{eq} \cdot (t - t1)) \tag{14}$$

$$t1 < t < t4$$

where $$\omega_{eq} = \frac{1}{\sqrt{Leq \cdot C}} \tag{15}$$

Thus, the capacitor voltage starts at a value Vo and swings down to a value which is below Vo in an amount 2·(Vo−Voc). As Voc increases (increased k, decreased turns ratio, a, increased Vin) the peak voltage swing is reduced.

With respect to the effect of coupling and turns ratio on the current in the bidirectional switch, insight can again be gained by considering the T-configuration converter of FIG. 18. For k=0, all of the capacitor current flows in the switch. As k increases, however, transformer action causes a portion of the capacitor current to be reflected as current flow in the primary winding of the coupled inductor. As k approaches unity a fraction, 1/a, of the sinusoidal capacitor current will flow back to the input source and a fraction, (a−1)/a, will flow in the secondary winding and the bidirectional switch (for the converter of FIG. 17 the fractions are, respectively, 1/(1+a) and a/(1+a)). Thus, increased coupling causes a reduction in the peak value of the sinusoidal component of the switch current, the effect being reduced as the turns ratio increases. With reference to FIGS. 17 through 22, and using the parametric conventions used in FIGS. 10 through 13, the equations describing the time variation of the switch current during the energy transfer interval are given in FIGS. 23 and 24 for the L and T configuration converters, respectively, for the Equally Coupled, Tightly Coupled and Discrete cases. It should also be noted that the waveshapes between time t=0 and t=t4 for the coupled-L converter will be similar to those shown in FIGS. 10 and 11 for the discrete-L configuration. However, the waveshapes for the input current, I1(t), for the coupled-T converter will be different from those shown in FIGS. 12 and 13 during this period, because a portion of the sinusoidal capacitor current which flows during the energy transfer phase will be reflected back to the primary winding of the coupled inductor. Thus, whereas the discrete-T input current between t1 and t4 was simply a linearly increasing current, the waveshape for the coupled-T input current will consist of both a linearly increasing component and a sinusoidal dip.

Thus far it has been assumed that current flowing in the input inductance of the ZCB converter has been continuous (i.e., does not return to zero) throughout the cycle. For any given values of input source voltage and converter output voltage, and for finite values of input inductance, there will be some value of load below which this assumption will no longer be valid. Consider, for example, the discrete-L converter of FIG. 7 operating in the long cycle mode (waveforms of FIG. 11B). The current in the input inductor 80 ramps (approximately) linearly between two values, Imax and Imin, where the peak to peak excursion, Imax-Imin, depends upon the input source voltage, Vin, the converter output voltage, Vo, and the value of the input inductor, L1. If the average input current becomes less than (Imax-Imin)/2, the input current will tend to reverse during part of the operating cycle. Since current cannot flow in reverse in the output diode, the first capacitor 84 (FIG. 7) must supply the reverse current and this will lead to a resonant energy transfer back and forth between the first capacitor and the input inductor and input source. A similar scenario applies to any of the discrete or coupled ZCB converters previously described, in either operating mode. This condition can be avoided by placing an input unidirectional conducting device between the input source and the ZCB converter input. For example, as shown in FIG. 25A, a second diode, 112 poled to conduct current in the direction of the load, can be placed in series with the converter input. In an important class of applications, where the input voltage to the ZCB converter is derived by rectifying an AC prime power source (e.g., in a power factor correcting preregulator), the input rectifier (e.g., 114 in FIG. 25B) can itself perform the function. For discrete converter configurations, the worst case reverse voltage which the input unidirectional conducting device must withstand is equal to the converter output voltage Vo. For coupled configurations, however, transformer action will, in general, result in a higher reverse voltage. Consider, for example, that the bidirectional switch in an Equally Coupled L or T-configuration converter (FIGS. 17, 18) is turned on when I1(0)=0. The output voltage, Vo, will be impressed across the secondary winding of the coupled inductor and a voltage, of value a·k·Vo, will appear across the primary winding. For the L-configuration converter this voltage adds to the output voltage and can result in a worst case (Vin=0) reverse voltage across the input unidirectional conducting device equal to Vrev=Vo·(1+a·k). For the T-configuration converter Vrev=a·k·Vo. In either case, the reverse voltage across the input unidirectional conducting device will decline sinusoidally as the capacitor voltage rings down (into an equivalent inductance equal to Lsec) and the input unidirectional conducting device will begin to conduct when Vrev has declined below Vin.

Figure 26:
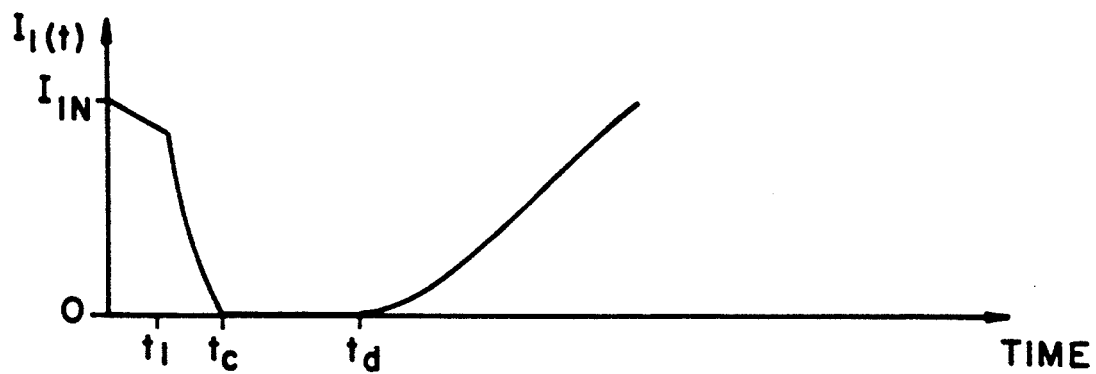
Figure 26:
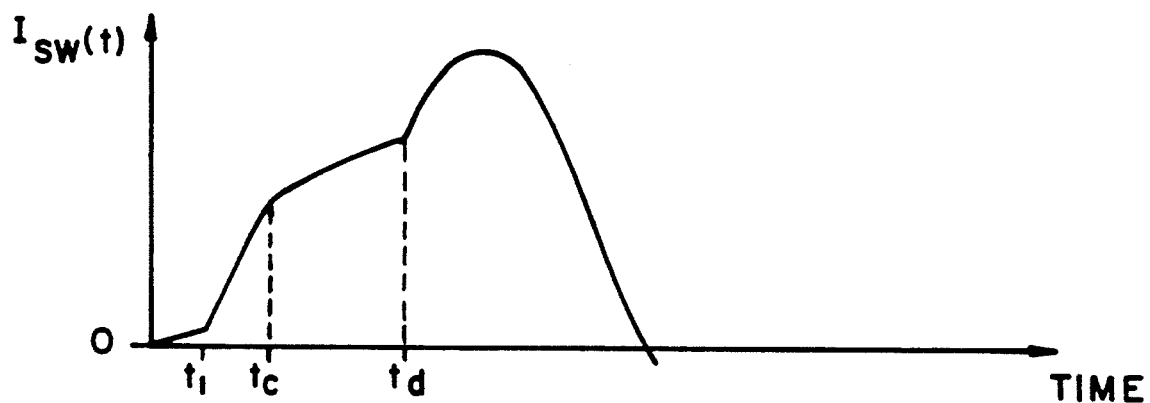
Figure 26:
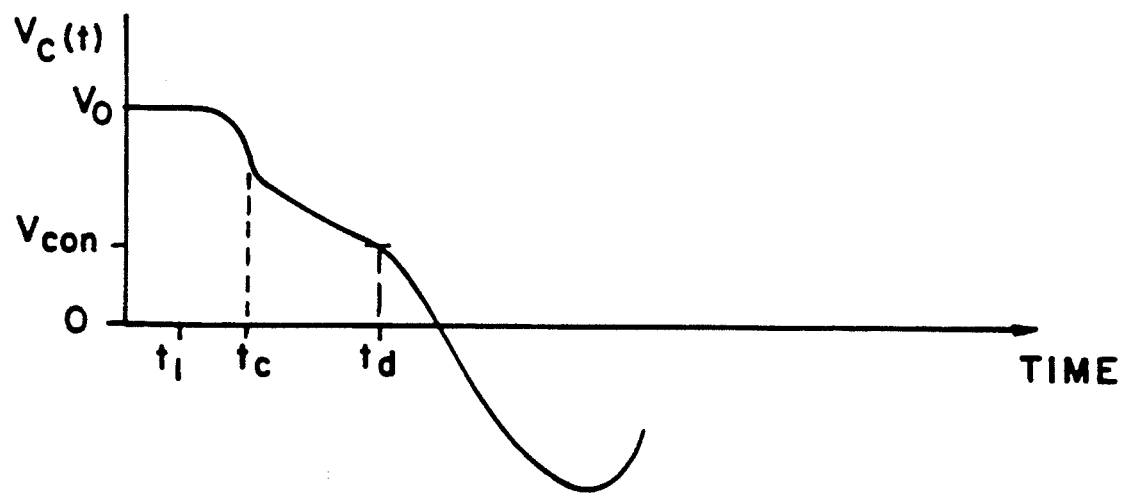

When an input unidirectional conducting device is used, the input current may also go discontinuous (go to zero) during the active portion of the operating cycle. For example, with reference to FIGS. 10 and 11 (discrete-L configuration), as Iin is reduced (for example, due to increasing Vin, and/or decreasing load) there is some value below which the input current will reach zero prior to t=t2. This will also be true of both the coupled-L and coupled-T converters, since, as previously noted, coupling forces a portion of the sinusoidal current which flows during the energy transfer cycle to flow back toward the input source. If I1(t) goes to zero, the input unidirectional conducting device will cease conducting and the characteristic time constant of the ZCB converter will increase to a value $\pi\sqrt{Lsec \cdot C}$. For the discrete-L converter Lsec=L2 (FIG. 7); for the coupled converters Lsec is the secondary inductance of the coupled inductor. The general effect, as shown in FIG. 26, will be to increase the duration of the energy transfer phase, and therefore increase the overall period of an operating cycle. In FIG. 26, the operating cycle starts with I1(0)=Iin. At time t1, the energy transfer phase begins, but, at time tc, I1(tc) goes to zero. Between time tc and td, the input current remains at zero, and, owing to the increase in the characteristic time constant, the time-variations in Isw and Vc are slowed. At time t=td, the capacitor voltage has declined to a value, Vcon, at which forward conduction of input current in the unidirectional conducting device is again possible. For the discrete-L converter Vcon=Vin, whereas for the equally coupled-L and equally coupled-T converters, Vcon equals Vin/(1+ak) and Vin/ak, respectively. It is to be noted that discontinuous flow of I1(t) cannot occur during the active portion of a cycle in the discrete-T converter, because input current increases continuously when the bidirectional switch is closed.

In general, then, a ZCB converter having an input unidirectional conducting device will exhibit the following behavior as load (e.g., I1(0)=Iin) is reduced:

a) below some value of load (some value of Iin), the input current will go discontinuous during the active portion of the operating cycle (e.g., as in FIG. 26). Since there are no volt-seconds associated with the input inductance between time t=tc and t=td, and because the length of the active portion of the cycle has increased, the effect will be to further decrease the operating frequency of the converter (for constant Vo);

b) as load is further reduced, I1 and Io will eventually decline to zero prior to the beginning of the next operating cycle. Operating cycles will always begin at Iin=0, and the values of t4 and t5 will be essentially invariant. Since the input and output currents start each cycle at zero, and return to zero prior to the next operating cycle, the volt-seconds associated with the inductances is zero. The output current will be a series of essentially trapezoidal pulses which begin at t=t5, and which decay to zero prior to t6. Thus, average output current becomes essentially solely a function of operating frequency and the frequency will drop as load is reduced.

The effects of discontinuous operation are most evident when operating in the long-cycle mode. It has already been shown that in this mode the variation of operating frequency with load is very small when converter input current is continuous. As converter load is reduced, however, discontinuous operation will start to occur during the operating cycle and a stronger dependence of operating frequency on load will become evident. As load is further reduced and the value of Ii declines to zero, operating frequency will reduce essentially linearly with load.

In other embodiments, coupled ZCB converters according to the present invention can be constructed which exhibit the advantages of the coupled ZCB converters previously described, but which also exhibit forward power flow characteristics during the active portion of the operating cycle. This has the beneficial effects of both reducing the operating frequency range of the converter and placing a bound on the maximum value of reverse voltage seen by the input unidirectional conducting device. Several such embodiments are shown in FIGS. 27A through 27D. In the Figures, the various embodiments are seen to be essentially the same as their respective counterparts in FIGS. 15A through 15D, except that each of the converters of FIG. 27 includes both an input unidirectional conducting device 210, of the kind previously discussed, and an additional forward diode 212.

Figure 28:
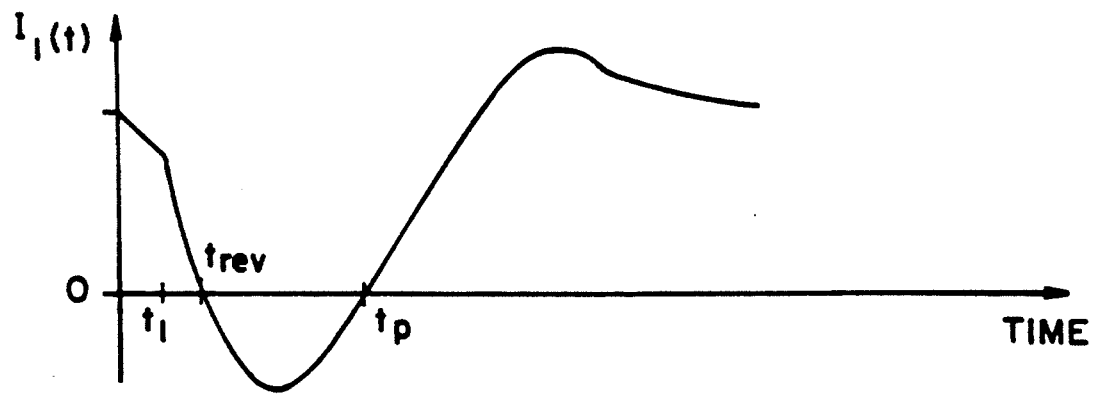
Figure 28:
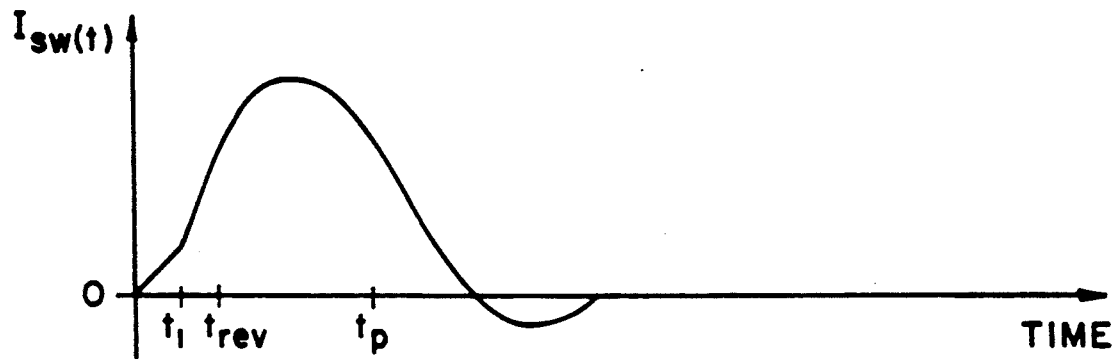
Figure 28:
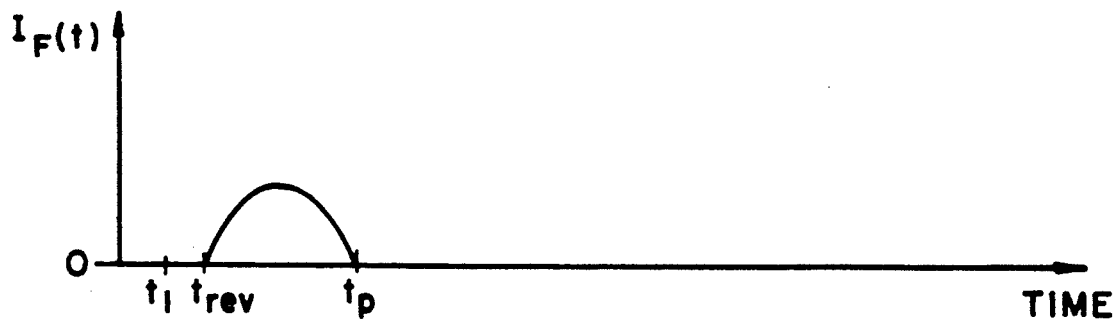
Figure 28D:
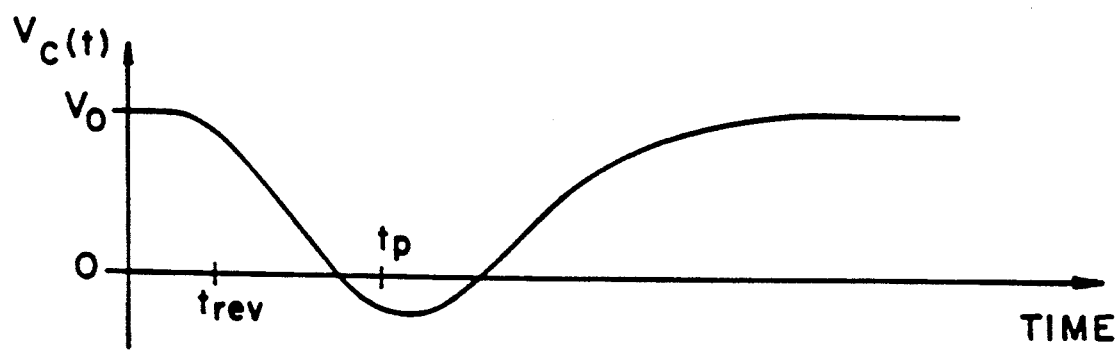
Figure 28E:
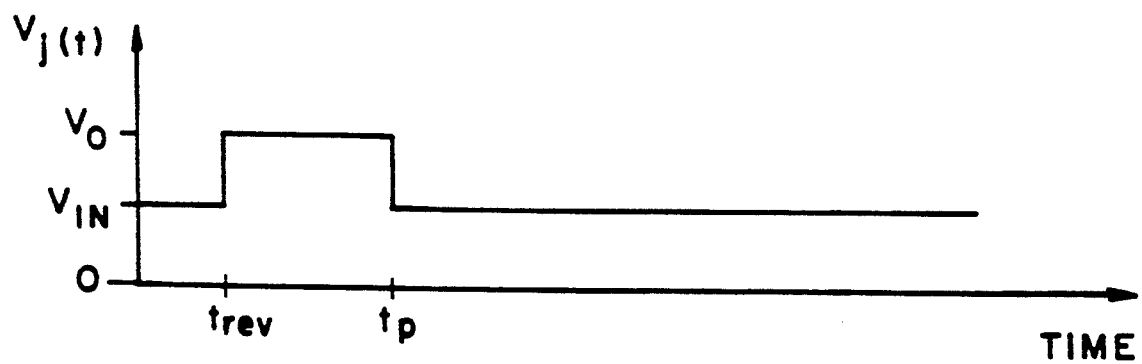

The effect of the forward diode 212 can be explained by considering the operation of the coupled-T converter of FIG. 27B at light load. As discussed above, it will be assumed that the input current, I1(t) declines to zero during the active portion of the operating cycle. In the absence of the forward diode, the input unidirectional conducting device 210 prevented reversal in the flow of I1(t) and the characteristic time constant was shown to increase until such time as I1(t) could again resume forward flow. By including the forward diode, however, reverse flow of current I1(t) is not blocked, but is routed to the converter output. FIG. 28 shows waveforms for the converter of FIG. 27B operating at light load. Between time t=0 and t=trev the voltages and currents are as previously described for the converter of FIG. 15B, and the voltage Vj(t), at the junction of the input unidirectional device and the forward diode, is essentially equal to Vin. The Thevenin's equivalent circuit of FIG. 22 applies during this time interval. At time trev the input current, I1(t), becomes zero and, if $k \cdot a \cdot Vc(trev) > Vo$, then the voltage reflected back to the primary will be greater than Vo and the forward diode will conduct current. Thus, I1(t) will flow in reverse, through the forward diode, to the converter output (in FIGS. 27B and 28, the current in the forward diode is shown as If(t)). The voltage Vj(t) will increase to equal Vo and the converter will effectively be operating off of an "input source" equal to Vo. With reference to FIG. 22, the Thevenin's open-circuit voltage rises, since the value of Vin in the equations for Voc is replaced with the value Vo. This reduces the peak negative voltage swing on the capacitor, and limits the maximum reverse voltage seen by the input unidirectional conducting device 210 to (Vo−Vin). For the Equally Coupled case, at light load, the peak swing in the capacitor voltage is approximated by 2·(Vo−Vo·k/a). If a/k is two (which must be so if, for example, a>2), then the peak swing approximately equals Vo and the capacitor voltage will tend to ring down only to zero volts (for the coupled-L converter (FIG. 27A), the same is true if a>1). Because reverse flow of primary winding current, I1(t), can occur, there is no change in the characteristic time constant of the converter. At time tp the current in the forward diode goes to zero and forward current I1(t) can again flow in the input unidirectional conducting device. The voltage Vj(tp) again equals Vin. As converter loading is reduced, Iin drops, and the width of the current pulse which flows in the forward diode, tp−trev, will increase. Under fully discontinuous conditions (Iin=0), the pulse width approaches the characteristic time constant. As loading is increased, the width decreases, and, above some value of load, will go to zero, because current, I1(t), will flow continuously in the input unidirectional conducting device 210. Under this condition the forward diode 212 is inactive, and, for the same component values, the operation of the converters of FIG. 27 becomes identical to the operation of their respective counterparts of FIG. 15.

By providing a mechanism for forward energy transfer during the active portion of the cycle, incorporation of a forward diode in a ZCB converter, as illustrated in FIG. 27, yields the following performance benefits:

a) The operating frequency at light loads will be increased. In ZCB converters without the forward diode, energy transfer to the converter output takes place only after the active portion of the cycle has ended and the capacitor voltage has once again increased to Vo. Furthermore, as load is reduced the change in characteristic time constant increases the duration of the active portion of the operating cycle. Since both effects increase the overall period required to transfer a given amount of energy, the light load operating frequency of a ZCB converter which does not incorporate a forward diode will be lower than the frequency of an equivalent converter which does.

b) Since the voltage at the junction of the input unidirectional conducting device 210 and the forward diode 212 cannot exceed the converter output voltage, Vo, the reverse voltage rating of the input unidirectional conducting device is bounded. Consider, for example, the coupled-L converter of FIG. 15A having a tightly coupled inductor with a turns ratio a>1. In discontinuous operation (i.e at no load, or at light load) the voltage at the junction of the input unidirectional conducting device and the primary winding of the coupled inductor will rise to a peak of (1+a).Vo. With the forward diode (FIG. 27A) the voltage cannot exceed Vo.

There are many possible embodiments of zero-current switching boost converters, which, in accordance with the present invention, operate according to the principles described above. In general, a ZCB converter according to the present invention can be characterized as follows:

a) It includes a magnetic circuit, a switch, a capacitor, a switch controller and an output unidirectional conducting device;

b) The switch is connected in series with both the input voltage source and a portion of the magnetic circuit;

c) The capacitor is connected in series with a portion of the magnetic circuit and the switch, the capacitor and the magnetic circuit thereby defining a characteristic time constant for the rise and fall of the sinusoidal current which flows in the switch after the switch is closed;

d) The output unidirectional conducting device connects between the magnetic circuit and the voltage-sinking load (which might be a load in parallel with a storage capacitor) and is poled so that current can flow only in the direction of the load;

e) The switch is turned on and off at zero current, the turn on times being controlled to regulate the ratio of the voltage across the load to the input voltage, the ratio being greater than unity.

After closing the switch the capacitor voltage will fall sinusoidally (with the same characteristic time constant as the switch current) from a first value, which is greater than the converter input voltage, to a second value, which is less than the converter input voltage, and the voltage will return to the first voltage value after the switch is opened. Thus, for example, the converter of FIG. 5E, which incorporates two coupled inductors and three discrete inductors (the switch controller is present but not shown) is another possible embodiment of a ZCB converter. FIGS. 29A and 29B show two other possible embodiments. In FIG. 29A, the output diode 262 is connected between a tap on the secondary of the coupled inductor 252 and the load. In the converter shown, transformer action will cause the capacitor voltage to rise to a value greater than Vo when the switch is off and the diode is conducting. In an alternate embodiment of the converter of FIG. 29A, the portion of the coupled inductor between the input source and the switch could be replaced with a discrete inductor, and the inductance which is connected between the switch and the capacitor would be a tapped inductor, as shown in the Figure, the diode and capacitor also being connected as shown. In the embodiment of FIG. 29B the output diode is also connected to a tap on a coupled inductor. Many other embodiments are also possible which include combinations of coupled inductors, discrete inductors and tapped coupled inductors, which operate in accordance with principles described above.

The operating conditions of the two-terminal switch, included in the current-commutating switches of FIGS. 4A and 4B and the various ZCB converters of FIGS. 7 through 29, will differ depending on the operating mode. In the short cycle mode, the switch current is always unidirectional, but the switch may have to withstand a negative voltage at the time it is turned off (at time t4 in FIGS. 5D, 10D and 12D). In the long cycle mode the switch need not withstand a negative voltage, but it must carry negative current during part of the operating cycle (e.g., FIGS. 6B, 11B and 13B). In practice, semiconductor switches will not generally withstand a bipolar voltage, or cannot effectively carry bipolar currents. FIG. 30A shows an embodiment of a two-terminal switch 118 which can be used in ZCB converters operating in the long cycle mode. In the Figure the unipolar switch 120 is a unipolar device (capable of withstanding a positive voltage, Vsw, when off, which is greater than or equal to the peak value of voltage which will appear across the switch in a given application, and capable of carrying unidirectional current, Isw, in the direction indicated by the arrow, when on). Negative values of current, Is, are carried by the first diode 122, which has a reverse voltage rating greater than or equal to the voltage withstanding capability of the unipolar switch. FIG. 31A shows an embodiment of a two-terminal switch 124 which can be used in ZCB converters operating in the short cycle mode. In the Figure the unipolar switch is a unipolar device (capable of withstanding a positive voltage, Vsw, when off, which is greater than or equal to the peak value of voltage which will appear across the switch in a given application, and capable of carrying unidirectional current, Isw, in the direction indicated by the arrow, when on). When the unipolar switch 126 is turned off (at zero current), the negative value of voltage, Vsw, will be blocked by the diode 128. In general, the diodes 122, 128, would be fast recovery devices. In either embodiment, the unipolar switch might, for example, be a field effect transistor (FET), a bipolar transistor, or an insulated gate bipolar transistor (IGBT), and these devices may be compared in terms of their losses and drive requirements (e.g., the circuit complexity, and attendant losses, associated with turning the device on and off). Conduction losses (the Vsw·Is losses during the period of time that the switch is on) in the bipolar transistor are essentially proportional to the average value of Isw (the device is essentially a "constant-voltage" switch when it is on), but the device requires complex drive circuitry since turning the device on and off requires controlling the flow of a significant amount of base current. In general, the drive requirements make a bipolar transistor a poor choice for the switch. Driving a FET on and off is simpler, since turning the device on and off essentially involves charging and discharging the gate capacitance of the device between two voltage levels, but conduction losses in the FET are proportional to the square of the rms current in the device (the device is essentially a constant resistance device when it is on). In prior art converters, minimizing switch transition times is a critical factor in minimizing switching losses. This requirement is relaxed in ZCB converters. Thus, in general, drive circuitry for a FET in a ZCB converter is simpler than that for a prior art converter, since the peak values of currents associated with rapidly charging and discharging the gate capacitance are reduced. The IGBT, which combines conduction loss characteristics similar to a bipolar transistor with drive requirements similar to that of a FET, generally cannot be used in prior art converters, except at low operating frequencies (hence low power density), because it is characterized by transition times which are slower than a FET. In the ZCB converter, however, the slower transition times of the IGBT are less important, and the benefits of low conduction losses and drive circuit simplicity can be used to advantage. FIG. 30B shows an embodiment 130 of the two-terminal switch 118 of FIG. 30A where a FET 132 is used as the unipolar switch. In the Figure, a second diode 134 is placed in series with the FET to ensure that negative flow of current, Is, is carried by the first diode 136 and does not flow in the intrinsic body diode of the FET (the body diode having an inherently slow reverse recovery characteristic). FIG. 30C shows an embodiment of the switch of FIG. 30A where an IGBT is used as the unipolar switch 140. FIGS. 31B and 31C show embodiments of the two-terminal switch of FIG. 31A using a FET and an IGBT, respectively.

In application, it will generally be desired to maintain the output voltage of a ZCB converter at some predetermined value, Vo, as both the input source voltage and the converter load vary. The value of Vo may either be fixed, or it may be varied in some predetermined way (see Vinciarelli, U.S. patent application Ser. No. 07/642,232, filed Jan. 16, 1991). One method of controlling the ZCB converter output voltage is shown in FIG. 32. In the Figure a ZCB converter 142, which may be of the kind shown in FIG. 7 or 8, and which may be operating in either the long or short cycle operating mode, receives power from an input source, at a voltage Vin, and delivers power to a load 147 at an output voltage Vo, where Vo>Vin. A first signal, Vref, indicative of some desired value of output voltage Vo, is supplied to an error amplifier 144 which also receives a second signal, V1=K·Vout, which is proportional to the converter output voltage, Vo. The signal V1 is delivered to the error amplifier by a divider 146. If the signal V1 is greater than Vref, the output of the error amplifier will decrease; if the signal V1 is less than Vref, the output of the error amplifier will increase. The output of the error amplifier is delivered to a variable frequency controller 148. As the error amplifier output increases, the signal, Vf, delivered to the switch controller 150, will increase the rate at which converter operating cycles are initiated (i.e., increase the converter operating frequency). In this way, the converter operating frequency will automatically be adjusted so as to maintain Vout=Vref/K as both the load and input voltage vary.

There are many ways of implementing the switch controller (e.g., 41, 43 (FIGS. 4A and 4B); 150 (FIG. 32)). Details of one such controller are illustrated in FIG. 33, which shows a portion of a ZC switch consisting of a switch controller 41, a switch 40 and a current transformer 200 connected in series with the switch 40. As shown in the Figure, the signal INIT goes high at time t=0, causing the output, VQ, of the set-reset flip-flop 270 (the output of which, VQ, goes high when a high signal is applied to its S input and goes low when a high signal is applied to its R input) to go to its high state. The signal VQ is delivered to a switch driver 210 which closes the switch 40 when VQ is high. Upon closure, switch current, Isw, begins to flow, and, by transformer action, a fraction of this current flows in the signal diode 230 connected to the secondary of the current transformer 200 (the turns ratio, N2/N1, being greater than one). The diode voltage, VI, is delivered to one input of the comparator 240. A threshold voltage, Vt (for example, 0.1 V), is delivered to the other input of the comparator 240. As VI rises above Vt the comparator output goes to its low state. As the switch current, Isw, returns to zero, at time t2, the current in the diode also decreases and the voltage VI drops below Vt. This causes the output of the comparator 240 to return to its high state and, via the capacitor 250 and the resistor 260, causes a high going pulse, VR, to be delivered to the R input of the flip-flop 270. This pulse resets the flip-flop, VQ goes low and the switch 40 is turned off. As described, the switch controller 41 of FIG. 33 is arranged so that it opens the switch at essentially the first instant in time, following the time when the switch is turned on, when the current returns to zero. The arrangement of FIG. 33 is thus suitable for the short cycle mode of operation. The switch controller can be adapted to the long cycle mode by simply reversing the polarity of either of the windings of the current transformer (as shown in FIG. 34). With the winding arrangement of FIG. 34, the switch will be opened at essentially the second instant in time, following the time when the switch is turned on, when the current returns to zero.

Other embodiments are within the following claims.

What is claimed is:

1. A boost power converter apparatus for transferring power form an input voltage source to a load at a load voltage of magnitude greater than the magnitude of the voltage of said input voltage source, comprising
   a magnetic circuit,
   a switch connected in series with said input source and a portion of said magnetic circuit,
   a first capacitor connected between said magnetic circuit and the junction of said switch and said input source, a portion of said magnetic circuit thereby being connected in series with said capacitor and said switch, said capacitor cooperating with said magnetic circuit to define a characteristic time constant for the time variation of the sinusoidal component of the switch current which flows after said switch is closed, a switch controller for turning said switch on and off at times when the current in said switch is zero, said turn on times being controlled to regulate the ratio of the voltage across said load to the average value of voltage across said input source, said ratio being greater than or equal to one, and a first unidirectional conducting device connected between said magnetic circuit and said load, said unidirectional conducting device being poled to permit current to flow in the direction of said load, wherein said magnetic circuit comprises an input terminal, an output terminal an a shunt terminal, said input source being connected to said input terminal, said switch being connected to said shunt terminal and said first capacitor and said first unidirectional conducting device being connected to said output terminal, and wherein said magnetic circuit comprises a non-saturating coupled inductor having a first winding and a second winding, said first winding being connected between said input terminal and said shunt terminal, said second winding being connected between said shunt terminal and said output terminal, the polarity of said windings being arranged so that imposition of a positive voltage between said input terminal and said shunt terminal induces a positive voltage to appear between said output terminal and said shunt terminal.

2. A boost power converter apparatus for transferring power form an input voltage source to a load at a load voltage of magnitude greater than the magnitude of the voltage of said input voltage source, comprising a magnetic circuit, a switch connected in series with said input source and a portion of said magnetic circuit, a first capacitor connected between said magnetic circuit and the junction of said switch and said input source, a portion of said magnetic circuit thereby being connected in series with said capacitor and said switch, said capacitor cooperating with said magnetic circuit to define a characteristic time constant for the time variation of the sinusoidal component of the switch current which flows after said switch is closed, a switch controller for turning said switch on and off at times when the current in said switch is zero, said turn on times being controlled to regulate the traction of the voltage across said load to the average value of voltage across said input source, said ration being grater than or equal to one, and a first unidirectional conducting device connected between said magnetic circuit and said load, said unidirectional conducting device being poled to permit current to flow int eh direction of said load, wherein said magnetic circuit comprises an input terminal, an output terminal and a shunt terminals, and input source being connected to said input terminal, said switch being connected to said shunt terminal and said first capacitor and said first unidirectional conducting device being connected to said output terminal, and wherein said magnetic circuit comprises a non-saturating coupled inductor having a first winding and a second winding, said first winding being connected between said input terminal and said output terminal, said second winding being connected between said shunt terminal and said output terminal, the polarity of said windings being arranged so that imposition of a positive voltage between said input terminal and said output terminal induces a positive voltage to appear between said output terminal and said shunt terminal.

3. The apparatus of claim 1 wherein said magnetic circuit further comprises a discrete inductor connected in series with said first winding.

4. The apparatus of claim 1 wherein said magnetic circuit further comprises a discrete inductor connected in series with said second winding.

5. The apparatus of claim 2 wherein said magnetic circuit further comprises a discrete inductor connected in series with said first winding.

6. The apparatus of claim 2 wherein said magnetic circuit further comprises a discrete inductor connected in series with said second winding.

7. The apparatus of claim 2 wherein said magnetic circuit further comprises a second coupled inductor having a third winding and a fourth winding, said third winding connected to said input terminal and in series with said first winding and said fourth winding connected between the junction of said first and second windings and said output terminal.

8. The apparatus of claim 7 wherein said magnetic circuit further comprises a discrete inductor connected in series with said third winding.

9. The apparatus of claim 7 wherein said magnetic circuit further comprises a discrete inductor connected in series with said fourth winding.

10. The apparatus of claim 7 wherein said magnetic circuit further comprises a discrete inductor connected in series with said second winding.

11. A boost power converter apparatus for transferring power from an input voltage source to a voltage-sinking load at a load voltage of magnitude greater than the magnitude of the voltage of said input voltage source, comprising a switch a non-saturating coupled inductor comprising a first winding, having N1 turns, connected to and in series with a second winding, having N2 turns, the polarities of said first and said second windings being arranged so that a voltage across said first winding will induce a voltage across said second winding which adds to said voltage across said first winding, said first winding being connected to said input source, both of said windings of said coupled inductor being connected in series with said input source and said switch, said coupled inductor being characterized by a turns ratio, $a = N1/N2$; a total first winding inductance, $L_{pri}$; a total second winding inductance, $L_{sec}$; first and second winding leakage inductances, $L_{l1}$ and $L_{l2}$, respectively; and a magnetizing inductance, $L_m$, where $L_{pri} = L_m + L_{l1}$ and $L_{sec} = L_{l2} + L_m/a^2$, a first capacitor, of value C, connected between the junction of said first winding and said second winding and the junction of said input source and said switch, a first unidirectional conducting device connected between said load and the junction of said first winding and said second winding, said unidirectional conducting device being poled to conduct current from said input source to said load after said switch is opened, a switch controller for turning said switch on and off at times when the current in said switch is zero, said coupled inductor and said first capacitor defining a characteristic time scale, $$Tc = \pi \sqrt{C \frac{L12\left(Ll1 \cdot \frac{(1 + a^2 L12)}{Lm} + a^2 L12\right)}{(a + 1)^2 Lm + a^2(Ll1 + Ll2)}}$$

for the time variation of the sinusoidal component of the switch current which flows after turning said switch on, the ratio of the voltage across said load to the average value of voltage across said input source being varied by varying the rate at which said turn on times are initiated, said ratio being greater than or equal to one.

12. A boost power converter apparatus for transferring power from an input voltage source to a voltage-sinking load at a load voltage of magnitude greater than the magnitude of the voltage of said input voltage source, comprising a first capacitor, of value C, a non-saturation coupled inductor comprising a first winding, having N1 turns, connected to and in series with a second winding, having N2 turns, the polarities of said first and said second windings being arranged so that a voltage across said first winding will induce a voltage across said second winding which is in opposition to said voltage across said first winding, said first winding being connected to said input source, both of said windings of said coupled inductor being connected in series with said input source and said first capacitor, said coupled inductor being characterized by a turns ratio, a=N1/N2; a total first winding inductance, Lpri; a total second winding inductance, Lsec; first and second winding leakage inductances, Ll1 and Ll2, respectively; and a magnetizing inductance, Lm, where Lpri=Lm+Ll1 and Lsec=Ll2+Lm/a$^2$, a switch connected between the junction of said first winding and said second winding and the junction of said input source and said first capacitor, a first unidirectional conducting device connected between said load and the junction of said second winding and said first capacitor, said unidirectional conducting device being poled to conduct current from said input source to said load after said switch is opened, a switch controller for turning said switch on and off at times when the current in said switch is zero, said first inductance and said first capacitor defining a characteristic time scale, $$Tc = \pi \sqrt{C\left(L12 + \frac{1\, Ll1 \cdot Lm}{a^2 Ll1 + Lm}\right)}$$

for the time variation of the sinusoidal component of the switch current which flows after turning said switch on, the ratio of the voltage across said load to the average value of voltage across said input source being varied by varying the rate at which said turn on times are initiated, said ratio being greater than or equal to one.

13. The boost power converter apparatus of any one of claims 1 through 10, 11, or 12 further comprising a second unidirectional conducting device connected in series between said input source and said boost power converter apparatus.

14. The boost power converter apparatus of any one of claims 1 through 10, 11, or 12 wherein said input source is an AC source and further comprising a full-wave rectifier connected between said AC source and said boost power converter apparatus.

15. The apparatus of claim 13 further comprising a third unidirectional conducting device connected between the input of said boost power converter and said load, said third unidirectional conducting device being poled so that current flowing back toward said input source which is blocked by said second unidirectional conducting device can flow through said third unidirectional conducting device in the direction of said load.

16. The apparatus of claim 14 further comprising a third unidirectional conducting device connected between the input of said boost power converter and said load, said third unidirectional conducting device being poled so that current which flows back form the input of said boost power converter in the direction of said input source, and which is inhibited from flowing back into said input source by said second unidirectional conducting device, can flow through said third unidirectional conducting device int eh direction of said load.

17. The apparatus of any one of claim 1 through 10, 11, or 12 wherein said controller is arranged to turn said switch off at essentially the first instant in time, following the time when said switch is turned on, when the current in said switch returns to zero 18. The apparatus of any one of claims 1 through 10, 11, or 12 wherein said controller is arranged to turn said switch off at essentially the second instant in time, following the time when said switch is turned on, when the current in said switch returns to zero.

19. The apparatus of any one of claim 1 through 10, 11, or 12 further comprising an output capacitor in parallel with said load, the capacitance of said output capacitor being large enough so that it smooths the effect of time variations int eh output current delivered to said load so that the output voltage of the converter is an essentially DC value.

20. The apparatus of any one of claim 1 through 10, 11, or 12 further comprising an output voltage controller which varies the frequency of the switch turn-on times in response to the output voltage at the load.

21. The apparatus of claim 14 further comprising an output voltage controller which varies the frequency of the switch turn-on times in response to the output voltage at the load.

22. The apparatus of claim 20 wherein said output voltage controller comprises a reference signal, indicative of a desired value of output voltage of said converter apparatus, a divider which delivers a second signal, indicative of the actual output voltage of said converter apparatus, an error amplifier which compares said reference signal to said second signal and which delivers an output indicative of the difference between said desired value of converter output voltage and said actual converter output voltage, and a variable frequency control circuit which accepts the output of said error amplifier and delivers a third signal to said switch controller, said third signal being indicative of the rate at which switch turn-on ties are to be initiated so as to maintain said actual converter output voltage essentially equal to said desired value of converter output voltage.

23. The apparatus of claim 21 wherein said output voltage controller is a power factor preregulating controller, said power factor preregulating controller maintaining said output voltage at or above both the peak value of the voltage delivered by said AC source and the minimum operating voltage of said load while simultaneously forcing the input current drawn by said boost power converter to follow the time varying waveform of said AC source.

24. The apparatus of claim 11 or 12 wherein said switch comprises a bidirect two-terminal switch capable of carrying bipolar current when on and capable of withstanding a unipolar voltage when off, said bidirectional two-terminal switch comprising
   a unipolar switch capable of withstanding a unipolar voltage when turned off, the polarity of said unipolar voltage defining positive and negative poles on said switch, and capable of carrying a unipolar current, when turned on, between said positive and negative poles, and
   a first unidirectional conducting device connected in parallel with said unipolar switch, said first unidirectional conducting device being poled so that it conducts current in a direction opposite of that which can be carried by said unipolar switch.

25. The apparatus of claim 11 or 12 wherein said switch comprises a bidirectional two-terminal switch capable of carrying unipolar current when on and capable of withstanding a bipolar voltage when off, said bidirectional two-terminal switch comprising
   a unipolar switch capable of withstanding a unipolar voltage when turned off, the polarity of said unipolar voltage defining positive and negative poles on said switch, and capable of carrying a unipolar current, when turned on, between said positive and negative poles, and
   a first unidirectional conducting device connected in series with said unipolar switch, said first unidirectional conducting device being poled so that it conducts current in the same direction as said unipolar switch.

26. The apparatus of claim 24 wherein said unipolar switch comprises a bipolar transistor.

27. The apparatus of claim 25 wherein said unipolar switch comprises a bipolar transistor.

28. The apparatus of claim 24 wherein said unipolar switch comprises a field effect transistor.

29. The apparatus of claim 25 wherein said unipolar switch comprises a field effect transistor.

30. The apparatus of claim 24 wherein said unipolar switch comprises an insulated gate bipolar transistor.

31. The apparatus of claim 25 wherein said unipolar switch comprises an insulated gate bipolar transistor.

32. The apparatus of claim 24 wherein said unipolar switch comprises a field effect transistor in series with a second unidirectional conducting device, said second unidirectional conducting device being poled so that it carries current in the same direction as said field effect transistor.

* * * * *

UNITED STATES PATENT AND TRADEMARK OFFICE
CERTIFICATE OF CORRECTION

PATENT NO. : 5,321,348
DATED : June 14, 1994
INVENTOR(S) : Patrizio Vinciarelli et al.

It is certified that error appears in the above-indentified patent and that said Letters Patent is hereby corrected as shown below:

Figs. 5B, 5C, 5D, 5E, 5F, 6B, 6C, 6D, 6E, 6F, 10A, 10B, 10C, 10D, 10E, 10F, 11A, 11B, 11C, 11D, 11E, 11F, 12A, 12B, 12C, 12D, 12E, 12F, 13A, 13B, 13C, 13D, 13E, 13F, 28A, and 28B dotted lines omitted, see attached.

Col. 5, line 64 "int he" should be --in the--.

Col. 6, line 56 after "30C" insert --illustrate--.

Col. 16, line 41 after "placement of" insert --a--.

Col. 19, line 19 "We" should be --we--.

Col. 29, claim 2, line 32 "form" should be --from--.

Col. 29, claim 2, line 50 "traction" should be --ratio--.

UNITED STATES PATENT AND TRADEMARK OFFICE
CERTIFICATE OF CORRECTION

PATENT NO. : 5,321,348

DATED : June 14, 1994

INVENTOR(S) : Patrizio Vinciarelli et al.

It is certified that error appears in the above-indentified patent and that said Letters Patent is hereby corrected as shown below:

Col. 29, claim 2, line 52 "ration" should be --ration--.

Col. 29, claim 2, line 56 "int he" should be --in the--.

Col. 29, claim 2, line 58 "terminals" should be --terminal--.

Col. 29, claim 2, line 59 "and" should be --said--.

Col. 32, claim 16, line 28 "int he" should be --in the--.

Col. 32, claim 19, line 44 "int he" should be --in the--.

Col. 33, claim 24, line 16, "bidirect" should be --bidirectional--.

Signed and Sealed this

Seventh Day of May, 1996

Attest:

BRUCE LEHMAN

Attesting Officer    Commissioner of Patents and Trademarks

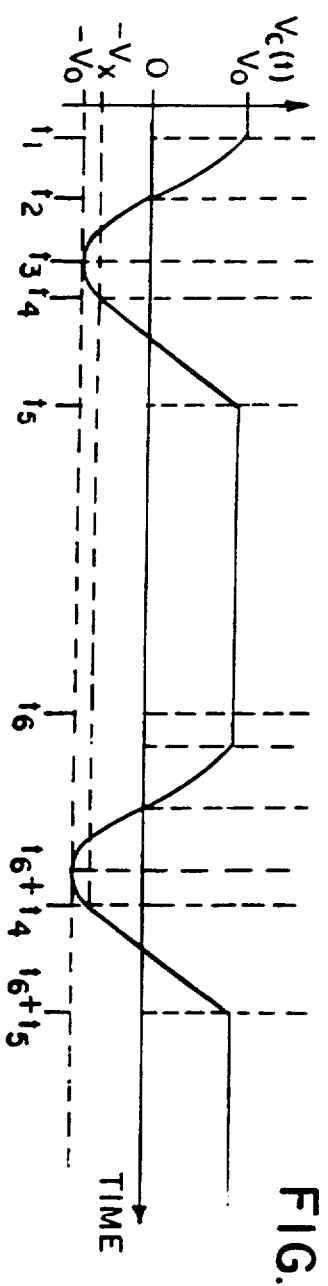
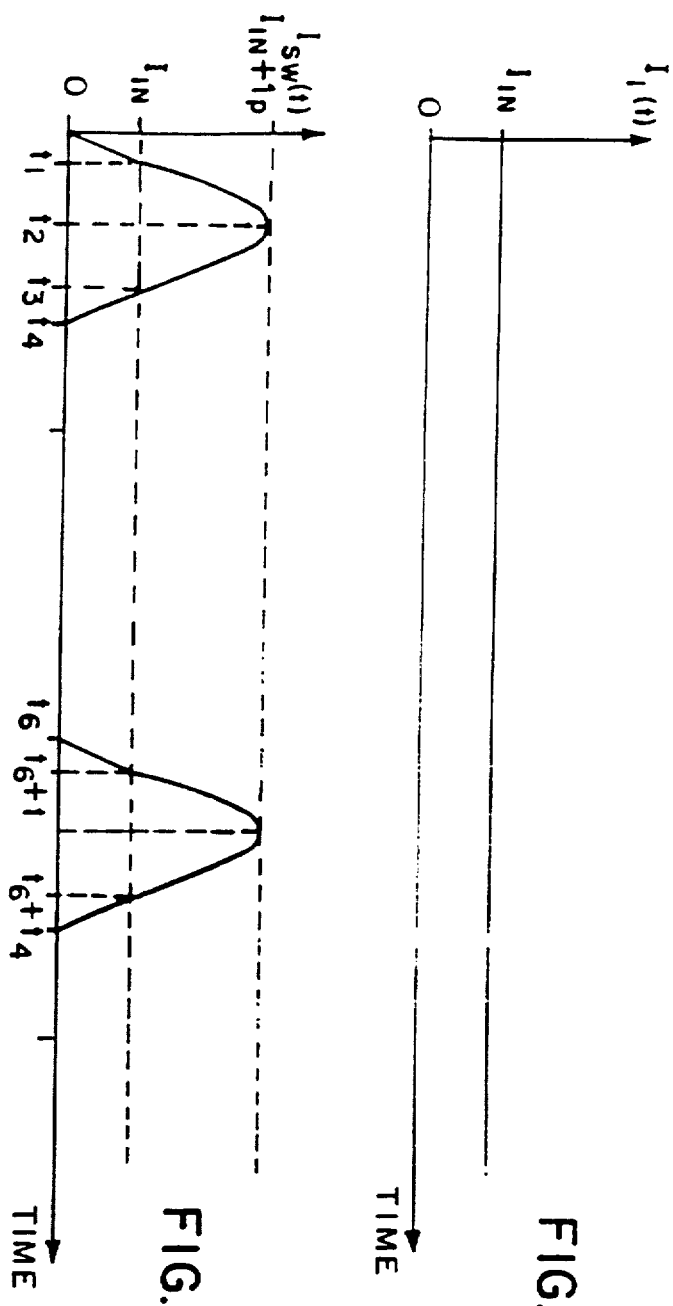
FIG. 5A
FIG. 5B
FIG. 5C

Figure 6D:
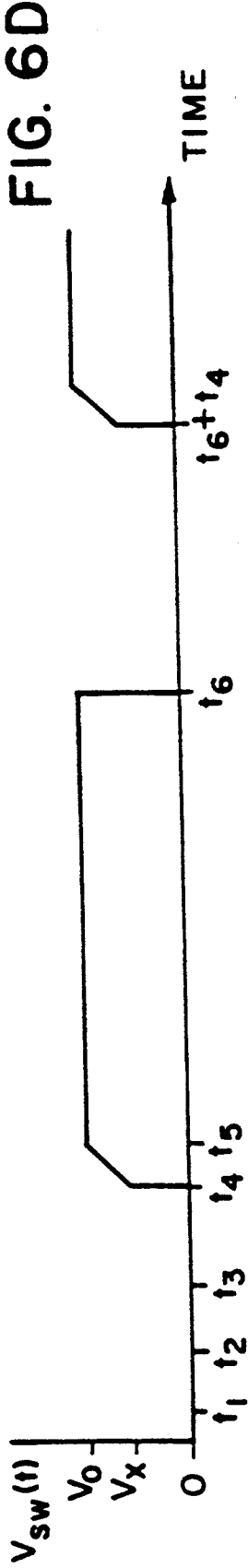
Figure 6E:
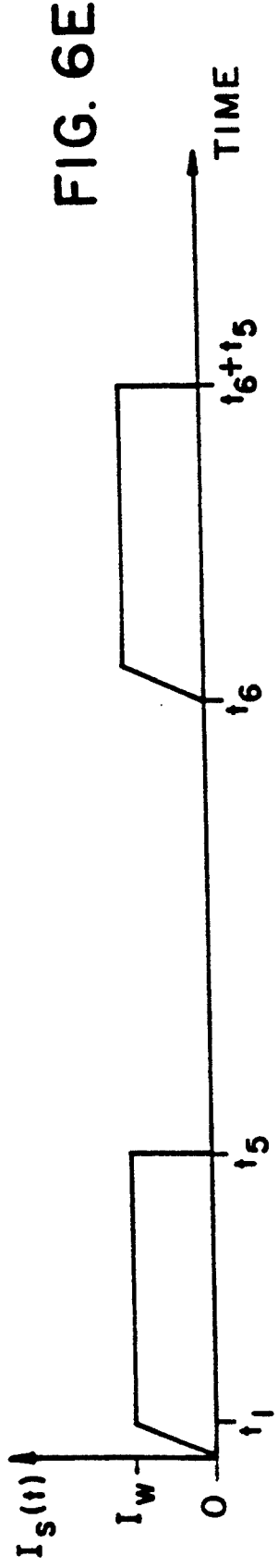
Figure 6F:
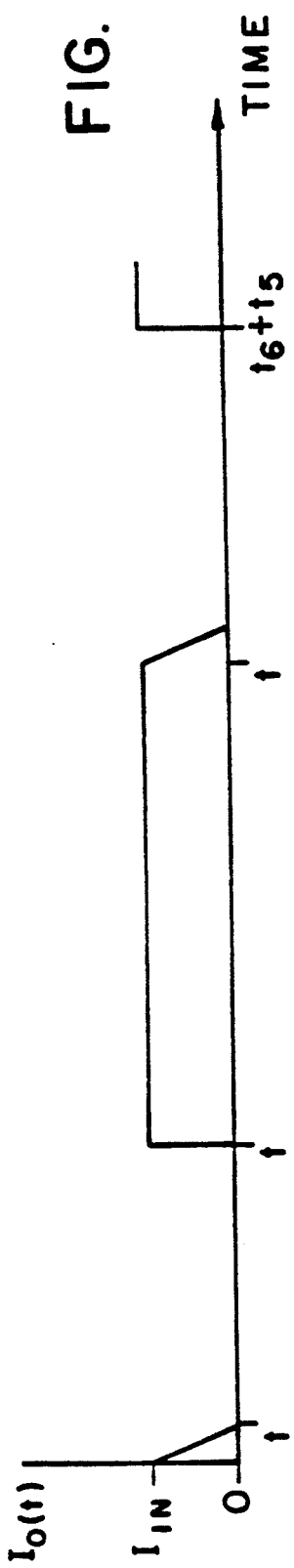

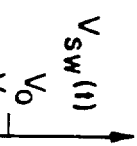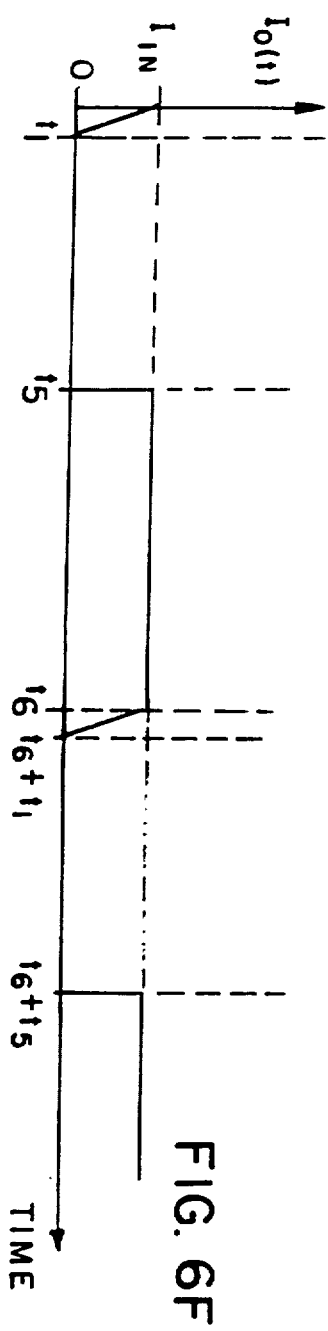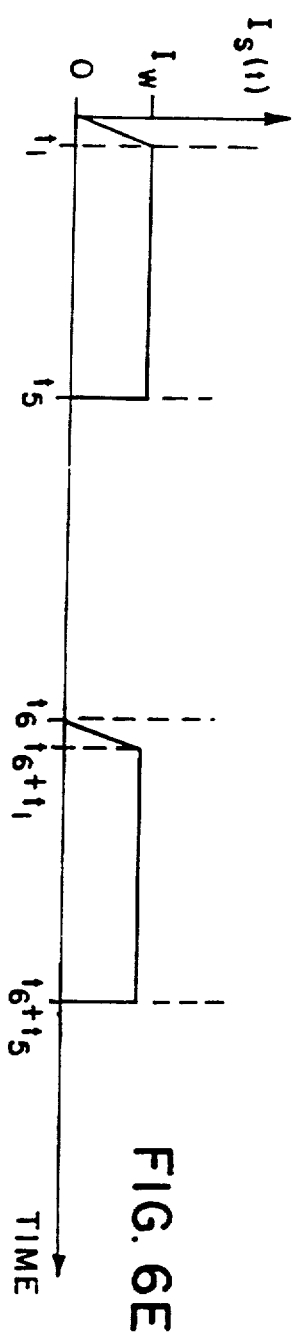
FIG. 6D
FIG. 6E
FIG. 6F

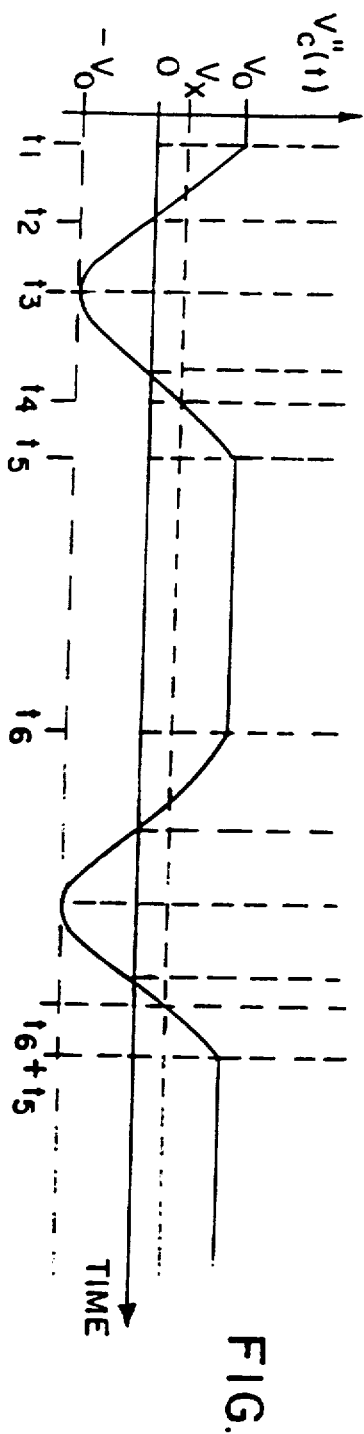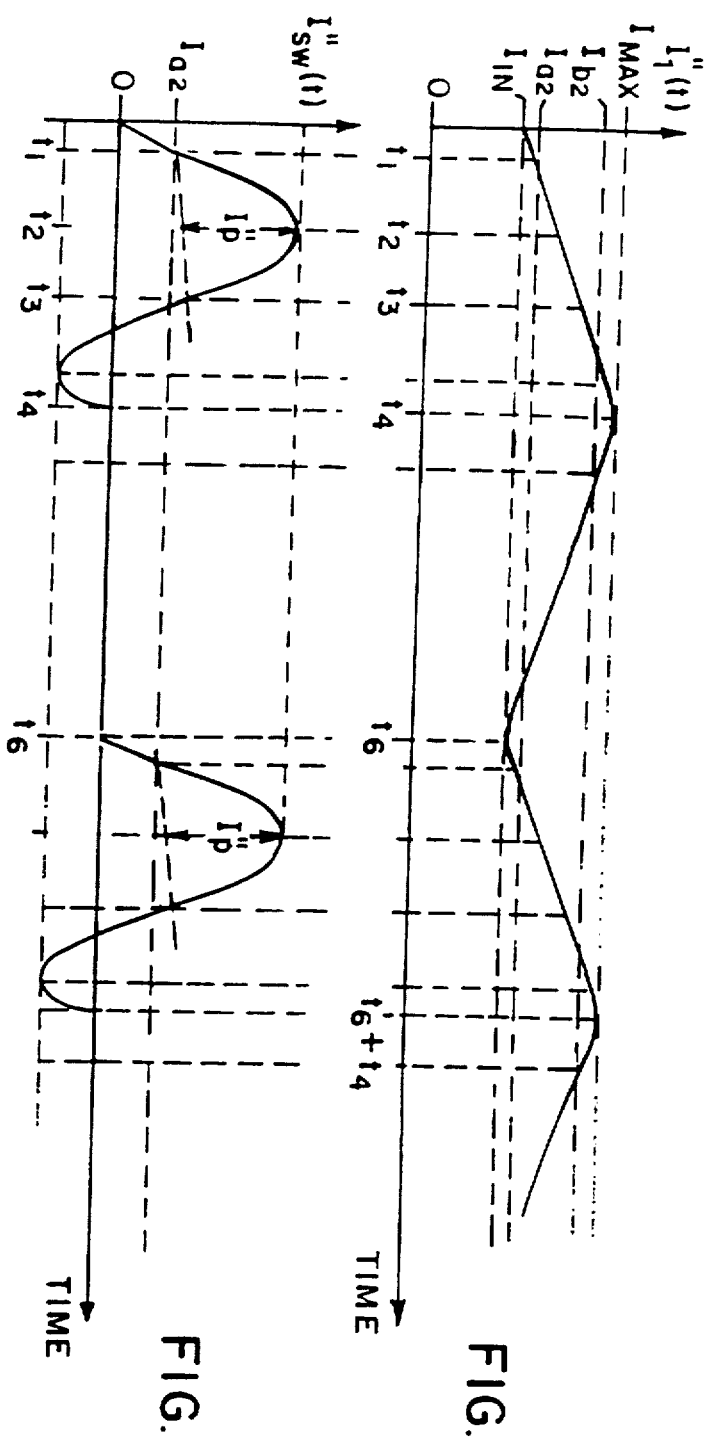
FIG. 13A
FIG. 13B
FIG. 13C

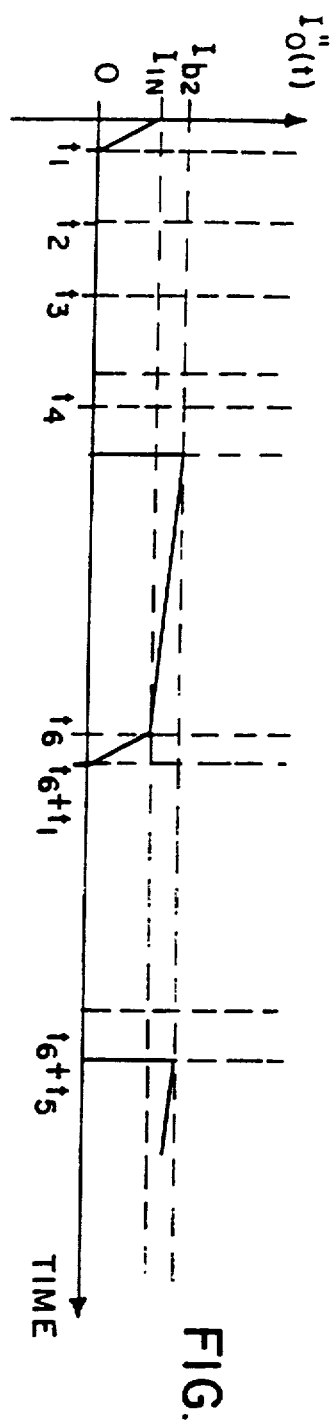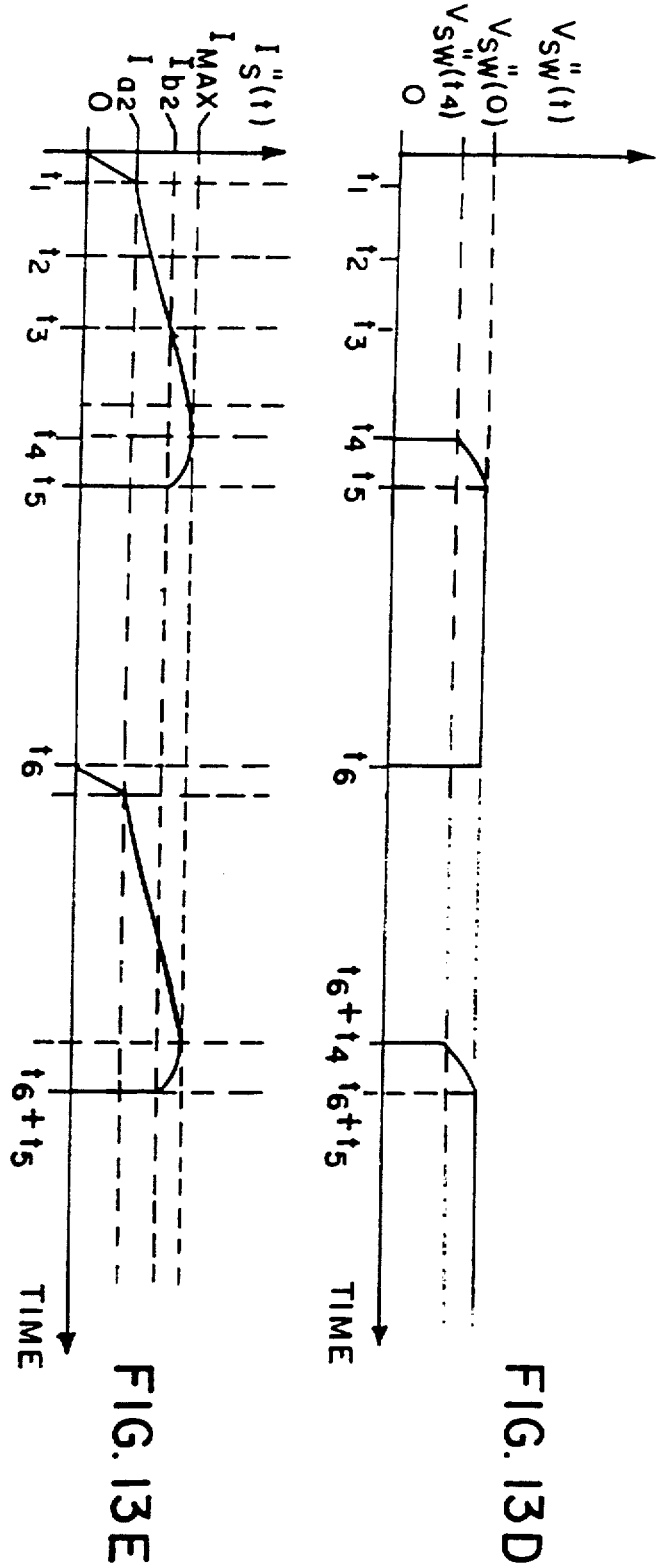
FIG. 13D
FIG. 13E
FIG. 13F